(12) United States Patent
Neumann et al.

(10) Patent No.: US 8,105,419 B2
(45) Date of Patent: Jan. 31, 2012

(54) GAS LIQUID CONTACTOR AND EFFLUENT CLEANING SYSTEM AND METHOD

(75) Inventors: David Kurt Neumann, Colorado Springs, CO (US); Nicholas J. Miller, Colorado Springs, CO (US); Boris R. Nizamov, Colorado Springs, CO (US); Thomas Lee Henshaw, Monument, CO (US); Andrew R. Awtry, Colorado Springs, CO (US); Jason K. Brasseur, Colorado Springs, CO (US); Keith R. Hobbs, Colorado Springs, CO (US); Jason A. Tobias, Colorado Springs, CO (US); William E. McDermott, Littleton, CO (US)

(73) Assignee: Neumann Systems Group, Inc., Colorado Springs, CO (US)

( * ) Notice: Subject to any disclaimer, the term of this patent is extended or adjusted under 35 U.S.C. 154(b) by 0 days.

(21) Appl. No.: 12/869,670

(22) Filed: Aug. 26, 2010

(65) Prior Publication Data

US 2010/0319539 A1    Dec. 23, 2010

Related U.S. Application Data

(63) Continuation of application No. 12/459,685, filed on Jul. 6, 2009, now Pat. No. 7,866,638, which is a continuation-in-part of application No. 12/012,568, filed on Feb. 4, 2008, now Pat. No. 7,871,063, which is a continuation of application No. 11/057,539, filed on Feb. 14, 2005, now Pat. No. 7,379,487.

(60) Provisional application No. 61/100,564, filed on Sep. 26, 2008, provisional application No. 61/100,606, filed on Sep. 26, 2008, provisional application No. 61/100,591, filed on Sep. 26, 2008.

(51) Int. Cl.
*B01D 47/06* (2006.01)

(52) U.S. Cl. ............ 95/223; 95/224; 261/115; 261/116; 261/117; 261/118

(58) Field of Classification Search .......... 261/115–118; 96/243; 95/223, 224; 239/592, 594, 595, 239/597–599
See application file for complete search history.

(56) References Cited

U.S. PATENT DOCUMENTS 2,484,277 A    10/1949    Fisher
(Continued)

FOREIGN PATENT DOCUMENTS

GB    2059286 A    4/1981
(Continued)

OTHER PUBLICATIONS

Kohl, et al. Gas Purification, Gulf Professional Publishing, 5 ed., 1997.
(Continued)

*Primary Examiner* — Richard L Chiesa
(74) *Attorney, Agent, or Firm* — Scott J. Hawranek; Sheridan Ross, P.C.

(57) ABSTRACT

The invention relates to a gas liquid contactor and effluent cleaning system and method and more particularly to an array of nozzles configured to produce uniformly spaced flat liquid jets shaped to minimize disruption from a gas. An embodiment of the invention is directed towards a gas liquid contactor module including a liquid inlet and outlet and a gas inlet and outlet. An array of nozzles is in communication with the liquid inlet and the gas inlet. The array of nozzles is configured to produce uniformly spaced flat liquid jets shaped to minimize disruption from a gas flow and maximize gas flow and liquid flow interactions while rapidly replenishing the liquid.

22 Claims, 23 Drawing Sheets

U.S. PATENT DOCUMENTS

| | | | |
|---|---|---|---|
| 2,604,185 A * | 7/1952 | Johnstone et al. | 95/219 |
| 2,631,019 A | 3/1953 | Yates | |
| 2,687,614 A | 8/1954 | Goddard | |
| 3,237,381 A | 3/1966 | Hvostoff et al. | |
| 3,465,504 A | 9/1969 | Oropeza et al. | |
| 3,488,924 A * | 1/1970 | Reeve | 95/198 |
| 3,524,630 A | 8/1970 | Marion | |
| 3,582,050 A | 6/1971 | Kozak | |
| 3,731,461 A | 5/1973 | Hamon | |
| 3,766,489 A | 10/1973 | Rosenberg et al. | |
| 3,840,304 A | 10/1974 | Hirafuji | |
| 3,914,348 A | 10/1975 | Kors et al. | |
| 3,934,012 A | 1/1976 | Schievelbein | |
| 3,984,786 A | 10/1976 | Pike | |
| 4,011,287 A | 3/1977 | Marley | |
| 4,026,682 A | 5/1977 | Pausch | |
| 4,073,832 A | 2/1978 | McGann | |
| 4,099,140 A | 7/1978 | Snelling et al. | |
| 4,102,982 A | 7/1978 | Weir, Jr. | |
| 4,128,206 A | 12/1978 | Bintner | |
| 4,246,245 A | 1/1981 | Abrams et al. | |
| 4,261,511 A | 4/1981 | Erb et al. | |
| 4,269,812 A | 5/1981 | Edwards et al. | |
| 4,284,590 A | 8/1981 | DeBoer et al. | |
| 4,326,553 A | 4/1982 | Hall | |
| 4,340,572 A | 7/1982 | Ben-Shmuel et al. | |
| 4,343,771 A | 8/1982 | Edwards et al. | |
| 4,348,432 A | 9/1982 | Huang | |
| 4,378,236 A | 3/1983 | Helms | |
| 4,403,324 A | 9/1983 | Woste | |
| 4,507,969 A | 4/1985 | Djordjevic et al. | |
| 4,633,623 A | 1/1987 | Spitz | |
| 4,641,785 A | 2/1987 | Grothe | |
| 4,668,498 A | 5/1987 | Davis | |
| 4,720,290 A | 1/1988 | McCoy | |
| 4,740,308 A | 4/1988 | Fremont et al. | |
| 4,744,518 A | 5/1988 | Toth | |
| 4,810,268 A | 3/1989 | Chambers et al. | |
| 4,819,878 A | 4/1989 | Bailey et al. | |
| 4,828,768 A | 5/1989 | Talmor | |
| 4,887,100 A | 12/1989 | Michaelis et al. | |
| 4,893,754 A | 1/1990 | Ruiz | |
| 4,913,225 A | 4/1990 | Chubb | |
| 4,968,328 A | 11/1990 | Duke | |
| 4,989,788 A | 2/1991 | Bendig et al. | |
| 5,057,853 A | 10/1991 | Fisher | |
| 5,269,967 A | 12/1993 | Achgill | |
| 5,330,563 A | 7/1994 | Yamase et al. | |
| 5,364,604 A | 11/1994 | Spink et al. | |
| 5,392,988 A | 2/1995 | Thayer | |
| 5,395,482 A | 3/1995 | Onda et al. | |
| 5,474,597 A | 12/1995 | Halldin | |
| 5,565,180 A | 10/1996 | Spink | |
| 5,580,531 A | 12/1996 | Vassiliou et al. | |
| 5,615,836 A | 4/1997 | Graef | |
| 5,634,413 A | 6/1997 | Listner et al. | |
| 5,643,799 A | 7/1997 | Atwater | |
| 5,655,255 A | 8/1997 | Kelly | |
| 5,744,110 A | 4/1998 | Mimura et al. | |
| 5,802,095 A | 9/1998 | Schall | |
| 5,833,148 A | 11/1998 | Steinhilber et al. | |
| 5,837,206 A | 11/1998 | Traffenstedt et al. | |
| 5,870,422 A | 2/1999 | Florentino et al. | |
| 5,893,943 A | 4/1999 | Durham et al. | |
| 5,947,390 A | 9/1999 | Smith | |
| 5,974,072 A | 10/1999 | Hartlove et al. | |
| 6,010,640 A | 1/2000 | Beshore et al. | |
| 6,051,055 A | 4/2000 | Ukawa et al. | |
| 6,072,820 A | 6/2000 | Dickerson | |
| 6,090,186 A | 7/2000 | Spencer | |
| 6,228,145 B1 | 5/2001 | Falk-Pedersen et al. | |
| 6,309,711 B1 | 10/2001 | Tseng et al. | |
| 6,459,717 B1 | 10/2002 | Henshaw et al. | |
| 6,550,751 B1 | 4/2003 | Brown et al. | |
| 6,612,509 B2 | 9/2003 | Holmstrom | |
| 6,652,624 B2 | 11/2003 | Ku et al. | |
| 6,656,253 B2 | 12/2003 | Willey et al. | |
| 6,714,570 B1 | 3/2004 | Brown | |
| 6,760,406 B2 | 7/2004 | Hertz et al. | |
| 6,824,071 B1 | 11/2004 | McMichael | |
| 6,830,608 B1 | 12/2004 | Peters | |
| 6,843,835 B2 | 1/2005 | Fornai et al. | |
| 6,918,949 B1 | 7/2005 | Peters | |
| 6,938,434 B1 | 9/2005 | Fair | |
| 7,021,571 B1 | 4/2006 | Lawson et al. | |
| 7,066,398 B2 | 6/2006 | Borland et al. | |
| 7,116,696 B2 | 10/2006 | Emanuel | |
| 7,163,163 B2 | 1/2007 | Waddelow | |
| 7,219,849 B1 | 5/2007 | Hedger | |
| 7,285,309 B2 | 10/2007 | Nakamura et al. | |
| 7,318,855 B2 | 1/2008 | Newman et al. | |
| 7,379,487 B2 | 5/2008 | McDermott et al. | |
| 7,866,638 B2 * | 1/2011 | Neumann et al. | 261/115 |
| 2001/0013554 A1 | 8/2001 | Borland et al. | |
| 2003/0080447 A1 | 5/2003 | Ye et al. | |
| 2003/0155451 A1 | 8/2003 | Nakamura et al. | |
| 2003/0227955 A1 | 12/2003 | Emanuel | |
| 2004/0131531 A1 | 7/2004 | Geerlings et al. | |
| 2004/0183216 A1 | 9/2004 | Cross | |
| 2005/0002847 A1 | 1/2005 | Maroto-Valer et al. | |
| 2005/0045752 A1 | 3/2005 | Waddelow | |
| 2005/0156064 A1 | 7/2005 | Tanigaki et al. | |
| 2005/0229553 A1 | 10/2005 | TeGrotenhuis et al. | |
| 2006/0016728 A1 | 1/2006 | Shorts | |
| 2006/0182163 A1 | 8/2006 | McDermott et al. | |
| 2007/0085227 A1 | 4/2007 | Tonkovich et al. | |
| 2007/0189949 A1 | 8/2007 | Hsieh et al. | |
| 2008/0119356 A1 | 5/2008 | Ryu et al. | |
| 2008/0175297 A1 | 7/2008 | McDermott et al. | |
| 2010/0320294 A1 | 12/2010 | Neumann et al. | |
| 2011/0061530 A1 | 3/2011 | Neumann et al. | |
| 2011/0061531 A1 | 3/2011 | Neumann et al. | |
| 2011/0072968 A1 | 3/2011 | Neumann et al. | |
| 2011/0081288 A1 | 4/2011 | Neumann et al. | |
| 2011/0126710 A1 | 6/2011 | McDermott et al. | |

FOREIGN PATENT DOCUMENTS

| | | |
|---|---|---|
| JP | 59-88510 | 5/1984 |

OTHER PUBLICATIONS

Yeh, et al., Semi-batch absorption and regeneration studies for CO2 capture by aqueous ammonia, Fuel Processing Technology, vol. 86, Issues 14-15, pp. 1533-1546, Oct. 2005.

Van Holst, J., et al. CO2 Capture from Flue Gas Using Amino Acid Salt Solutions, Proceedings of 8th International Conference on Greenhouse Gas Control Technologies, 2006.

Plasynski, et al. Carbon Dioxide Capture by Absorption with Potassium Carbonate, Carbon Sequestration, Project Facts, USDOE, NETL, Apr. 2008, 2 pgs.

International Search Report and Written Opinion of the International Searching Authority for PCT/US2009/049707 mailed Aug. 31, 2009, 2 pgs.

International Search Report and Written Opinion of the International Searching Authority for PCT/US2009/58634 mailed Jan. 13, 2010, 11 pgs.

International Search Report and Written Opinion of the International Searching Authority for PCT/US2009/58637 mailed Jan. 13, 2010, 7 pgs.

Huijgen, et al., "Cost Evaluation of CO2 sequestration by acqueous mineral carbonation," Energy Conversion and Management, 48, pp. 1923-1035, 2007.

Cullinane, "Thermodynamics and Kinetics of Acqueous Piperazine with Potassium Carbonate for Carbon Dioxide Absorption", pp. 167-171, Dissertation, The University of Texas at Austin, 2005.

Howells, "Super-Water [R] Jetting Applications From 1974 to 1999", pp. 1-21, 1999.

Oyeneken, et al., "Alternative Stripper Configurations for CO2 Capture by Aqueous Amines", AIChE Journal, vol. 53, No. 12, pp. 3144-3154, 2007.

International Search Report and Written Opinion of the International Searching Authority for PCT/US09/58631 mailed Jul. 28, 2010.

U.S. Appl. No. 12/586,806, filed Sep. 28, 2009, titled "Liquid contactor and method thereof."

U.S. Appl. No. 12/586,808, filed Sep. 28, 2009, titled "Indirect and direct method of sequestering contaminates."
U.S. Appl. No. 12/586,807, filed Sep. 28, 2009, titled "Apparatus and method thereof."
Trachtenberg, MC, et al. "Seventh International Conference on Greenhouse Gas Control Technologies (GHGT-7)," Vancouver, BC, 2004, 1751-1754.
International Preliminary Report on Patentability for International (PCT) Patent Application No. PCT/US2009/049707, mailed Nov. 8, 2010.
International Preliminary Report on Patentability for International (PCT) Patent Application No. PCT/US2009/58634, mailed Nov. 22, 2010.
International Preliminary Report on Patentability for International (PCT) Patent Application No. PCT/US2009/58637, mailed Feb. 15, 2011.
"Carbon Dioxide Storage by Mineral Carbonation," IEA, Report No. 2005/11, Sep. 2005, 41 pages.

"Chilled Ammonia-based Wet Scrubbing for Post-Combustion CO2 Capture," DOE/NETL-401-021507, Feb. 2007, 78 pages.
Ciferno et al., "An Economic Scoping Study for CO2 Capture Using Aqueous Ammonia," DOE/NETL Final Report, 2005, pp. 1-15.
Drbal et al. (eds.), Power Plant Engineering by Black & Veatch, Chapman & Hall, 1996, pp. 1-879.
Kodama et al., "Development of a new pH-swing CO2 mineralization process with a recyclable reaction solution," Energy, May 2008, vol. 33, pp. 776-784.
Lani et al., "Update on DOE/NETL's Advanced Nox Emissions Control Technology R&D Program," U.S. Department of Energy, National Energy Laboratory, Science Applications International Corporation, Nov. 2006, pp. 1-18.
O'Conner et al., "Aqueous Mineral Carbonation: Mineral Availability, Pretreatment, Reaction Parametrics, and Process Studies," National Energy Technology Laboratory (formerly Albany Research Center), DOE/ARC-TR-04-002, Mar. 2005, 459 pages.

* cited by examiner

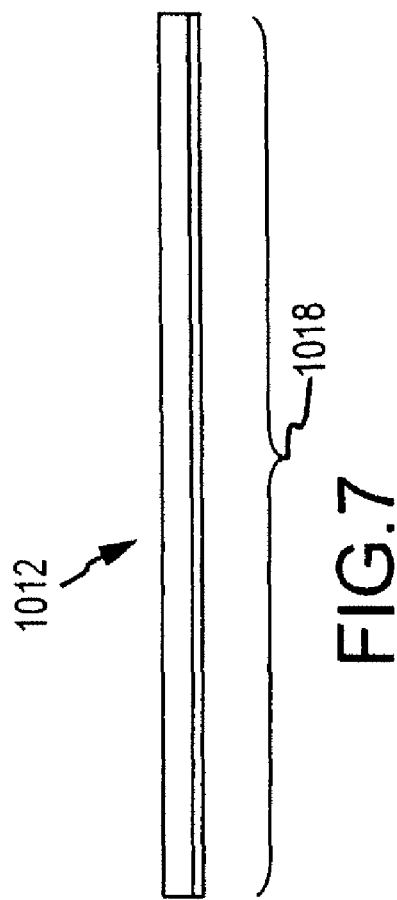
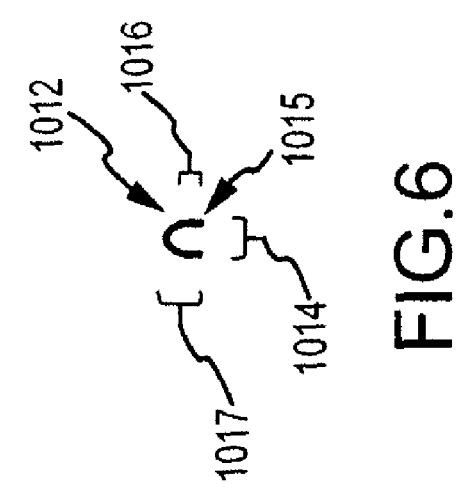
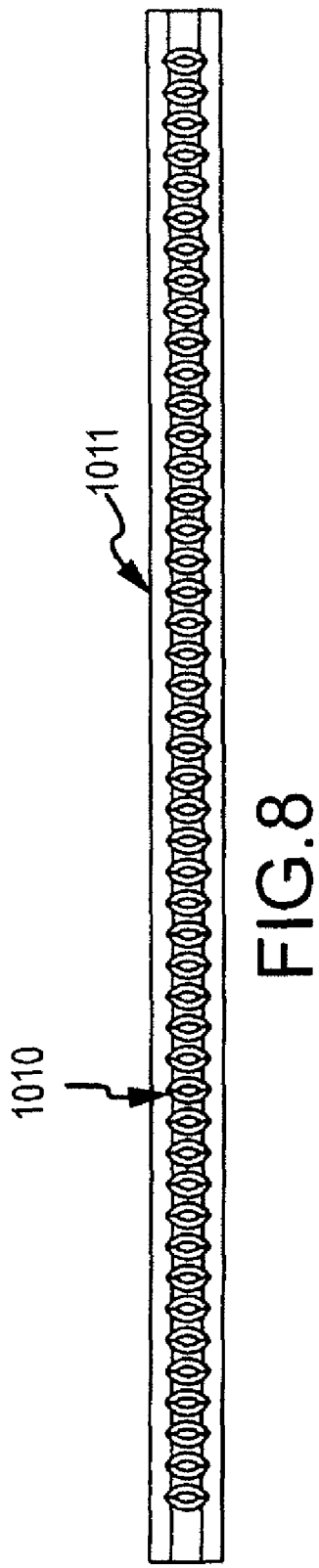

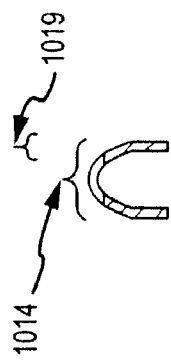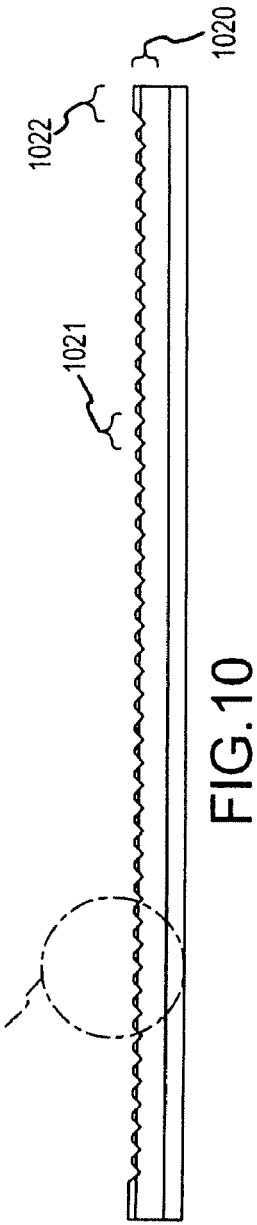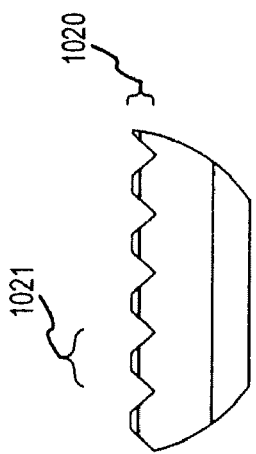

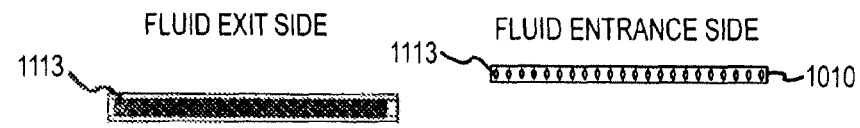
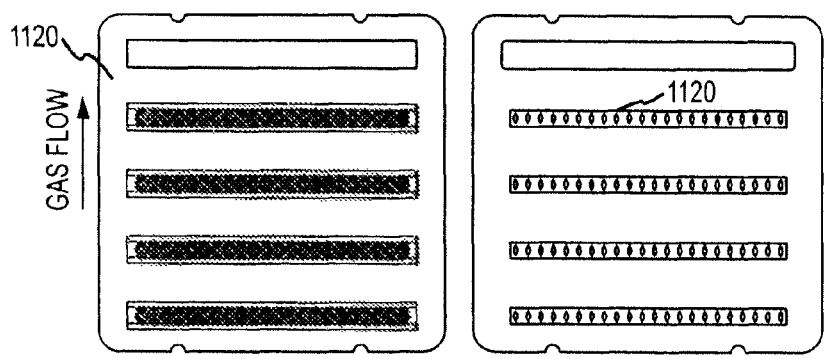
FIG. 25  FIG. 26
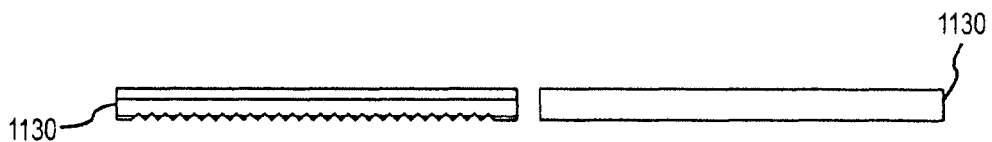
FIG. 27  FIG. 28
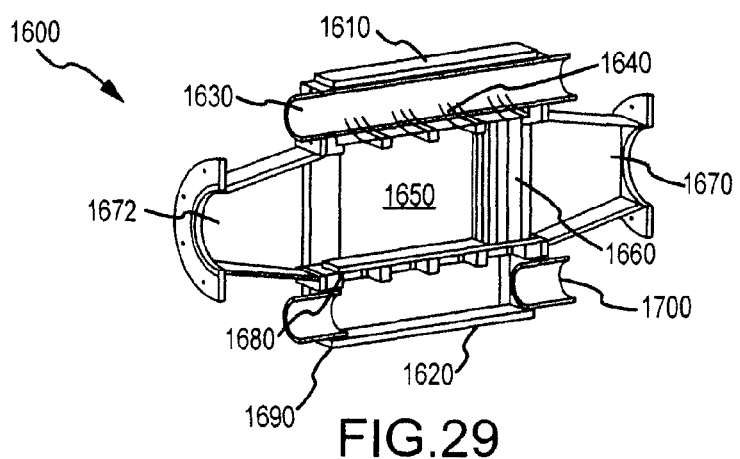
FIG. 29

GAS LIQUID CONTACTOR AND EFFLUENT CLEANING SYSTEM AND METHOD

This application claims the benefit of and is a continuation of application Ser. No. 12/459,685, entitled "Gas Liquid Contactor and Effluent Cleaning System and Method," filed on Jul. 6, 2009, now U.S. Pat. No. 7,866,638, which claims priority from U.S. Provisional Application No. 61/100,564, entitled "System for Gaseous Pollutant Removal," filed on Sep. 26, 2008, U.S. Provisional Application No. 61/100,606, entitled "Liquid Gas Contactor System and Method," filed on Sep. 26, 2008, and U.S. Provisional Application No. 61/100,591, entitled "Liquid Gas Contactor and Effluent Cleaning System and Method," filed on Sep. 26, 2008 and is a continuation-in-part of application Ser. No. 12/012,568, entitled "Two Phase Reactor," filed on Feb. 4, 2008, now U.S. Pat. No. 7,871,063, which is a continuation of U.S. patent application Ser. No. 11/057,539, entitled "Two Phase Reactor," filed on Feb. 14, 2005, now U.S. Pat. No. 7,379,487; all of the disclosures set-forth above are herein specifically incorporated in their entireties by this reference.

BACKGROUND OF THE INVENTION

1. Field of the Invention

The invention relates to a gas liquid contactor and effluent cleaning system and method and more particularly to an array of nozzles configured to produce uniformly spaced flat liquid jets shaped to minimize disruption from a gas flow and maximize gas flow and liquid flow interactions while rapidly replenishing the liquid.

2. Discussion of the Related Art

The absorption of a gas into a liquid is a key process step in a variety of gas liquid contacting systems. Gas liquid contactors, also known as gas liquid reactors, can be classified into surface and volume reactors where the interfacial surface area between the two phases is created at the liquid surface and within the bulk liquid, respectively. There are many examples of surface gas liquid reactors such as rotating disks and liquid jet contactors. Rotating disk generators are disks (rotors) partially immersed in a liquid and exposed to a stream of gas. A thin film of liquid solution is formed on the rotor surface and is in contact with a co-current reagent gas stream. The disk is rotated to refresh the liquid reagent contact with the gas. In a volume gas liquid reactor, the gas phase is dispersed as small bubbles into the bulk liquid. The gas bubbles can be spherical or irregular in shape and are introduced into the liquid by gas spargers. The bubbles can be mechanically agitated to increase the mass transfer.

In many gas liquid contacting systems, the rate of gas transport to the liquid phase is controlled by the liquid phase mass transfer coefficient, k, the interfacial surface area, A, and the concentration gradient, delta C, between the bulk fluid and the gas liquid interface. A practical form for the rate of gas absorption into the liquid is then:

$$\Phi = \phi a = k_G a(p - p_i) = k_L a(C^*_L - C_L)$$

where the variable is the rate of gas absorption per unit volume of reactor (mole/cm3); $\phi$ is the average rate of absorption per unit interfacial area (mole/cm$^2$); a is the gas liquid interfacial area per unit volume (cm$^2$/cm$^3$, or cm$^{-1}$); p and p$_i$ are the partial pressures (bar) of reagent gas in the bulk gas and at the interface, respectively; $C_L^*$ is the liquid side concentration (mole/cm$^3$) that would be in equilibrium with the existing gas phase concentration, p$_i$; $C_L$ (mole/cm$^3$) is the average concentration of dissolved gas in the bulk liquid; and k$_G$ and k$_L$ are gas side and liquid side mass transfer coefficients (cm/s), respectively.

In the related art, there are many approaches to maximizing the mass transfer and specific surface area in gas contactor systems. The principal approaches include gas-sparger, wetted wall jet, and spray or atomization. The choice of gas liquid contactor is dependent on reaction conditions including gas/liquid flow, mass transfer, and the nature of the chemical reaction. Table 1 summarizes various mass transfer performance features of some related art gas liquid reactors. To optimize the gas absorption rate, the parameters k$_L$, a, and ($C_L^*-C_L$) must be maximized. In many gas liquid reaction systems the solubility of the $C_L^*$ is very low and control of the concentration gradient, therefore, is limited. Thus, the primary parameters to consider in designing an efficient gas liquid flow reactor are mass transfer and the interfacial surface area to reactor volume ratio, which is also known as the specific surface area.

TABLE 1

COMPARISON OF CONVENTIONAL GAS LIQUID REACTOR PERFORMANCE

| Reactor Type | (%, gas liquid volumetric flow rate ratio) | k$_G$ (mole/cm$^2$s atm) × 10$^4$ | k$_L$ (cm$^2$s) × 10$^2$ | a (cm$^{-1}$) | k$_L$a (s$^{-1}$) × 10$^2$ |
|---|---|---|---|---|---|
| Packed Column (counter-current) | 2-25 | 0.03-2 | 0.4-2 | 0.1-3.5 | 0.04-7.0 |
| Bubble Reactors | 60-98 | 0.5-2 | 1-4 | 0.5-6 | 0.54-24 |
| Spray Columns | 2-20 | 0.5-2 | 0.7-1.5 | 0.1-1 | 0.07-1.5 |
| Plate Column (Sieve Plate) | 10-95 | 0.5-6 | 1-20 | 1-2 | 1.0-40 |

There are various gas liquid contacting reactors whose performance is dependent on interfacial contact area. For example, the chemical oxygen iodine laser (COIL) produces laser energy from a chemical fuel consisting of chlorine gas (Cl$_2$) and basic hydrogen peroxide (BHP). The product of this reaction is singlet delta oxygen, which powers the COIL. The present technology uses circular jets of liquid BHP mixed with Cl$_2$ gas to produce the singlet delta oxygen. In a typical generator, the jets are on the order of 350 microns in diameter or smaller. To generate the jets, the liquid BHP is pushed under pressure through a nozzle plate containing a high density of holes. This produces a high interfacial surface area for contacting the Cl$_2$ gas. The higher the surface area, the smaller the generator will be and the higher the yield of excited oxygen that can be delivered to the laser cavity. Smaller and more densely packed jets improve the specific surface area, but are prone to clogging and breakup. Clogging is a serious problem since the reaction between chlorine and basic hydrogen peroxide produces chlorine salts of the alkali metal hydroxide used to make the basic hydrogen peroxide. Clogging also limits the molarity range of the basic hydrogen peroxide, which reduces singlet oxygen yield and laser power. The heaviest element of the COIL system is this chemical fuel. Problems inherent in producing the fuel increase the weight and decrease the efficiency of the COIL laser as a whole. Thus, there exists a need for a COIL laser that has increased efficiency and lower weight than present designs.

In another example, gas liquid contactors are also used in aerobic fermentation processes. Oxygen is one of the most important reagents in aerobic fermentation. Its solubility in aqueous solutions is low but its demand is high to sustain culture growth. Commercial fermenters (>10,000 L) use agitated bubble dispersion to enhance the volumetric mass transfer coefficient $k_{La}$. The agitation helps move dissolved oxygen through the bulk fluid, breaks up bubble coalescence, and reduces the boundary layer surrounding the bubbles. The interfacial area in these systems is increased by increasing the number of bubbles in the reactor and reducing the size of the bubble diameter. However, oxygen mass transfer to the microorganism is still constrained by the relatively small interfacial surface area of the bubble and the short bubble residence times. Current sparger systems (bubble dispersion) show a relatively small volumetric mass transfer coefficient $k_{La}$ (about 0.2/s); therefore, a new approach for generating maximum interfacial surface area is desired to overcome these mass transfer limitations.

In designing systems for industrial applications, consideration must be given to both cost and efficiency. Conventional wisdom generally precludes that both can be optimally obtained simultaneously. In the case of gas liquid contactors, the conventional wisdom is generally maintained in industrial applications such as chemical processing, industrial biological applications, pollution control, or similar processes requiring reacting or dissolving a gas phase chemistry with a liquid phase in a dynamic flow system.

In the example of pollution control, the standard methodology of removing a target compound or compounds in a wet process is a countercurrent flow system utilizing fine droplets of liquid phase falling through a flowing gas phase 180° in an opposite direction. Normally, gravity is used to draw the liquid phase to a capture sump at the base of a column or tower. The gas phase flows up through the same column or tower. This gas phase is then captured for further processing or released to the atmosphere.

In order to accommodate for larger scale chemical processes, the column or tower must be scaled linearly with the size of the desired process either by length or diameter. The current logical methodology is to increase the scale of a single unit process since capital costs of a single unit process generally do not scale linearly with size.

Another downside of standard countercurrent, gravitational or aerosol/droplet gas liquid contactors is that gas flows must be at a low enough velocity such that gravity effects are greater than the buoyancy of the droplets. Regardless, significant evaporation of the liquid reactant generally does occur since contact times are long, requiring significant capture of that vapor prior to secondary processing or release.

SUMMARY OF THE INVENTION

Accordingly, the invention is directed to a gas liquid contactor and effluent cleaning system and method that substantially obviates one or more of the problems due to limitations and disadvantages of the related art.

An advantage of the invention is to provide large volumetric mass transport coefficients and resultant small size, low pressure sorbent operation requiring minimal pumping capability across the system.

Another advantage of the invention is to provide a gas liquid contactor with a reduced system footprint as compared to the related art.

Yet another advantage of the invention is to provide a gas liquid contactor with a module design.

Still another advantage of the invention is to provide a gas liquid contactor that uses enhanced specific surface area of a flat jet (e.g., thin flat liquid jet) to improve the performance of gas liquid reactors.

Another advantage of the invention is to provide a modular system that, due to its smaller size, footprint, factory build, and high contact area, has a fractional cost and site impact and potentially higher quality and unit to unit consistency as compared to conventional systems for the same reaction or scrubbing capacity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An embodiment of the invention is directed towards a gas liquid contactor module. The gas liquid contactor module includes a liquid inlet, gas inlet, and gas outlet. The contactor module also includes an array of nozzles in communication with the liquid inlet and the gas inlet. The array of nozzles is configured to produce uniformly spaced flat liquid jets shaped to minimize disruption from a gas. The gas liquid separator is capable of allowing liquid to pass through while substantially preventing gas from passing through. The liquid outlet is in fluid communication with the gas liquid separator.

Another embodiment of the invention is directed towards a method of processing gas phase molecules with a gas liquid contactor. The method includes forming a plurality of essentially planar liquid jets, where each of said liquid jets includes a planar sheet of liquid, and where the plurality of liquid jets is arranged in substantially parallel planes. Also, the method includes providing gas with at least one reactive or soluble gas phase molecule and removing or reacting at least a portion of the gas phase molecule by a mass transfer interaction between the gas phase molecule and the liquid jets.

Still another embodiment of the invention is directed towards a gas liquid contacting system. The gas liquid contactor system includes a reaction chamber, a gas inlet, a gas outlet, and a liquid plenum coupled to the reaction chamber. A nozzle array is coupled to the liquid plenum; the nozzle array is configured to provide essentially planar liquid jets, where each of said liquid jets includes a planar sheet of liquid, and where the plurality of liquid jets is arranged in substantially parallel planes. The system also includes a gas fluid separator coupled to the reaction chamber.

Yet another embodiment of the invention is directed towards a gas liquid contactor. The gas liquid contactor includes a fluid plenum configured to provide a contacting liquid and a contacting chamber in communication with the fluid plenum and configured to receive the contacting liquid from the fluid plenum. A gas inlet and outlet are in communication with the contacting chamber. The gas liquid contactor system is configured to provide mass transfer interaction having a volumetric mass transfer coefficient in a range from about 5 sec$^{-1}$ to about 250 sec$^{-1}$.

Still yet another embodiment of the invention is directed towards a gas phase molecule processing system. The gas phase molecule processing system includes a plurality of modular gas liquid contactors configured to be arranged in parallel or series in order to be sized as needed for gas phase molecule processing.

Another embodiment of the invention is directed towards a gas liquid contacting system that uses the enhanced specific surface area of a flat jet (e.g., thin flat liquid jet) to improve the performance of gas liquid flow reactors. In this embodiment, a rigid nozzle plate containing a plurality of orifices that generate very thin flat jets is used. The flat jet orifice has in one configuration a V-shaped chamber attached to the source of the liquid reagent. The flat jet orifice may have a pair of opposing planar walls attached to a vertex of the V-shaped chamber. The flat jet nozzle may have a conical nozzle attached to an opposite end of the opposing planar walls as the V-shaped chamber. In another configuration, the jet orifice may have a circular orifice attached to the liquid source chamber. The flat jet nozzle may have a V-shaped groove intersecting the circular orifice to create an oval shaped orifice. The flat jet orifice may be oriented perpendicularly, opposed or parallel to the inlet source of gas. A smallest passage of the flat jet nozzles may be larger than about 250 µm. The nozzle may produce a liquid flat jet that has a width that is at least ten times its thickness. The flat jets may be made as thin as about 10 µm or smaller and be separated by only 1 mm greater or smaller to generate high packing jet densities ($\beta$=0.01) and large specific surface areas of about 20 cm$^{-1}$. This is about 5 to about 10 times significant improvement over the specific surface area values listed in Table 1. The thin jet allows more of the liquid to be exposed to the gas flow generating a higher yield of reaction product per unit liquid mass flow than conventional contactors.

Another embodiment of the invention is directed towards providing a gas liquid contactor that generates a plurality of thin flat jet streams that are closely and uniformly spaced, that have high specific surface area, that have uniform jet velocity, that are aerodynamically shaped to minimize gas flow disruption of the liquid jets, that have orifices free from salt obstruction and clogging and that are operated within cross-flow, co-flow, counter-flow and parallel flow gas process streams.

Still another embodiment of the invention is directed towards an improved COIL. The COIL includes an excited oxygen generating chamber with an inlet for a source of chlorine and a flat jet nozzle for a source of BHP. The nozzle has a multitude of orifices that have a minimum dimension that is greater than about 600 µm in length and it generates thin flat jets of high specific surface area. A photon generating chamber has a passage coupled to the excited oxygen generating chamber and an inlet for iodine. The BHP orifice may produce a flat jet of basic hydrogen peroxide that has a width that is at least ten times its thickness. The source of hydrogen peroxide may be a basic hydrogen peroxide which uses a single base or a mixture of bases. The single base may be potassium hydroxide or any of the alkali hydroxides. The nozzle may have a pair of parallel opposing plates having a second end attached to a conical nozzle. The nozzle may have a pair of V-shaped plates coupled to a first end of the pair of parallel opposing plates.

Still another embodiment of the invention is directed towards an improved COIL that includes an excited oxygen generating chamber with an inlet for a source of hydrogen peroxide and a flat jet nozzle for a source of alkali (Li, Na, K) and alkaline earth (Mg, Ca) hypochlorite. In this embodiment, the hydrogen peroxide is a gas. The nozzle has a multitude of orifices that have a minimum dimension that is greater than about 600 µM in length and it generates thin flat jets of high specific surface area. A photon generating chamber has a passage coupled to the excited oxygen generating chamber and an inlet for iodine.

Yet another embodiment of the invention is directed towards an improved fermentation reactor that includes an inlet source of oxygen, $CO_2$, or some other nutrient or feed gas and a nozzle containing a multitude of orifices for generating flat jets of fermentation media.

Another embodiment of the invention is to provide a high surface area flat jet generator for use in gas scrubbing processes where gases such as ammonia, carbon dioxide, acid gases, hydrogen sulfide or sulfur dioxide are separated from a gas by liquid contact.

Still another embodiment of the invention is to provide a high surface area injector device for use in gas liquid jet combustor engines.

Yet another embodiment is directed towards a high performance gas liquid contactor. The gas liquid contactor includes a fluid plenum for providing a contacting liquid. The gas liquid contactor also includes a contacting chamber in communication with the fluid plenum and receiving the contacting liquid from the fluid plenum. The gas liquid contactor also includes a gas inlet in communication with the contacting chamber for providing a gas and a gas outlet in communication with the contacting chamber to carry away the gas. Also, the gas liquid contactor is characterized by a specific surface area in a range between about 1 cm$^{-1}$ to about 50 cm$^{-1}$ and a gas pressure drop of less than about 5 Torr.

Another feature includes that the specific surface area is in a range between about 10 cm$^{-1}$ to about 20 cm$^{-1}$. The gas pressure drop through the gas liquid contactor in this embodiment ranges from about 5 Torr to about 10 Torr. One feature of the embodiments includes that a reactor gas flow volume for a coal fired power plant output can be greater than about 2500 actual cubic feet per minute per molecular weight (MW) of plant output through a reactor volume of less than about 15 cubic feet, or gas flow rate to reaction chamber volume ratios in a range between 100 min$^{-1}$ and 1000 min$^{-1}$. Another feature includes that a liquid driving pressure for displacing the contacting liquid into the contacting chamber is at a low pressure, e.g., less than 50 pounds per square inch (psi). Another feature includes that the liquid driving pressure is less than about 20 pounds per square inch (psi). Yet another feature includes that about 99% of liquid entrainment is removed. Still another feature includes that the contacting liquid is displaced through a plurality of nozzles that produce jets of flat liquid, and the plurality of nozzles arranged such that the jets form a plurality of parallel rows of jets. Another feature includes that the gas flows in the contacting chamber parallel to the rows of jets.

Another embodiment of the invention is directed towards a method of contacting a gas with a liquid. The method includes providing a gas liquid contactor including a fluid plenum for providing a contacting liquid, providing a contacting chamber in communication with the fluid plenum and receiving the contacting liquid from the fluid plenum. The contacting chamber includes a gas inlet in communication with the contacting chamber for providing a gas and a gas outlet in communication with the contacting chamber to carry away the gas. The gas liquid contactor is characterized by a specific surface area of between about 1 cm$^{-1}$ to about 50 cm$^{-1}$. The gas is driven at a pressure drop of less than about 0.05 psi per gas flow lineal foot of contactor.

Another feature includes a specific surface area in a range of about 10 cm$^{-1}$ to about 20 cm$^{-1}$. Another feature is directed towards a method to drive the contacting liquid into the contacting chamber at a pressure less than about 20 pounds per square inch. Another feature includes that about 99% of liquid entrainment is removed. Another feature includes that the contacting liquid is displaced through a plurality of nozzles that produce jets of flat liquid, the plurality of nozzles arranged such that the nozzles form a plurality of parallel rows of jets. Another feature includes that the gas flows in the contacting chamber parallel to the sheets of jets.

Another embodiment of the invention is directed towards a gas liquid contactor including a plurality of essentially planar liquid jets, each of the liquid jets comprising a planar sheet of liquid, the plurality of liquid jets lying in parallel planes. A contactor chamber housing the planar liquid jets wherein the contactor chamber has an input and an output defining a flow of gas. One feature includes planar sheets having a thickness in a range of about 10 μm to about 1000 μm. Another feature includes that the thickness is in a range of about 10 μm to about 100 μm. Another feature includes that the thickness is in a range of about 10 μm to about 50 μm. Another feature includes that each of the planar sheets of liquid is spaced from the adjacent planar sheet by a distance greater than about 10 μm in a single row and less than about 2 cm in adjacent rows of nozzles. Another feature is that the gas liquid contactor includes a plurality of nozzles producing the plurality of liquid jets, however other geometric configurations will work. Another feature includes that each of the plurality of nozzles have an approximately elliptical exit. Another feature includes that the plurality of nozzles is arranged on a plate. Another feature includes that the plurality of nozzles is arranged on the plate such that the flow of gas is parallel to a flat face of the jets of flat liquid. Another feature includes that the plurality of nozzles is arranged in a plurality of rows forming an array of nozzles and liquid jets. Another feature is that the gas liquid contactor module includes an anti-splash grid. Another feature includes that a plurality of members of the anti-splash grid is angled to assist in a flow of the liquid after traveling through the contactor chamber. Another feature is that the gas liquid contactor module includes a mist eliminator.

Yet another embodiment of the invention is directed towards a nozzle for creating a flat liquid jet, the nozzle includes a plate for housing the nozzle. The embodiment also includes a fluid entrance aperture of the nozzle having a V-shape in cross-section and a fluid exit aperture of the nozzle having a conical exit in cross-section. One feature is that a narrowest aperture of the fluid entrance aperture meets a narrowest aperture of the fluid exit aperture to form a nozzle narrowest aperture. Another feature is that the nozzle narrowest aperture is greater than about 600 μm. Another feature is that the base of the fluid exit aperture is approximately an oval.

Still another embodiment of the invention is directed towards a plurality of nozzles for creating thin flat liquid jets including a channel, approximately V-shaped, forming a fluid entrance aperture for the plurality of nozzles. The embodiment also includes a plurality of fluid exit apertures in the channel, the fluid exit apertures having a conical cross section. Another feature is that the plurality of fluid exit apertures have an elliptical shape. One feature is that a narrowest aperture of the conical cross section and the plurality of nozzles is greater than about 600 μm.

Yet another embodiment of the invention is directed towards an effluent processing system that includes a plurality of nozzle plates for spraying a solvent. Each of the plurality of nozzle plates has a plurality of nozzles. The invention also includes a scrubber unit, for cleaning a flue gas, housing the plurality of nozzle plates. One feature is that the plurality of nozzles creates an array of flat liquid jets. Another feature is that the plurality of flat liquid jets is parallel to a flow of the flue gas. Another feature is that the plurality of flat liquid jets is arranged in rows. Another feature is that the system includes a flue gas cooler. Another feature is that the system includes a flue gas heater. Another feature is that the system includes a second scrubber unit. Another feature is that the scrubber unit includes a gas liquid fluid separator. Another feature is that the system includes a solvent pump for pumping the solvent to the scrubber unit and the plurality of nozzles. Another feature is that the system includes a solvent catch tank for collecting solvent passing through the scrubber unit. Another feature is that the plurality of nozzle plates is removable from the scrubber unit.

Another embodiment of the invention is directed towards an effluent processing system including a plurality of nozzles for spraying a solvent. The embodiment also includes a scrubber unit, for cleaning a flue gas, housing the plurality of nozzles. One feature is that the plurality of nozzles creates a plurality of flat liquid jets. Another feature is that the plurality of flat liquid jets is parallel to a flow of the gas. Another feature is that the plurality of flat liquid jets is arranged in rows.

Still another embodiment of the invention is directed towards a method of contacting a liquid with a gas. The method includes providing a contact chamber having a liquid entrance point, creating a plurality of flat liquid jets in the contact chamber, and providing a flow of gas parallel to the plurality of flat liquid jets. One feature is that the liquid entrance point includes a plate for housing a plurality of nozzles. Another feature is that the plurality of nozzles has a fluid entrance aperture having a U-shape in cross-section and a fluid exit aperture of the nozzle having a conical exit in cross-section. Another feature is that the method further includes arranging the plurality of liquid jets in a plurality of rows.

Yet another embodiment of the invention is directed towards a gas liquid contactor including a fluid plenum for providing a contacting liquid, a contacting chamber in communication with the fluid plenum for receiving the contacting liquid from the fluid plenum, a gas inlet in communication with the contacting chamber for providing a gas and a gas outlet in communication with the contacting chamber to carry away the gas. The specific surface area for the contacting chamber is in a range from about 10 cm$^{-1}$ to about 20 cm$^{-1}$ and a liquid side mass transfer coefficient for the contacting chamber is greater than about 0.02 cm/s. One feature may be that the liquid side mass transfer coefficient is greater than about 0.1 cm/s. Another feature may be that the liquid side mass transfer coefficient is greater than about 1 cm/s. Another feature may be that the liquid side mass transfer coefficient is greater than about 10 cm/s. Another feature may be that the liquid side mass transfer coefficient is greater than about 25 cm/s. Another feature may be that the liquid side mass transfer coefficient is less than or equal to about 50 cm/s.

Another embodiment is directed towards a gas liquid contactor including a fluid plenum for providing a contacting liquid, a contacting chamber in communication with the fluid plenum for receiving the contacting liquid from the fluid plenum, a gas inlet in communication with the contacting chamber for providing a gas and a gas outlet is in communication with the contacting chamber to carry away the gas. A specific surface area is in a range from about 10 cm$^{-1}$ to about 20 cm$^{-1}$ and a volumetric mass transfer coefficient is greater than about 0.2 sec$^{-1}$. One feature may be that the volumetric mass transfer coefficient is greater than about 1 sec$^{-1}$. Another feature may be that the volumetric mass transfer coefficient is greater than about 10 sec$^{-1}$. Another feature may be that the volumetric mass transfer coefficient is greater than 100 sec$^{-1}$. Another feature may be that the volumetric mass transfer coefficient is greater than 1000 sec$^{-1}$. Another feature may be that the volumetric mass transfer coefficient is less than 2500 sec$^{-1}$.

Yet another embodiment is directed towards a gas liquid contactor that includes a fluid plenum for providing a contacting liquid. The contactor also includes a plurality of nozzles in fluidic communication with the fluid plenum that produce a plurality of flat liquid jets. The contacting includes a chamber in communication with the fluid plenum and receiving the contacting liquid from the fluid plenum through the plurality of nozzles. A gas inlet is in communication with the contacting chamber for providing a gas, and a gas outlet in communication with the contacting chamber to carry away the gas. One feature may be that a jet length to jet width ratio is about 10:1. Another feature may be that a jet length to jet width ratio is greater than about 8:1 but less than about 12:1. Another feature may be that a jet length to jet width ratio is greater than about 10:1. Another feature is that each the plurality of flat liquid jets have a thickness of about 10 μm to about 100 μm. Another feature is that a jet length of each of the plurality of flat liquid jets is generally greater than about 5 cm but less than about 30 cm. Another feature is that jet velocities of the plurality of flat liquid jets is about 10 m/s.

Still another embodiment is directed towards a high performance gas liquid contactor. The gas liquid contactor includes a fluid plenum for providing a contacting liquid. The contactor includes a contacting chamber in communication with the fluid plenum and receiving the contacting liquid from the fluid plenum. A gas inlet is in communication with the contacting chamber for providing a gas and a gas outlet is in communication with the contacting chamber to carry away the gas. The gas liquid contactor is characterized by an enhanced specific surface area in a range between about 1 cm$^{-1}$ to about 50 cm$^{-1}$ and a very low gas pressure drop of less than about 5 Torr or about 1 psig. Another feature is that the very low gas pressure drop is less than about 0.05 psi per lineal gas liquid contactor contact distance. Another feature is that the very low gas pressure drop is less than about 1 psi for the entire gas liquid contact system including gas heaters, gas chillers, and demisters. Another feature is that the contacting liquid is displaced through a plurality of nozzles that produce jets of flat liquid when a liquid flows through the plurality of nozzles, the plurality of nozzles arranged such that the jets form a plurality of parallel rows of jets. Another feature is that the gas flows in the contacting chamber parallel to the rows of jets.

Another embodiment is directed towards a high performance gas liquid contactor. The gas liquid contactor includes a fluid plenum for providing a contacting liquid. The gas liquid contactor includes a contacting chamber in communication with the fluid plenum and receiving the contacting liquid from the fluid plenum. A gas inlet is in communication with the contacting chamber for providing a gas, and a gas outlet is in communication with the contacting chamber for carrying away the gas. The gas liquid contactor is characterized by an enhanced specific surface area in a range of about 1 cm$^{-1}$ to about 50 cm$^{-1}$ and a liquid driving pressure for displacing the contacting liquid into the contacting chamber is less than about 15 psi. One feature is that the liquid driving pressure for displacing the contacting liquid into the contacting chamber is less than about 10 psi. Another feature is that the contacting liquid is displaced through a plurality of nozzles that produce jets of flat liquid when a liquid flows through the plurality of nozzles, the plurality of nozzles arranged such that the jets form a plurality of parallel rows of jets. Another feature is that the gas flows in the contacting chamber parallel to the rows of jets.

Still another embodiment of the invention is directed towards a high performance gas liquid contactor module. The module includes a fluid plenum for providing a contacting liquid and a contacting chamber in communication with the fluid plenum to receive the contacting liquid from the fluid plenum. A gas inlet is in communication with the contacting chamber for providing a gas and a gas outlet is in communication with the contacting chamber for carrying away the gas. The gas liquid contactor is characterized by a pollutant removal percentage of greater than about 80%. One feature is that the contactor volume is less than about 0.5 m$^3$. Another feature is that the pollutant removal percentage is greater than about 90%. Another feature is that the pollutant removal percentage is greater than about 95%. Another feature is that the pollutant removal percentage is about 99% or greater. Another feature is that a plurality of modular gas liquid contactors is designed to be arranged in parallel in order for the aggregate system to be sized as needed. Another feature may be that the plurality of modular gas liquid contactors is arranged vertically. Another feature may be that the plurality of modular gas liquid contactors is arranged horizontally. Another feature may be that the plurality of modular gas liquid contactors is arranged serially. Another feature may be that the system parasitic load is less than about 5%. Another feature is that the system parasitic load is less than about 1%. Another feature is that a scrubbing removal percentage for a pollutant such as $SO_2$ is greater than about 90%. Another feature is that a scrubbing removal percentage for a pollutant such as about $SO_2$ is greater than about 95%. Another feature is that a scrubbing removal percentage for a pollutant such as $SO_2$ is greater than about 99%.

Yet another embodiment is directed towards a gas liquid contactor module including a number of combined features. The module includes a liquid inlet to provide a reactive or solvent liquid to the contactor module. It also includes a gas inlet and outlet which provides a conduit for the reactive gas or gas solute or gas phase reactant to pass through the contactor module. The distribution of fluid through the contactor is provided by an array of nozzles in liquid communication with the liquid inlet where that array of nozzles is configured to produce uniformly spaced flat liquid jets shaped to minimize disruption from a gas flowing through the contactor. Across the contactor chamber from those liquid jet nozzles is a gas liquid separator capable of allowing liquid to pass through while substantially preventing gas from passing through, which in turn is in liquid contact with a liquid outlet.

Another embodiment of the invention is directed towards a method of processing gas phase molecules with a gas liquid contactor. This method includes a plurality of essentially planar liquid jets where each of those liquid jets comprises a planar sheet of liquid. The plurality of liquid jets is arranged in substantially parallel planes. The method also provides gas with at least one reactive or soluble gas phase molecule. In this method, at least a portion of the gas phase molecule is removed by a mass transfer interaction between the gas phase molecule and the liquid jets.

Yet another embodiment of the invention is directed towards a gas liquid contacting system including a number of combined subsystems. Those combined subsystems include a reaction chamber, a gas inlet coupled to the reaction chamber, a gas outlet coupled to the reaction chamber, a liquid plenum coupled to the reaction chamber, a nozzle array coupled to the liquid plenum, and a gas fluid separator coupled to the reaction chamber. With respect to the nozzle array, the nozzle array is configured to provide essentially planar liquid jets. Furthermore, each liquid jet comprises a planar sheet of liquid and those jets are arranged in a plurality of liquid jets lying essentially in substantially parallel planes.

Another embodiment of the invention is directed towards a gas liquid contactor where a fluid plenum is configured to provide a contacting liquid to a contacting chamber. A second feature is that the contacting chamber is in communication with the fluid plenum and itself is configured to receive the contacting liquid from the fluid plenum. Thirdly, the contactor has a gas inlet and a gas outlet in communication with the contacting chamber. Overall, the gas liquid contactor system is configured to provide mass transfer interaction having a volumetric mass transfer coefficient in a range from about 5 $sec^{-1}$ to about 250 $sec^{-1}$.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is cross-sectional view of a precursor to a nozzle bank according to another embodiment of the invention;

FIG. 7 is a side view of the precursor to the nozzle bank shown in FIG. 6;

FIG. 8 is a top view of a nozzle bank according to another embodiment of the invention;

FIG. 9 is a side view of the nozzle bank of FIG. 8;

FIG. 10 is a cross-sectional view of the nozzle bank of FIG. 8 along cut B shown in FIG. 9;

FIG. 11 is a detail view of the nozzle bank of FIG. 8 as defined by cut A shown in FIG. 9;

FIG. 25 is a fluid side exit view of a nozzle plate with a nozzle bank removed;

FIG. 26 is the fluid entrance side view of the nozzle plate of FIG. 25;

FIG. 27 is a top view of a precursor for a nozzle bank;

FIG. 28 is a side view of the precursor of FIG. 27;

FIG. 29 is a cut away view of a schematic of a gas liquid contactor according to another embodiment of the invention;

Figure 1:
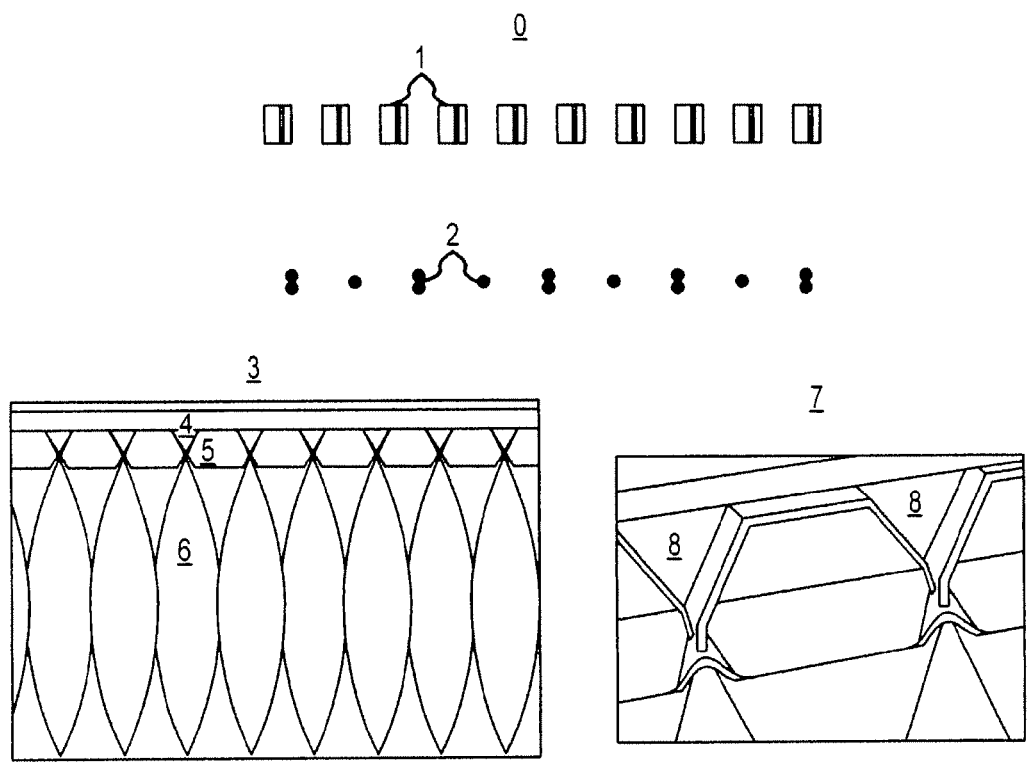
FIG. 1 is a block diagram of a system for producing a flat jet according to an embodiment of the invention.

DETAILED DESCRIPTION OF THE
ILLUSTRATED EMBODIMENTS

The invention relates to a gas liquid contactor and effluent cleaning system and method and more particularly to an array of nozzles configured to produce uniformly spaced flat liquid jets shaped to minimize disruption from a gas. Moreover, various embodiments directly provide a plurality of small single unit processes, aggregated into modules, which, by their design, overcome the shortcomings of conventional designs. Modularizing single unit processes allows for small systems which may be scaled by simply multiplying the module by convenient integers to accommodate the scale of the process.

Moreover, a single gas liquid contactor capable of producing a thin flat liquid jet can be readily multiplied and aggregated into a module or modules that perform within a range of gas flow rates in a very compact design, dramatically smaller than a conventional countercurrent reactor for an equivalent reaction yield. This aggregation into a module or modules may be conducted serially or in parallel.

In the serial embodiment modules are incorporated one after another with the gas flowing sequentially through each module. Of course, some modules may be bypassed or have recirculation loops. Also, the modules can run the same liquid phase, or different liquid phases depending on the desired selectivity of the target reactions of gas molecule capture and sequence.

In a parallel embodiment modules are incorporated next to or on top of each other such that all processing or scrubbing the same gas feed, with each module processing roughly equivalent amounts of gas or gas molecules as an adjacent module. In general, parallel modules run identical liquid phases to each other since processing in each is contemporaneous with adjacent modules.

An embodiment of the invention is targeted to accommodate higher gas flow rates or smaller mass transfer coefficients than the design standard for this single module, the module itself may be multiplied in convenient integer units into a larger functional module having longer contact times without formally splitting the target process into redundant systems. Moreover, this design logic may extend to other sub-modules in the chemical processor, such as the liquid capture systems and liquid delivery systems, all accommodating a single gas flow main plenum and single liquid processing stage. The expensive capital equipment, such as pumps and blowers from the gas and/or liquid flow systems, can be linearly scaled to feed the incremental modules; these modules, by their unique designs, couple together to form a functionally single process in a very compact design.

In another embodiment of the invention, the modules may be designed to force the liquid phase at very high rates using liquid jets, e.g., thin flat jets, thereby negating the reliance on gravity or buoyancy to provide mass transport. The liquid may flow at very high rates, the gas phase can also flow at very high velocities transversely, along the same vector, or in counter current flows. Because all flows are at high velocities, the direction of flow can be chosen by design convenience rather than by gravity or thermal convection limitations. Moreover, the mass transfer and volumetric transfer coefficients can be very high and the contact length can be, again, scaled modularly to accommodate for both loading and reaction yield.

In another embodiment of the invention, a gas liquid contactor is configured to achieve selective and high mass transfer rates of gas reactants from high volumetric gas flow rates into continuously replenished liquids confined in small system volumes. Also, in various methods of the invention large dense packed arrays of high velocity stable liquid jets, e.g., thin flat liquid jets, are configured to interact with a high velocity gas flow. Jet formation orifices and densities may be optimized based on liquid sorbent or reactant characteristics such as viscosity and surface tension. In general terms, with no consideration for chamber size or overall processing scale, as liquid viscosity increases, liquid jet stability increases. As such, nozzle density in the nozzle array can increase and nozzle size can decrease. However, this is not required, but can be desirable to decrease jet to jet spacing, thus increasing and optimizing specific surface area of the contactor. In contrast, lower surface energies tend to destabilize the jets, leading to small droplet formation in some conditions, which is not desired in this invention and which is more typical of the current art. In the case of lower surface energies, lower liquid pressure and larger nozzle sizes might be indicated to optimize jet properties for a given fluid.

An embodiment of the invention significantly increases the efficiency of processes for gas reactants and liquid reactants over conventional methods and systems. The efficiencies of the method and system are achieved from the large volumetric mass transport coefficients and resultant small size, low pressure sorbent operation requiring minimal pumping capability across the system due to the low resistance of the liquid jets and the modular and combinable nature of the design. Therefore, unexpected results of embodiments of the invention are achieved, e.g., roughly equivalent performance is achieved with reference to conventional reactors but with a footprint which can be at least ten times smaller and capital cost less than at least half of conventional gas liquid contactors.

An embodiment of the invention is directed towards a gas liquid contactor module. The gas liquid contactor module includes a liquid inlet and outlet and a gas inlet and outlet. The module also includes an array of nozzles in communication with the liquid inlet and the gas inlet where the array of nozzles is configured to produce uniformly spaced flat liquid jets shaped to minimize disruption from a gas. The module also includes a gas liquid separator capable of allowing liquid to pass through while substantially preventing gas from passing through. The module may be connected to other modules in series or in parallel.

The module may be manufactured from a plurality of different materials, e.g., copper, nickel, chrome, steel, aluminum, coated metals, and combinations thereof. In addition, the module may include a plastic material, or at least one of structural polymers, polyimides, composites and combinations thereof.

The array of nozzles may be formed in a plurality of different configurations, e.g., in a staggered configuration. In one staggered configuration a first row of nozzles, a second row of nozzles and a third row of nozzles, are arranged such that the second row of nozzles is offset and positioned between the first and third row of nozzles.

The array of nozzles may also include a plurality of nozzles spaced apart by a predetermined dimension. The nozzles may include at least two nozzles separated by a distance greater than about 0.2 cm. The nozzles may include any number of rows and columns. In a preferred embodiment, at least three rows of nozzles are provided and separated by a uniform distance. The distance between nozzles may be in a range from about 0.1 cm to about 5.0 cm.

The nozzles may be formed from liquid channels having a number of different geometric shapes, e.g., a U-shaped channel, V-shaped, and the like. The channel may be formed using various methods including, but not limited to, machining or otherwise forming of a metal, composite, or ceramic plate, or by machining nozzle orifices in a tube or portion of a tube. When machining a single plate, a V or U-shaped channel is machined into the liquid side of the plate. These channels are then bisected on the process side of the plate by a second V-shaped groove, the depth of which penetrates into the liquid channel space. Depending on the depth of the second groove, the resulting hole or nozzle formed by the intersection of the liquid channel and the process-side channel can be different sizes.

A higher penetration intersection results in larger nozzles. That is, the amount of intersection of the cone into the V or U-shaped channel results in a larger nozzle. When forming nozzles in tubes, a tangential cut is made at about a 90° angle to the axis of tube radius on the outside of the radius (the process-side). Depending on the depth of this cut and the radius of the tube, both dimension (smallest to largest cross section) and size of the resulting nozzle can be changed; deeper cuts result in larger nozzles. The liquid channel feeding the nozzle may have depth greater than about 2 mm. In embodiments of the invention the channel may have depth in a range from about 2 mm to about 20 mm.

In another embodiment the shape of the nozzle is formed to be substantially oval, such that the nozzle includes a minor to major axis ratio of less than 0.5. In other embodiments the nozzle may have a projected cross sectional area in the range from about 0.25 $mm^2$ to about 20 $mm^2$. The projected cross sectional area is determined by evaluation of the two dimensional shape of the nozzle when viewed with a backlight projected onto a two-dimensional surface, although acknowledging that the actual shape is three dimensional and complex depending both on depth of cut and radius and/or shape of curvature of the channel.

Another embodiment of the invention is directed towards a method of processing gas phase molecules with a gas liquid contactor. This method includes forming a plurality of essentially planar liquid jets where each of those liquid jets, is formed into a planar sheet of liquid. The plurality of liquid jets is arranged in substantially parallel planes. The method also provides gas with at least one reactive or soluble gas phase molecule.

In this embodiment, at least a portion of the gas phase molecule is removed by a mass transfer interaction between the gas phase molecules and the liquid jets. The gas phase molecules may include effluent from an industrial process, e.g., coal fired plants or other industrial effluents, such as contaminants or pollutants may include $SO_x$, $NO_x$, $CO_2$, Hg, and combinations of the same. Of course other gaseous molecules may also be removed such as acidic gases like HCl, HBr, HF, $H_2SO_4$, and $HNO_3$, CO, $H_2S$, amines (including ammonia), alkanolamines, urea, formamides, alcohols, carboxylates (like acetic acid), combinations of the same and a wide variety of other gas phase molecules. The limitation of the invention is simply the ability to provide a gas phase molecular reactant or solute and a liquid phase within which it is reactive or soluble, respectively. Although the main description in this invention specification focuses on aqueous systems, one skilled in the art will readily recognize the applicability of this gas liquid contactor invention to non-aqueous systems as well. Such as, partial fluorination of pharmaceutics or chlorination of petrochemical feed stocks as known in the art.

In an embodiment of the invention, the liquid may be chosen to remove contaminants in the gas as known in the art. An aqueous base solution may be utilized for removing $SO_2$ and other flue gas constituents, such as, a solution containing about 0.1 M to about 1.0 of NaOH, $NH_4HCO_3$, $Na_2SO_3$. As known in the art, the concentrations of these liquid reactants may be adjusted depending on the mass transfer of the gas liquid interaction and the preferred products.

In addition, some examples of liquid include a solution of at least one of water, ammonia, ammonium salts, amines, alkanolamines, alkali salts, alkaline earth salts, peroxides, hypochlorites, calcium salt, magnesium, and combinations of the same. Other solutions may include seawater, brine, combinations of the same and the like.

Seawater or brine can be used to scrub $SO_2$ or $CO_2$, or both, depending on pH control and other engineering factors. Additionally, these liquids would also be effective for scrubbing other acid gases, like HCl or HF.

The method forms at least one jet. The jet may be configured to have various physical dimensions. For example, the jet may have a length of in a range of 5 cm and 20 cm, jet width of 1 cm to 15 cm, jet thickness between 10 μm to 1000 μm. Moreover, the jet may have a length to width ratio in a range of 0.3 to 20.

Another embodiment of the invention provides a gas liquid contacting system that includes a number of combined subsystems. Those combined subsystems include a reaction chamber, a gas inlet coupled to the reaction chamber, a gas outlet coupled to the reaction chamber, a liquid plenum coupled to the reaction chamber, a nozzle array coupled to the liquid plenum, and a gas fluid separator coupled to the reaction chamber. With respect to the nozzle array, the nozzle array is configured to provide essentially planar liquid jets. Furthermore, each liquid jet comprises a planar sheet of liquid and the plurality of liquid jets is arranged so as to lie essentially in substantially parallel planes.

Reference will now be made in detail to embodiments of the invention, examples of which are illustrated in the accompanying drawings.

FIG. 1 is a block diagram of a system for producing a flat jet according to an embodiment of the invention. Referring to FIG. 1, a system 0 includes an array of flat jet orifices for producing liquid jets, e.g., thin flat liquid jets, that are highly dense and have a high surface area. In this embodiment, a small segment of a nozzle array is machined from a single plate. This shows the V-shaped liquid channels, but in this example, the process side orifice intersects the V liquid channel with a cone as opposed to a groove. However, the resulting nozzle orifice still is elliptical. The nozzle array includes orifices staggered such that the orifices are separated by distance. The distance may range from about 0.1 cm to about 5 cm in the x direction and 0.1 cm to about 2 mm in the y direction. In a preferred embodiment, the distance is 2 cm in the x direction and 2 mm in the y direction. Of course, the distance between orifices does not need to be constant throughout the array of orifices.

The orifice has a V-shaped entrance 1 and a conical exit 2 channel for jet development. The intersection of entrance 1 and exit 2 channels creates the orifice. A cross sectional view of the nozzle plate 3 shows contours of the entrance 4 and exit 5 channels. An approximate representation of the jet exiting the orifice is shown as 7. A cross sectional close up of the entrance 8 and exit 9 channels are provided. The thin flat liquid jets may be formed with a variable length, e.g., the jet length to jet width ratio may is about 10:1 where the jet has a thickness in a range from about 10 μm to about 100 μm. The jet length may be in a range from about 5 cm to about 20 cm. The jet width may be in a range from about 0.5 cm to about 20 cm.

Figure 2:
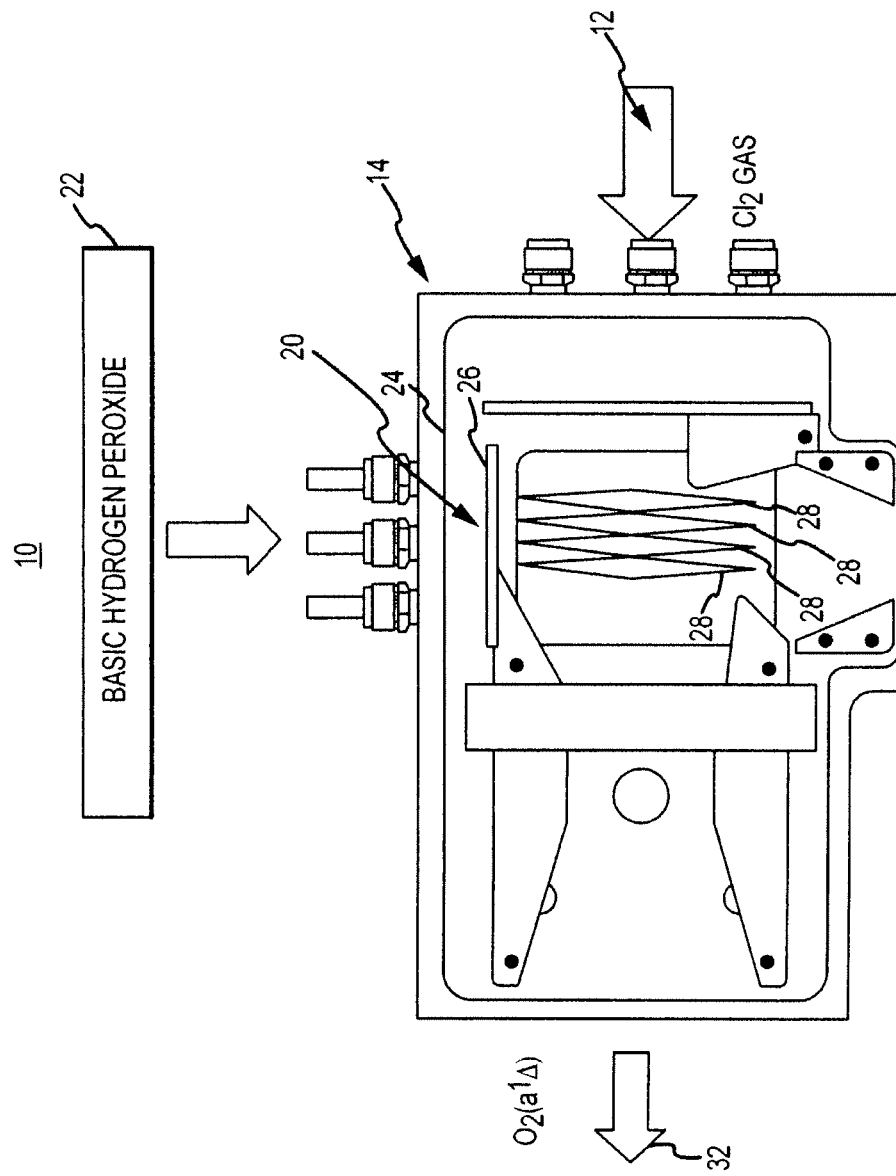
FIG. 2 is a block diagram of a system for producing excited oxygen according to another embodiment of the invention.

FIG. 2 is a block diagram of a system for producing excited oxygen according to another embodiment of the invention. The COIL is more efficient, weighs less and is smaller than previous designs as it uses a nozzle array according to one embodiment of the invention that is capable of creating a large specific area of liquid, e.g., basic hydrogen peroxide. Referring to FIG. 2 the COIL is represented by reference number 10. The COIL 10 is used for producing excited oxygen. The COIL 10 includes a gas reactant source 12, e.g., chlorine gas, attached to a manifold 14. The manifold 14 has a number of openings, e.g., holes (not shown), configured to allow gas jets to enter an excited oxygen generating chamber 20. The COIL 10 also has a source of liquid reactant 22, e.g., basic hydrogen peroxide formed with a single base. In one embodiment, the single base is potassium hydroxide (KOH). The basic hydrogen peroxide 22 source is coupled by a piping 24 to a plurality of nozzles 26. The nozzles 26 are configured to create thin flat jets 28 of the liquid basic hydrogen peroxide. The thin flat jets 28 of hydrogen peroxide 22 react with the chlorine gas jets to produce excited oxygen 32. The COIL 10 may also include a method collecting the basic hydrogen peroxide for reuse, e.g., recycle loop.

The use of the liquid jets increases the specific surface area of hydrogen peroxide 22, thereby increasing the efficiency of the reaction with the chlorine gas 12. Tests have shown that the specific surface area of the thin flat liquid jets is more than three times greater than that for related art circular jets. In addition to increasing the surface area of the hydrogen peroxide, the flat jets do not require the small throats required by previous nozzles. More particularly, previous nozzles have a throat size in a range from about 150 µm to about 350 µm. The nozzles 26 can use a throat that is greater than about 250 µm, or more preferably, larger than 600 µms. Therefore, the nozzles 26 are unlikely to clog due to contaminants, e.g., salts formed by the reaction of the hydrogen peroxide and the chlorine gas. In addition, this allows the system 10 to use a higher starting molarity of basic hydrogen peroxide solution, e.g., molarities as high as about ten moles/L may be used. Previous systems are generally limited to a starting molarity of five moles/L due to the contaminants clogging the system, e.g., formation of clogging salts. Most systems reuse the hydrogen peroxide, however once the molarity drops to about 2.5 moles/L the system's performance is seriously degraded. As a result, most previous systems are limited to a delta molarity in a range from about 2.5 moles/L to about 5 moles/L while this embodiment allows a delta molarity to be in a range from about 2.5 moles/L to about 10 moles/L. Therefore, the apparatus can carry one third as much basic hydrogen peroxide or have three times the capacity of previous systems.

In another embodiment, a COIL includes an excited oxygen generating chamber with an inlet for a source of hydrogen peroxide and a flat jet nozzle for a source of alkali (Li, Na, K) and alkaline earth (Mg, Ca) hypochlorite. The hydrogen peroxide is a gas. The nozzle has a multitude of orifices with a minimum dimension that is greater than about 300 µm in length capable of generating thin flat jets of high specific surface area. A photon generating chamber having a passage coupled to the excited oxygen generating chamber and an inlet for iodine.

Figure 3:
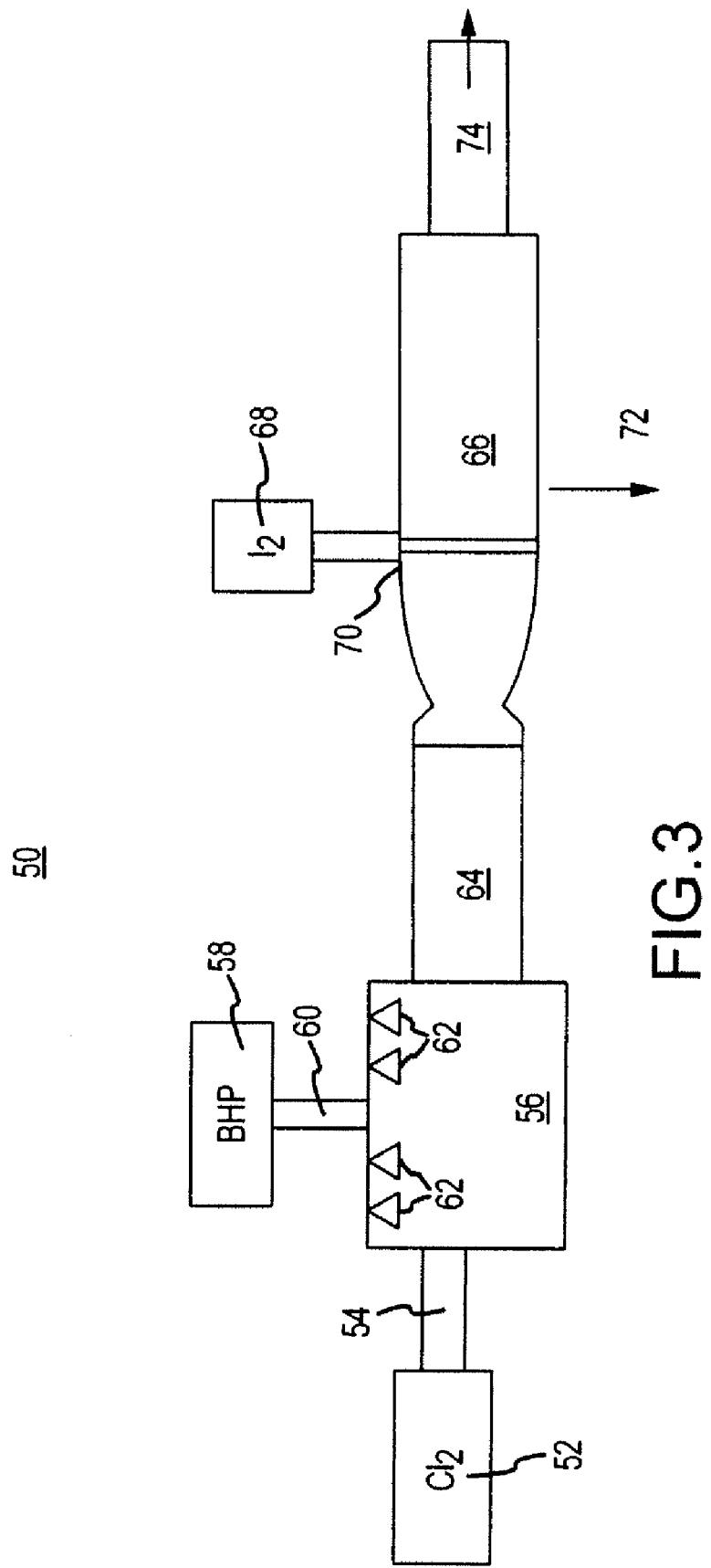
FIG. 3 is a block diagram of an improved chemical oxygen iodine laser according to another embodiment of the invention.

FIG. 3 is a block diagram of an improved COIL in accordance with another embodiment of the invention. Referring to FIG. 3, the improved COIL is generally represented as reference number 50. The COIL 50 has a source of gas 52, e.g., chlorine gas physically coupled by a conduit or pipe 54 through a number of inlets to an excited oxygen generating chamber 56. A source of liquid reactant 58, e.g., basic hydrogen peroxide 58 is transported by a pipe 60 to an array of flat jet nozzles 62. The nozzles 62 allow the liquid basic hydrogen peroxide 58 to mix with the chlorine gas 52. The reaction produces excited oxygen 64, including singlet delta oxygen. The excited oxygen 64 is transported to a photon generating chamber 66. A source of iodine 68 is coupled to an inlet 70 of the photon generating chamber 66. The iodine 68 results in the excited oxygen 64 decaying and releasing photons. The photon generating chamber 66 has mirrors that allow lasing 72 with an output perpendicular to the flow of the excited oxygen. Spent oxygen 74 exits the photon generating chamber 66. The laser 50 may include a system for reclaiming the basic hydrogen peroxide for reuse. The COIL 50 uses the array of nozzles 62 to increase the surface area of the hydrogen peroxide and allow for a higher starting molarity of basic hydrogen peroxide. As a result, the COIL 50 is more efficient allowing for either a smaller size and weight than previous systems or greater laser firing capacity.

Figure 4:
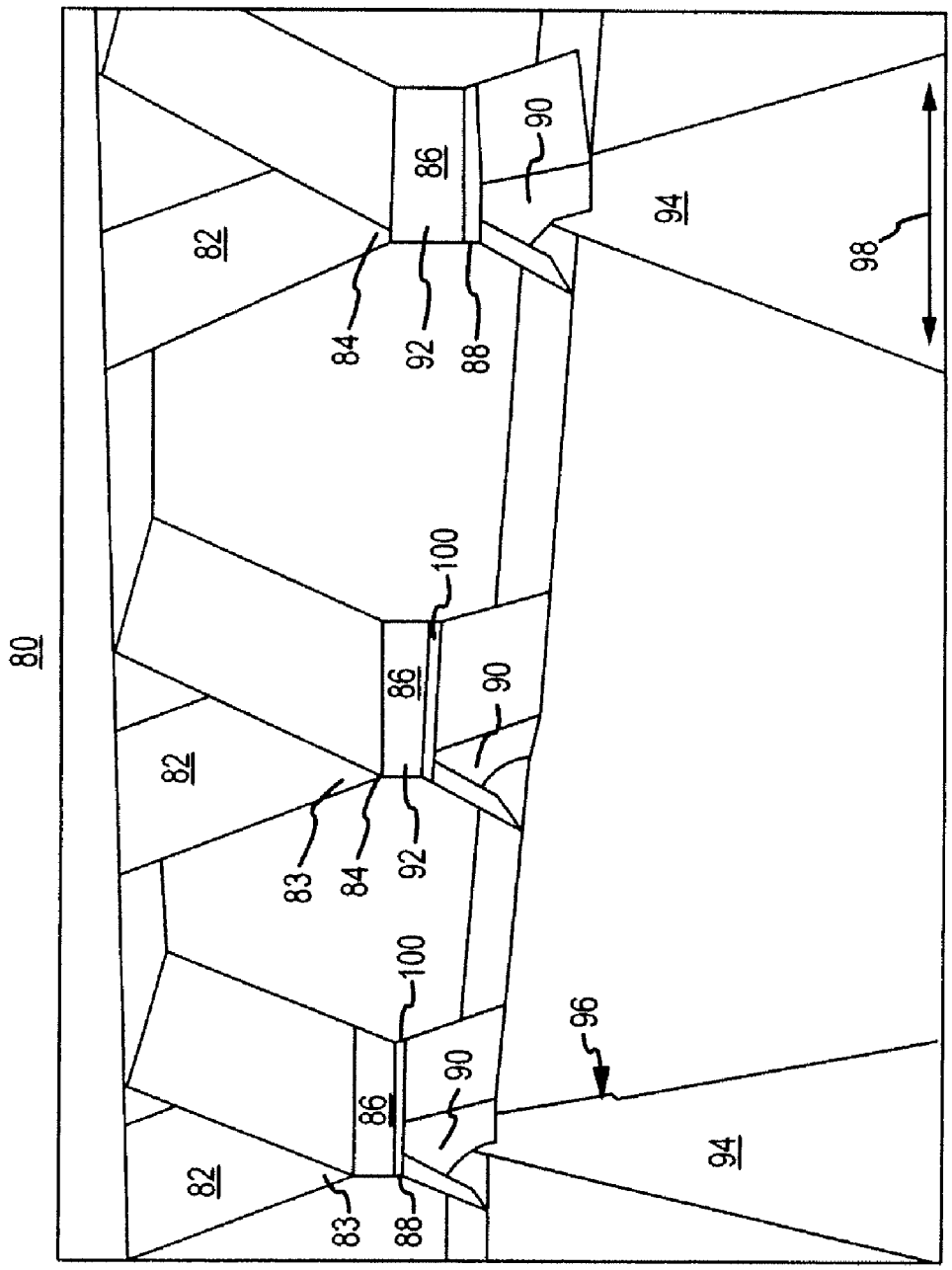
FIG. 4 is a top right perspective view of a flat jet nozzle according to another embodiment of the invention.

FIG. 4 is a top right perspective view of one embodiment of a flat jet nozzle according to an embodiment of the invention. Referring to FIG. 4, a nozzle 80 has a V-shaped chamber 82 that attaches at a vertex 83 to a first end 84 of a pair of opposing plates 86. A second end 88 of the opposing plates 86 is attached to a conical nozzle 90. The liquid, e.g., basic hydrogen peroxide flows into the V-shaped liquid delivery channels or chambers 82 and is forced through the passage 92 between the opposing plates 86 and out the nozzle 90 and creates a flat liquid jet 94. Depending on nozzle area, jet flow rate and velocity, the jet thickness 96 can be in a range from about 5 µm to about 100 µm and the width 98 can be in a range from 1 cm to about 5 cm.

In this embodiment, the width to thickness ratio is significantly greater than a factor of ten. For example, for jet velocities of about 10 m/s, the length of the flat jet stream may be about fifteen or more centimeters. The narrowest passage 100 is where the conical nozzle 90 meets the opposing planar plates 86 is greater than about 600 µm. This nozzle 80 allows for a large surface area of liquid, e.g., basic hydrogen peroxide, which significantly increases the efficiency of the reaction between the basic hydrogen peroxide and the chlorine. Further, due to large jet surface area and small jet thickness this nozzle 80 produces a very large specific surface area ranging from about 10 $cm^{-1}$ to about 20 $cm^{-1}$, which enables a smaller generator volume and higher yields of excited oxygen delivered to the laser cavity. In addition, the nozzle 80 does not require a small throat or passage that is likely to clog with contaminants, e.g., salts that result from the reaction of the chlorine and basic hydrogen peroxide, thereby allowing the system to have a much higher starting molarity for the basic hydrogen peroxide.

Figure 5:
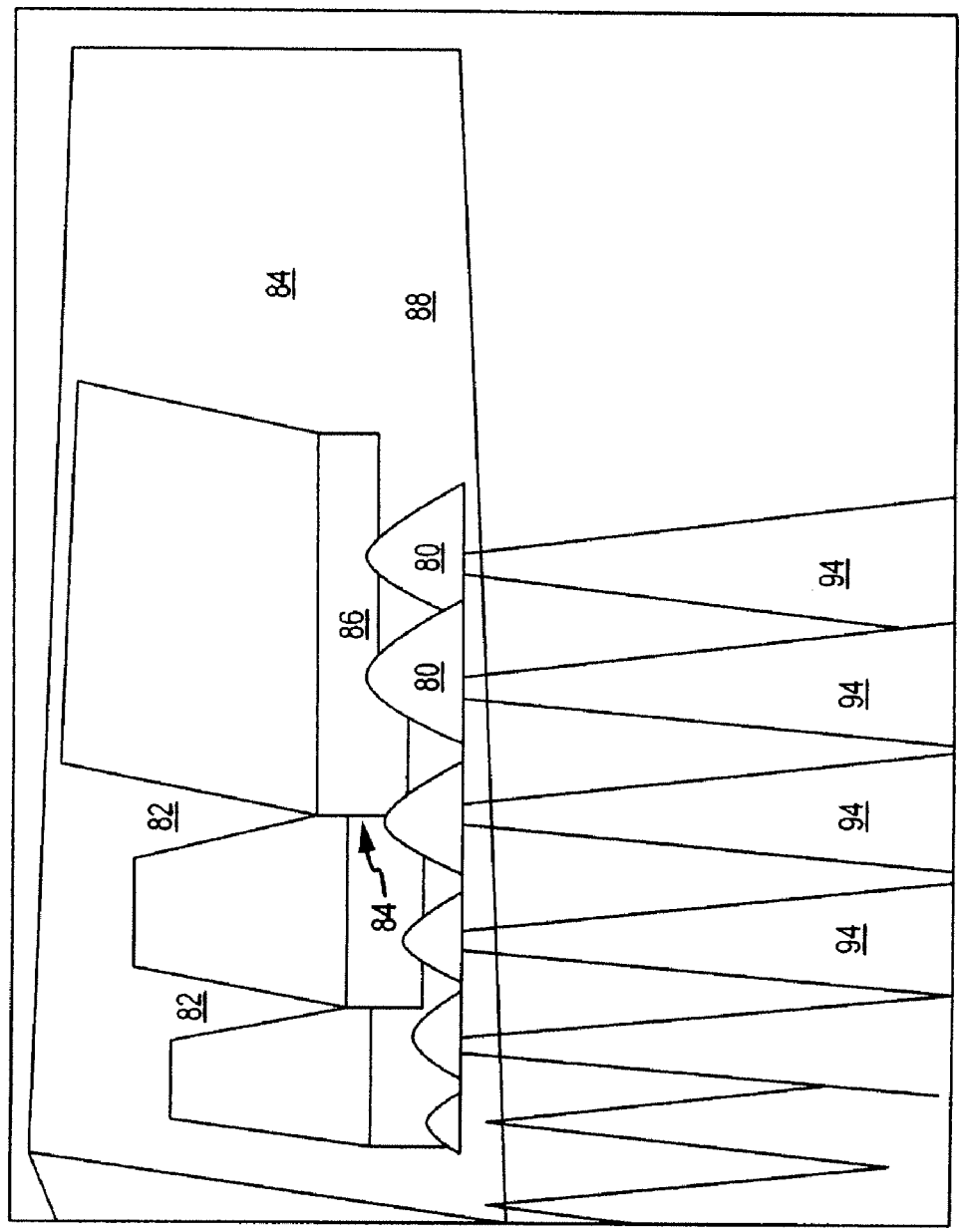
FIG. 5 is a bottom left perspective view of the flat jet nozzle of FIG. 4.

FIG. 5 is a bottom left perspective view the flat jet nozzle of FIG. 4. Referring to FIG. 5, the flat jet nozzle 80 includes a number of conical nozzles that may be attached to the second end 88 of the opposing planar plates 86. Note that the only exit from the second end 88 of the opposing planar plates 86 is through the conical nozzles. It is noted that while the description has focused on the application of a COIL, these embodiments are also applicable to any two phase reactor or contacting system. The use of this two phase reactor system significantly increases the interaction between the gas phase reactant and the liquid phase reactant. As a result, the reaction is significantly more efficient than previous two phase reactor designs allow.

Thus there has been described a COIL that is lighter, smaller and more efficient than similar capacity previous COIL lasers. This allows the laser to be used with smaller transport systems or increases the capacity of present transport systems.

Effluent Contacting System and Method

As described above, system 0 provides an array of nozzles for producing thin, highly dense flat jets of high surface area. System 0 is described in relation to usage with COIL. In an alternative embodiment, many of the principles of the system 0 may be applied to a system and method of pollutant mitigation. In one embodiment the system and method of pollutant mitigation includes a gas liquid contactor. The gas liquid contactor includes a plurality of nozzle plates. In this embodiment, each nozzle plate includes a plurality of nozzles as described in FIGS. 6-17, the nozzles 1010 form an array of nozzles.

The system and method of pollutant mitigation will be described from a bottom up perspective, concentrating first on the unique and innovative nozzle 1010 used, then the nozzle plate and the unique arrangement of the nozzles, then the configuration of liquid gas reactor, then the arrangement of the entire system and method of pollutant mitigation, and followed by the implementation of the system in respect to various pollutants. The sub-components of the system and method of pollutant mitigation has numerous applications beyond that related to the system and method of pollutant mitigation, as will be clear from the following description.

Nozzle

As presented above, in relation to system 0, orifices are described as delivering a flat jet of hydrogen peroxide. The orifice has a V-shaped entrance 1 and a conical exit 2 channel for jet development. The intersection of entrance 1 and exit 2 channels creates the orifice. Cross section views of the nozzle plate show contours of the entrance 3 and exit 4 channels. An approximate representation of the jet exiting the orifice is shown as 5. A cross sectional close up of the entrance 6 and exit 7 channels is provided. The jet length to jet width ratio is about 10:1 with a thickness ranging from about 10 µm to about 100 µm.

In addition to increasing the surface area of the reactant or sorbent, the flat jets do not require the small throats required by nozzles in the related art. As previously explained, related art nozzles have a throat size ranging from about 150 µm to about 350 µm in their largest dimension. By way of contrast, embodiments of invention are configured such that flat jet nozzles can have a throat that is about 250 µm or larger in a smaller dimension of the nozzle. For example, flat jet nozzles can have a throat in a range from about 250 µm to 2000 µm. Therefore, the nozzles of embodiments of the invention are unlikely to clog due to contaminants, e.g., salts formed by the reaction of the liquid sorbents and gases, thereby making systems of the invention robust. Also, allowing systems to use a higher starting molarity of reactants or even fine sorbent slurries. Molarities as high as about 10 moles/L may be used, while previous systems are generally limited to a starting molarity of about 5 moles/L due to the formation of clogging salts and/or solid byproducts or precipitates. Most systems reuse the liquid sorbents or reactants, however once the molarity drops significantly the system's performance may be seriously degraded. In embodiments of the invention, the sorbent or reactant liquid is easily replenished through simple monitoring of concentrations and titration of reactants appropriately into the liquid systems.

The nozzle 1010, as shown in FIGS. 8-13 is similar to the above described conical nozzle 90. For example, the similarity being that the resulting nozzle cut could be described as an intersection of an approximate cone with the U-shaped channel, although it is manufactured in different way than using a cone shaped machine tool bit. Nozzle 1010 creates a flat jet when liquid flows through and may be configured to produce uniformly spaced flat liquid jets shaped to minimize disruption from a gas in a gas liquid contractor system. A flat jet with plug flow characteristics may also be created. The flat jet created initially has very low turbulence characteristics, enabling the flat jet to retain its characteristics for a significant length.

FIG. 6 is a cross-sectional view of one embodiment of a precursor to a nozzle bank. FIG. 7 is a side view of the precursor to the nozzle bank shown in FIG. 6. Referring to FIGS. 6-8, a precursor rod 1012 is used to form the nozzle 1010 and the nozzle bank 1011. The rod 1012 may have various dimensions and generally resembles half of a pipe that has been flattened. The precursor material may take the form of a number of different geometric shapes, such as, ellipsoidal, oval, and semicircular.

The rod 1012 has a shell rod thickness 1015, straight rod height 1016 and a total rod height 1017. In embodiments of the invention the shell rod thickness 1015 may range from about 0.015 inches to about 0.055 inches, the straight rod height 1016 may range from about 0.05 inches to about 0.75 inches and a total rod height 1017 may range from about 0.25 inches to about 0.95 inches. In a preferred embodiment, the rod has a shell rod thickness 1015 of about 0.035 inches, a rod width 1014 with a maxiumum measurement of about 0.323 inches, a straight rod height 1016 of about 0.10 inches, a total rod height 1017 of about 0.31 inches, and a rod length 1018 of about 7.470 inches. The total width 1014 is about 0.323 inches and the nozzle edge 1019 starts at about 0.035 inches from the edge of the nozzle bank 1011 as shown in FIG. 9.

In this embodiment, the procedure for creating the nozzle bank 1011 is as follows. The nozzle bank 1011 is created using a progressive die. The first stage of the die cuts create a rectangular piece of metal of the proper size to be formed. The material used for the die can be single metal or alloy, e.g., stainless steel. In addition, the metal selection may depend on the liquid chemistry being used and its corrosivity or reactivity, therefore, other metals can be chosen including copper, nickel, chrome, aluminum, or alloys including these metals.

In the second stage, the specific geometry of rod 1012 in FIGS. 6 and 7 is created. Preferably, the rod 1012 is de-burred to eliminate sharp edges or corners. Next, a plurality of nozzles 1010 is formed by machining the nozzles 1010 into the rod 1012. In a preferred embodiment, the nozzles 1010 are formed with a wire electrical discharge machining (EDM) machine. For example, the rod 1012 is mounted to a fixture and put into a production EDM machine and the nozzles are formed into the rod 1012, e.g., as shown in FIGS. 8-11.

Figure 12:
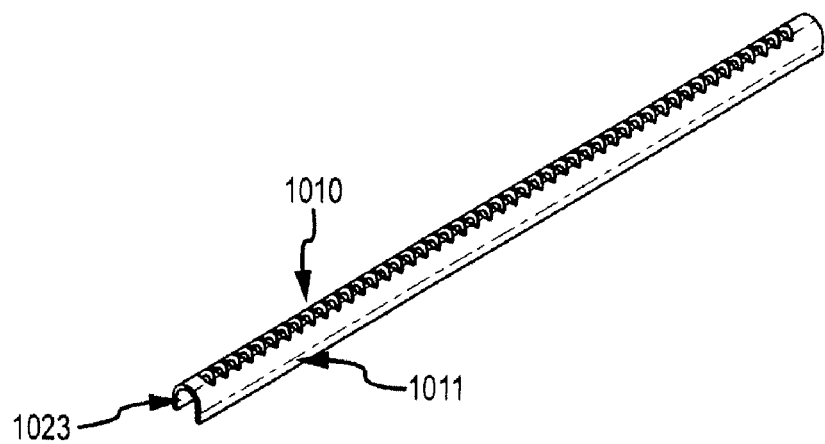
FIG. 12 is a perspective view of the nozzle bank of FIG. 8.
Figure 13:
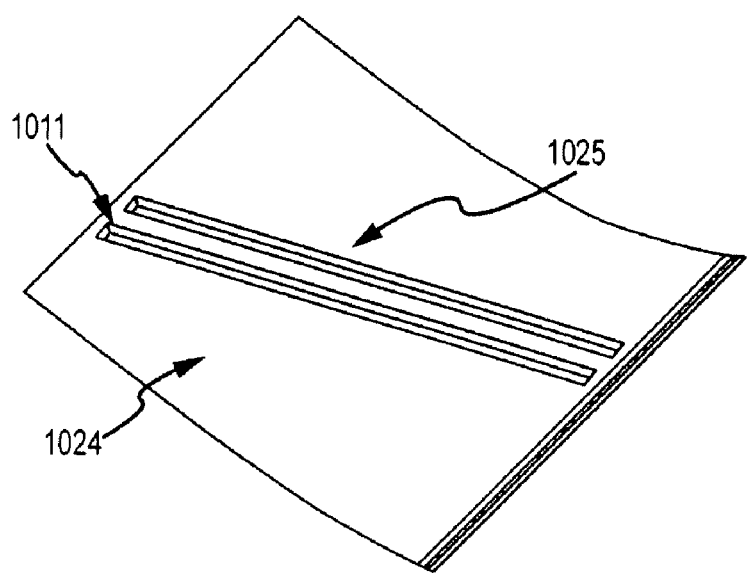
FIG. 13 is a perspective view of a plate into which nozzle banks are welded.

As shown in FIG. 12, end caps 1023 are welded to the nozzle bank 1011 and the nozzle bank 1011 is welded into a plate as shown in FIG. 13. The welding may be conducted as known in the art, e.g., laser welding. In FIGS. 8-13 the nozzle row 1011 is shown with completed nozzles 1010. The nozzles 1010 are cuts with about a 90 degree angle as can be seen in FIG. 11. The depth of the nozzle cut may be in a range from about 1 mm to about 2.5 mm. In a preferred embodiment, the nozzles 1010 are cut to a nozzle depth 1020 of about 0.058 inches. The depth of the channel may be in the range from about 2 mm to 20 mm.

The nozzles may be formed to have a uniform or non-uniform distance between the centers 1021. In embodiments, of the invention the distance between the centers may range from about 0.1 cm to about 5 cm. In a preferred embodiment, the distance between nozzle centers 1021 is about 0.158 inches. In addition, there may be any number of nozzles in a nozzle bank 1011. In a preferred embodiment, 45 nozzles are formed into a nozzle bank 1011. In addition, an end space 1022 is formed at both ends of the nozzle bank 1011. In a preferred embodiment, the end space 1022 is formed to about 0.235 inches. FIG. 12 shows where the nozzle end caps 1023 are welded. FIG. 13 shows how nozzle bank 1011 is welded into a plate 1024 along the channel seam 1025. The configuration of this embodiment is advantageous as it is able to provide large surface area as compared to volume of liquid and furthermore provide a large number of jets in a low volume container at normal atmospheric pressure. In another embodiment, the channels may also be machined directly into a plate rather than welding as described herein. In addition, the nozzles may be configured to have a narrow approximately oval slit could also be produced having a smallest dimension less than about 0.5 mm, but greater than about 50 mm in length. Although this nozzle would have undesired high liquid flow volume as compared to the preferred embodiment, it does form a thin flat liquid sheet of high surface area.

Nozzle Plates

The arrangement of the nozzles 1010 on the nozzle banks 1011 or plate 1024 allow the liquid jets produced by the nozzles to be packed tightly in a small volume. The predictable nature of the fluid flow allows the jets to be closely packed without interference and causing turbulence. In a preferred embodiment, the fluid flow is configured such that the incoming liquid flows at about 90° to the direction of the liquid nozzle feed channel. This has been found to produce the best liquid jet properties with aqueous fluids; fluid flow along or parallel to the liquid feed channel can lead to deflection of the resulting jet in the direction of fluid flow, an undesirable effect. In contrast, the laminar flow of the jets created by nozzle plates 1020 produce closely packed jets without intersection of the streams in adjacent rows. Therefore, little turbulence is created and the distribution of the fluid remains uniform.

Figure 14:
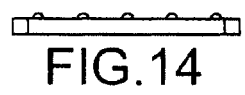
FIG. 14 is a side view a nozzle plate according to another embodiment of the invention.
Figure 15:
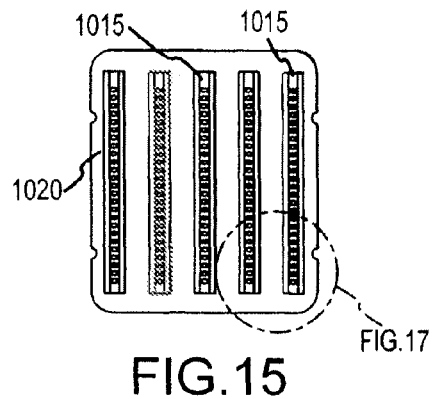
FIG. 15 is a top view of the nozzle plate of FIG. 14.
Figure 16:
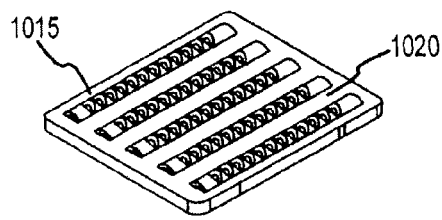
FIG. 16 is a perspective view of the nozzle plate of FIG. 14.
Figure 17:
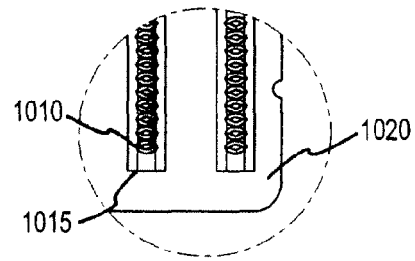
FIG. 17 is a detail blown up view of the nozzle plate of FIG. 14 along cut line A shown in FIG. 15.

FIG. 14 is a side view a nozzle plate according to another embodiment of the invention. FIG. 15 is a top view of the nozzle plate of FIG. 14. FIG. 16 is a perspective view of the nozzle plate of FIG. 14. FIG. 17 is a detail blown up view of the nozzle plate of FIG. 14 along cut line A shown in FIG. 15.

Referring now to FIGS. 14-17, a nozzle plate is generally depicted as reference number 1020. In this embodiment, each individual nozzle 1010 is cut into a formed channel 1015 creating a row of nozzles in the channel 1015. Several channels are created in a plate 1020 to form the orifice plate or nozzle jet array. The channels 1015 may be nozzle banks 1011 that are welded into a plate as described above. Alternatively, the channels and nozzles may be formed from a single plate by machining, a typical result as shown in FIGS. 21-24.

In this embodiment, the nozzles 1010 are precisely spaced to maximize the volume filled with the produced jets, such that the jets fill the intended volume but do not intersect with each other. Spacing of the jets too closely may lead to jet collision and breakup into small droplets in contrast to cohesive flat jets, an undesirable result which decreases the effectiveness of this embodiment. Also, spacing of the jets too far apart which may lead to a lower specific area able to react with gas phase molecules, also reducing the effectiveness of the embodiment. Optimal spacing is mainly a combined function of nozzle design and dimension, reaction effectiveness (or mass transfer), fluid viscosity, and fluid surface energy.

Figure 18:
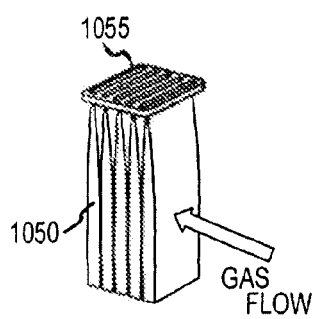
FIG. 18 is a perspective view of an array of flat thin flat liquid jets as produced by the nozzle plate of FIG. 14.
Figure 19:
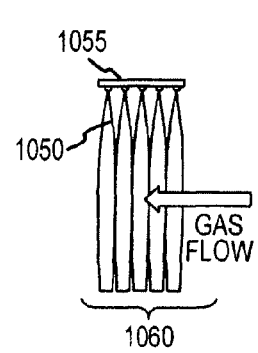
FIG. 19 is a front view of the array of flat thin flat liquid jets produced by the nozzle plate of FIG. 14.
Figure 20:
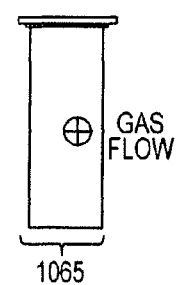
FIG. 20 is a side view of the array of flat thin flat liquid jets produced by the nozzle plate of FIG. 14.

FIG. 18 is a perspective view of an array of flat thin flat liquid jets as produced by the nozzle plate of FIG. 14. FIG. 19 is a front view of the array of flat thin flat liquid jets produced by the nozzle plate of FIG. 14. FIG. 20 is a side view of the array of flat thin flat liquid jets produced by the nozzle plate of FIG. 14.

Referring, to FIGS. 18-20, illustrate the array or matrix of flat jets formed when the liquid is forced through the nozzles. In this embodiment, each nozzle 1010 is configured to create a flat, stable jet 1050. In a preferred embodiment, the jet is configured to be about 2 cm wide, about 25 cm long, and about 0.1 mm thick. Of course, other dimensions may be utilized. Each row of nozzles 1055 produces a row of jets 1060 and the rows are ordered to produce the matrix or array of flat liquid jets 1065. This plate is configured to produce 24 rows 1055 of jets. Of course, the number of rows may be increased or decreased. The preferred number of rows of jets may be prescribed by the size of the gas liquid contactor application and the practical aspects of manufacturing nozzle arrays or jet plates and ancillary fluid handling hardware. However, there is no fundamental size limit on the upper side. For a very small reactor, e.g., sized for research applications, the practical number of rows is three to provide two liquid channels (and half a channel on each of the edges due to one half being the reactor wall). In operation the gas is configured to flow between the flat jets, parallel to the flat side of the jets, thereby creating a very large surface area for intimate contact.

Figure 21:
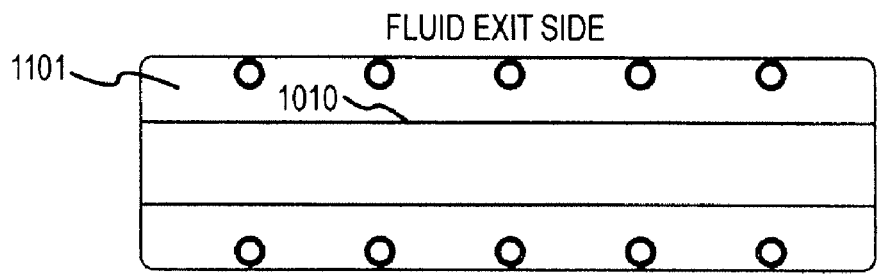
FIG. 21 is a fluid side exit view of a nozzle plate according to another embodiment of the invention.
Figure 22:
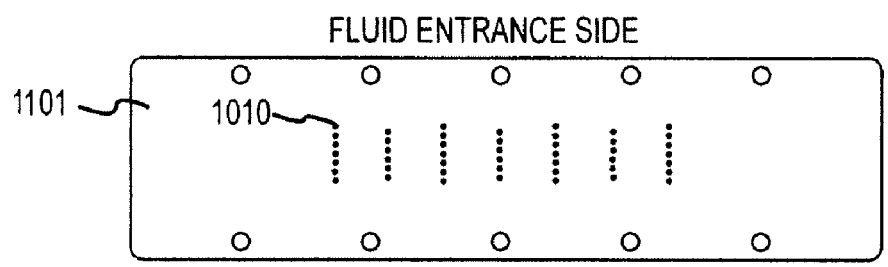
FIG. 22 is the fluid entrance side view of the nozzle plate of FIG. 21.

FIG. 21 is a fluid side exit view of a nozzle plate according to another embodiment of the invention. FIG. 22 is the fluid entrance side view of the nozzle plate of FIG. 21.

Referring to FIGS. 21-22, a nozzle plate is generally depicted as reference number 1101. The nozzle plate 1101 includes nozzles 1010 in an offset or staggered configuration. In one embodiment, as shown in FIG. 18, the gas may be configured to flow parallel to the flat surface created by the jets. The staggered or offset configuration of the nozzles 1010 may allow for slightly increased flow as compared to a non-staggered configuration because the staggered configuration blocks gas cross flow channels than may cause turbulence.

Figure 23:
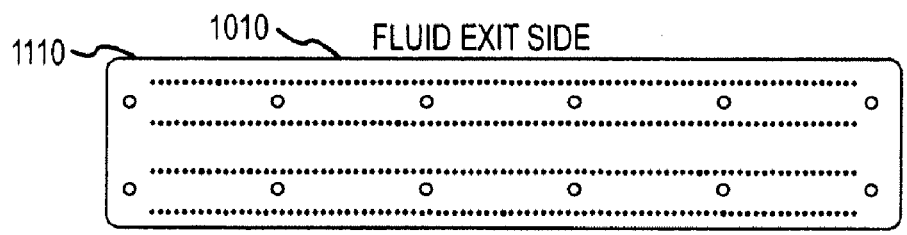
FIG. 23 is a fluid side exit view of a nozzle plate in another embodiment of the invention.
Figure 24:
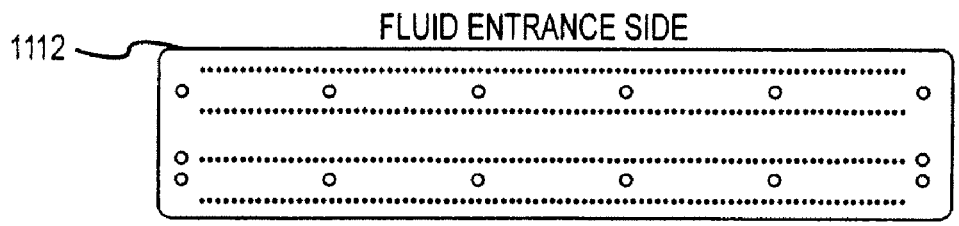
FIG. 24 is the fluid entrance side view of the nozzle plate of FIG. 23.

FIG. 23 is a fluid side exit view of a nozzle plate in another embodiment of the invention. FIG. 24 is the fluid entrance side view of the nozzle plate of FIG. 23.

Referring to FIGS. 23-24, a nozzle plate is generally depicted as reference number 1110. As shown the fluid exits the face shown in FIG. 23 and the gas may be configured to flow parallel to the flat surfaces of the jets. FIG. 24 shows the reverse side of nozzle plate 1110. The nozzle plate includes a plurality of nozzles 1010, are set in nozzle arrays 1112 (see nozzle banks 1011) described above. In an alternative embodiment, the nozzle arrays 1112 may be configured to be removable. The ability to remove the nozzle array provides an ability to service the array in the case of nozzle erosion or a requirement to change nozzle dimension (e.g., in the case of using a different fluid with different viscosity).

FIG. 25 is a fluid side exit view of one embodiment of a nozzle plate with a nozzle bank removed. FIG. 26 is the fluid entrance side view of the nozzle plate of FIG. 25. Referring to FIGS. 25-26, it is shown that nozzle rows 1113 are removable from nozzle array assembly 1120 the nozzle bank 1113 is removed. The ability to remove the nozzle banks 1113 may aid in the ability of a user to clean the nozzle plate 1120 or replace broken nozzle banks 1113, without having to replace a whole plate. In addition, removable nozzle banks 1113 may aid in the manufacturing processes as contactor specific area can be adjusted; e.g., gas phase molecules with very high mass transfer may not require as much specific area to meet capture or reaction yield. As such, nozzle banks can potentially be removed to reduce total liquid flow rates in an existing system.

For example, in one embodiment, the nozzle banks or rows 1113 shown in FIGS. 25 and 26 are cut from a flattened tube 1130 (shown in FIGS. 27 and 28). The tube 1130 is cut lengthwise from an appropriate tube and flattened slightly or, alternatively, is formed from a flat sheet over a mandrel. A plurality of nozzles 1010 are cut into the tube 1130. This is an alternative method of nozzle bank formation. Tube 1130 is shown flattened and with wire EDM grooves formed for orifice fabrication. After tube 1130 is cut lengthwise and the un-flattened ends are removed, the groove piece 1113 is substantially complete and ready for fitting into a nozzle plate 1120.

Gas Liquid Contactor

FIG. 29 is a cut away view of a schematic of a gas liquid contactor according to another embodiment of the invention. The gas liquid contactor increases the efficiency and reduces the entrainment of the gas liquid contactor for the COIL (as described herein). Nozzles in the gas liquid contactor are configured to create stable, planar jets of liquid that hold their shape in the gas stream.

These nozzles can be manufactured into a nozzle plate (as described herein) in an array that creates a close packed, parallel matrix of the planar liquid jets. The flat jet arrays are aerodynamically shaped and provide stable jet formation at relatively high gas flow. That is, an array of nozzles is configured to produce uniformly spaced flat liquid jets shaped to minimize disruption from a gas. Moreover, the array of nozzles produces liquid sheets that are parallel to the gas flow, providing very high contact area and low gas side pressure drop. The gas flow can be across the liquid jets (cross flow), counter current, or co-current.

The liquid pressure drop required to create the jets with the nozzles is also low, resulting in low pumping cost on both the liquid and gas sides. The liquid pressure drop across the main restrictive orifice, e.g., nozzle array. For example, the liquid pressure range in which this embodiment functions is between 2 psi and 50 psi, with the best range being between 3 psi and 15 psi. Also, liquid pressures lower than 2 psi can still provide for thin flat jets (depending on nozzle dimensions), however, the liquid velocity may become low leading to significant deflection by high velocity gas flows. Likewise, pressures above 50 psi can produce excellent thin flat jets, but the energy required to provide for this hydraulic pressure becomes high, which adds to parasitic energy losses of the system.

In addition to these advantages, since the nozzles are not atomizing the liquid, liquid entrainment in the gas is greatly reduced as compared to systems that atomize the liquid. The gas liquid contactor has a very high specific area, e.g., 20 $cm^{-1}$, which results in high contact efficiency and a small footprint, e.g., less than the equivalent of 100 $ft^2$/MW for the contactor and supporting pumps. Also, the specific area and other parameters of the gas liquid contactor are shown in Table 2.

Referring to FIG. 29, the gas liquid contactor is generally depicted as reference number 1600. In this embodiment, a cross flow configuration is utilized, the gas flows from left to right through the contactor 1600. Liquid enters the top 1610 of the contactor 1600 through inlet plenum 1630 and is forced through the nozzle plates 1640 at the top of the contact chamber 1650. Flat liquid jets are formed by the nozzles and flow down through the chamber. The gas flows from left to right in the system depicted in FIG. 29 between the parallel jets, where the mass transfer takes place, then through the low pressure drop mist eliminator 1660, and on to the exit 1670. The liquid is collected through an anti splash grid 1680 at the bottom of the contactor, treated as necessary, and possibly recycled. The anti splash grid submodule 1680 is a grid with apertures shaped to receive the flat jets. The anti splash guard or gas fluid separator is also configured to substantially minimize back-splash of liquid in operation. The apertures of the anti splash grid 1680 may be angled slightly towards the exits 1700 and/or 1690 of the liquid capture outlet plenum 1620 to aid in the exit of the fluid without the application of pressure to the fluid.

The following Tables 2 and 3 compare the contact efficiency and advantages/disadvantages of several gas liquid contactors, including the current invention

TABLE 2

OPERATING CHARACTERISTICS OF COMMON GAS LIQUID CONTACTORS

| Contactor Type | Specific Surface Area, a (contact area/contactor volume), in $cm^{-1}$ | Liquid Side Mass Transfer Coefficient, $k_L$, in cm/s | Volumetric Mass Transfer Coefficient, $k_L * a$, in $s^{-1}$ |
|---|---|---|---|
| Packed Column (counter current) | 0.1-3.5 | 0.004-0.02 | 0.004-0.07 |
| Bubble Column (agitated) | 1-20 | 0.003-0.04 | 0.003-0.08 |
| Membrane | 15-70 | 0.02-0.06 | 0.3-4 |
| Spray column | 0.1-5 | 0.007-0.15 | 0.0007-0.075 |
| Venturi Ejector | | 0.05-0.10 | 0.08-2.5 |
| Current Invention (flat jet) | 1-50 | 0.02-50 | 0.2-2500 |

TABLE 3

COMPARISONS OF COMMON GAS LIQUID CONTACTORS

| Contactor Type | Advantages | Disadvantages |
|---|---|---|
| Packed Column | Long contact time<br>Large contact area<br>Good mixing<br>Counter current for multi stage effect | Liquid flooding<br>Liquid entrainment<br>High gas pressure drop<br>Clogging in packed bed |
| Bubble Column (agitated) | Simple construction<br>Low operating cost | Gas bubbles coalesce<br>Back mixing of the liquid phase<br>Power consumption for agitation<br>Single stage |
| Membrane | High mass transfer coefficient<br>No flooding<br>Reduced liquid entrainment<br>Can be counter current for multi stage effect<br>Direct scale-up | Expensive construction<br>High gas pressure drop<br>Membrane resistance<br>Membranes are fragile<br>Low gas flow rates |
| Spray column | No packing<br>Low gas pressure drop<br>Low operating cost<br>Can be counter current for multi stage effect | Low contact efficiency<br>Liquid droplets coalesce<br>High liquid pumping cost due to high pressure drop and high liquid pumping rate<br>Liquid entrainment<br>Nozzles can plug |
| Venturi Ejector | Single nozzle<br>Small droplets for high liquid surface area<br>Turbulent mixing | High gas pressure drop<br>Very high liquid entrainment<br>Short contact time<br>Single stage |
| Current Invention (flat jet) | Simple construction<br>Low liquid pressure drop<br>Low gas pressure drop<br>High mass transfer coefficient<br>Can be counter current for multi stage effect | Large liquid pumping rate<br>Cross flow configuration is single stage<br>Counter current configuration is more complicated |

The gas liquid contactor was originally used for the chemical reactor in a COIL laser, but its applications are not so limited. The gas liquid contactor may be used in a number of different applications, e.g., in any application where high efficiency, single stage, low cost, small footprint contact between gas and liquid is desired. Some examples include heat transfer where the gas and liquid are directly contacted, such as cooling a gas, mass transfer, such as absorbing pollutants from a flue gas stream, chemical reactions between a liquid and a gas, such as the COIL application, and biological reactions, such as aerobic digestion. Multi-stage, cross-flow contacting can be accomplished by connecting contactors in series and pumping the liquid from the exit of the downstream contactor to the inlet of the next upstream contactor. Alternatively, two different liquid sorbents or reactants can be pumped independently to the gas liquid contactors installed serially to afford two step reactions with no disruption in single train gas flow. Embodiments of the gas liquid contactor produce a gas liquid contactor with very high volumetric mass transfer coefficient, low gas pressure drop, low liquid pressure drop, relatively small size, resistance to clogging, low liquid entrainment, and low capital and operating costs. This is accomplished using an orifice plate (nozzle plate as described herein) with an array of special nozzles that create a matrix of flat, stable, non-atomized jets of liquid that are close packed parallel to each other and parallel to the gas flow. One embodiment for a single stage gas liquid contactor is described below. The gas flow rate and the number of jet rows determine the contact time for this single stage.

In this embodiment, the jet plate is housed in the gas liquid contactor 1600. Gas enters from the left 1672, proceeds through the flat liquid jets of contact chamber 1650, through the mist eliminator 1660, and out the gas exit 1670. The liquid enters the inlet plenum 1630, is forced down through the series of nozzle plates 1640 to form the flat liquid jets, then falls through the gas liquid separator 1680 and into the liquid collection chamber 1620 at the bottom of the contactor. The liquid then proceeds to exits 1690 and 1700 to be processed and/or recycled.

Figure 30:
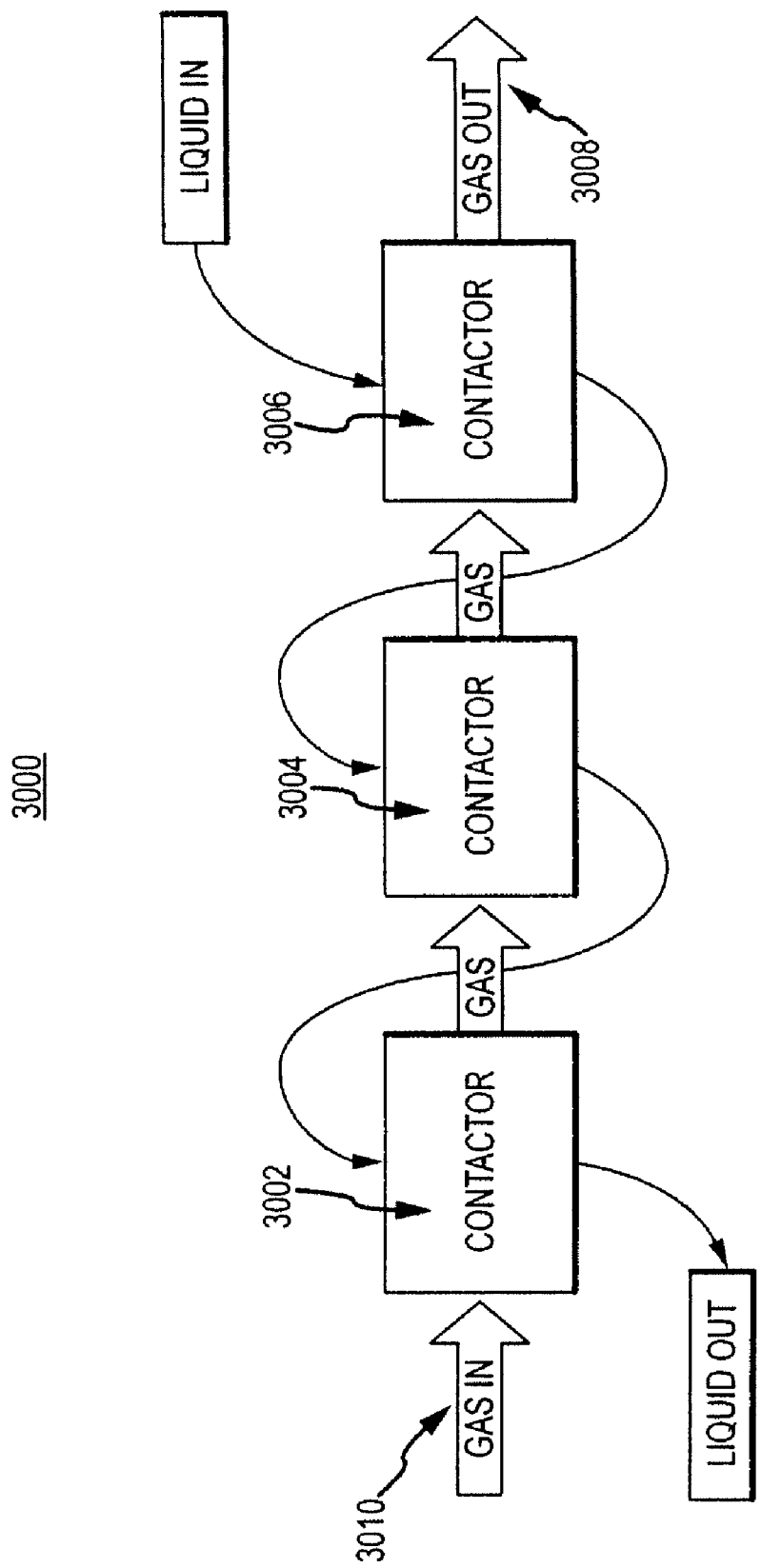
FIG. 30 depicts a schematic arrangement of a plurality of gas liquid contactors according to another embodiment of the invention.

FIG. 30 depicts a schematic arrangement of a plurality of gas liquid contactors according to another embodiment of the invention. Referring to FIG. 30, a multistage cross-flow device contactor is generally depicted as reference number 3000 and is connected in series. The multistage cross-flow device contactor 3000 includes a first gas liquid contactor 3002, a second gas liquid contactor 3004, and third gas liquid contactor 3006. Of course, there may be more than three gas liquid contactors, e.g., the number of gas liquid contactors can be determined for the application. That is, the number of contactors used is a function of the ultimate capture or reaction yield required by the specific chemistry. Sequential contactors may be roughly compared to a sequential chemical extraction well known in the art. Gas flows through each contactor in turn and the liquid flows cross flow from the downstream end 3008 of the train to the upstream end 3010.

Liquid pumps between each stage (not shown) provide the liquid to each of the contactors. Optionally, a single liquid delivery plenum could service all serially installed gas liquid contactor modules, requiring only a single liquid pump to deliver that liquid to a single serial liquid delivery plenum or in parallel from a single pump plenum.

The gas liquid contactors may be made from a variety of different materials. For example, the contactor may be made from stainless steel. The material may also be chosen based on the liquid and/or gas chemistry and its corrosivity or reactivity, e.g., copper, nickel, chrome, aluminum, and alloys thereof. In addition, coated components or piping materials may also be used, e.g., glass lined, epoxy or powder coated, etc. Alternatively, some of the structural and/or fluid handling parts of the contactor can be fabricated from plastics or polymers, fiber reinforced epoxies or polymers, structural polymers, polyimides, and composites and combinations thereof.

Aqueous Ammonia Pollutant Removal

Embodiments of the invention as described herein can be used for pollutant removal in effluent through the usage of ammonia. A significant cost driver for pollutant removal is the low partial pressure of the pollutants in the flue gas and slow gas absorption rates. For example, reaction rates are generally a function of reactant initial concentrations; higher concentration corresponds to faster reactions. However, with low initial concentrations, mass transfer becomes the limiting variable in reacting or removing gas or liquid molecules. In embodiments of this invention, low mass transfer coefficients are offset by a high relative specific area and high flow rates.

In the related art, flue gas desulphurization (FGD) systems were developed and installed in power generating plants to address the contribution of $SO_2$ and $SO_3$ to acid rain and air pollution. Most FGD systems contact the flue gas with wet limestone to absorb the $SO_2$ as $CaSO_3$, which is then oxidized to $CaSO_4$ (gypsum), precipitated, and either sold or placed in a land fill. A shortfall of lime or limestone based FGD is that it cannot address various pollutants, e.g., $NO_x$, Hg, or $CO_2$. Another disadvantage is the large footprint and capital investment required for a FGD system, e.g., spray tower and oxidizing tank.

The preferred sorbent for gas absorption and removal are those systems that demonstrate high liquid jet performance, high gas loading capacity, high oxidative stability, low heat of reaction, low sorbent cost, low corrosivity and a salable product stream. An exemplary sorbent is aqueous ammonia. Ammonia, ammonia salts, and urea are injected into the boiler or flue gas to reduce $NO_x$ via selective catalytic reduction (SCR) or selective non-catalytic reduction (SNCR). Ammonia and its salts may control $SO_x$ and multiple pollutants.

Also, in the related art multi-pollutant control using an aqueous absorbent requires that NO, the major component of $NO_x$ in flue gas, be either reduced to $N_2$ via selective catalytic reduction (SCR) or selective non-catalytic reduction (SNCR), or be oxidized to $NO_2$ because NO has a very low solubility in water. If oxidized to $NO_2$, then the NO can be absorbed with any basic solution or nitric acid. When ammonia based systems are used, valuable by-products are produced. Ammonium nitrate and ammonium sulfate can be used for fertilizer. Ammonia is even more efficient at capturing $CO_2$ than monoethanol amine (MEA) or diethanolamine (DEA) and the $CO_2$ can be used for enhanced oil field recovery.

Embodiments of the invention can capture several pollutants of interest, such as but not limited to, acidic gases, ammonia, VOCs, $SO_x$, $NO_x$, $CO_2$, Hg, and combinations of the same. Moreover, some embodiments of the invention are configured to have a single, small footprint, system and the production of valuable by-products. In addition, embodiments do not contact with slurry and thus avoid associated material handling difficulties. Not using a slurry avoids the heat required to complete a phase change in the ammonia regenerator (or $CO_2$ stripper).

In embodiments of the invention, flue gas is cleaned of fly ash in the bag house or electrostatic precipitator (ESP), then cooled as necessary for the first wet contact. The $SO_2$ and NO in the flue gas may then be oxidized with gaseous hydrogen peroxide, or oxidized in the first scrubber with aqueous hydrogen peroxide. The scrubbers are highly efficient, small footprint, horizontal cross flow gas liquid contactors as described herein. The scrubbers scrub the flue gas with basic aqueous ammonium sulfate to remove the acid gases, e.g., $SO_2$, $SO_3$, $NO_2$, HCl, HF. Make-up ammonia is added to control the pH and provide hydroxide ions to react with the hydrogen ions produced by the hydrolyzed gases. This converts the gases to soluble ammonium salts and reduces their vapor pressure to near zero. Better than about 99% absorption of the $SO_x$ can be achieved. Mercury may also be removed through the oxidation and/or absorption processes, e.g., $HgO_x$ is much more soluble than elemental Hg. Some reaction mechanisms for pollutant removal in embodiments of the invention include:

NH₃ Hydrolization:

$$NH_3 + H_2O \rightleftharpoons NH_4^+ + OH^- \quad (1)$$

SO₂ Capture:

$$H_2O + SO_2 \rightarrow H^+ + HSO_3^- \quad (2)$$

$$\tfrac{1}{2}O_2 + HSO_3^- \rightarrow HSO_4^- \quad (3)$$

$$2NH_3 + HSO_4^- + H_2O \rightarrow (NH_4)_2SO_4 + OH^- \text{ (ammonium sulfate)} \quad (4)$$

NO$_x$ Capture:

$$NH_3 + H_2O \rightleftharpoons NH_4^+ + OH^- \quad (5)$$

$$H_2O_2 + OH^- \rightarrow HO_2^- + H_2O \quad (6)$$

$$HO_2^- + NO \rightarrow NO_2 + OH \quad (7)$$

$$2NO_2 + H_2O_2 \rightarrow 2HNO_3 \quad (8)$$

$$NH_3 + HNO_3 \rightarrow NH_4NO_3 \text{ (ammonium nitrate)} \quad (9)$$

Hg Capture:

$$H_2O_2 + Hg^0 \rightarrow Hg(II) + \text{products} \quad (10)$$

H₂S Capture:

$$H_2S\,(aq) \rightarrow HS^- + H^+ \quad (11)$$

$$HS^- + NH_3 + H^+ \rightarrow NH_4HS \quad (12)$$

After the sulfur and nitrogen oxides are captured as salts (NH₄)NO₃ and (NH₄)₂SO₄, the contacting solution may be concentrated and precipitated for sale or disposal. Heavy metals (Hg) and halides (Cl and F) may be precipitated separately in a pH adjustment step. The lean contacting solution is recycled to the scrubber.

The flue gas after those processes is now better than about 95% clean of all pollutants and is ready for partial CO₂ removal. The second scrubber uses an aqueous ammonia and/or ammonia salt combination for the liquid. The CO₂ is absorbed and reacts with ammonium carbonate and water to form ammonium bicarbonate. Low temperature and high pH favor the absorption of CO₂. Make-up ammonia controls the pH and level of free ammonia in the scrubbing solution. Higher concentrations of ammonia raise the pH and increase the absorption of CO₂ and the CO₂ loading, but also increase the vapor pressure of the ammonia. Some simplified reaction mechanisms for CO₂ capture according to embodiments of invention include:

$$2NH_3 + H_2O + CO_2 \rightleftharpoons (NH_4)_2\text{--}CO_3 \text{ (ammonium carbonate)} \quad (13)$$

$$(NH_4)_2CO_3 + CO_2 + H_2O \rightleftharpoons 2NH_4HCO_3 \text{ (ammonium bicarbonate)} \quad (14)$$

The rich liquid from the contactor is sent to a CO₂ stripper where the temperature is raised to reverse the reaction and release gaseous CO₂ and produce ammonium carbonate. High temperature and low pH favor the evolution of CO₂. The low pH favors the absorption of ammonia, so a low pH helps evolve the CO₂, but keeps the ammonia in solution. The CO₂ is separated and compressed and the ammonium carbonate is returned to the scrubber.

A common problem with related art ammonia based systems is ammonia slip, where ammonia dissolved in the absorbing liquid returns to the gas phase and is carried up the stack in the flue gas. This can cause a visible plume if the ammonia reacts with a constituent in the flue gas to precipitate a solid. In addition, ammonia slip greatly increases reagent cost.

In an embodiment, a plurality of gas liquid contactors as shown in FIG. 30 is used for pollutant removal. In this embodiment, each gas liquid may be configured for different purposes. For example, the gas liquid contactor 3006 may be specifically designed to capture any ammonia that might slip through the first two contactors 3002, 3004, respectively. In this embodiment, the optimum pH for absorbing acid gases (SO$_x$, NO$_x$, and CO₂) is high above 7, because the vapor pressure of those gasses is lowest at high pH, but the vapor pressure of ammonia is highest at high pH. Under optimum conditions the first gas liquid contactor 3002 can capture SO₂ at better than about 99%. While the third contactor 3006 allows the first gas liquid contactor 3002 and second gas liquid contactor 3004 to operate under optimum conditions for absorbing the acid gases, with high ammonia slip, as the third contactor 3006 is run under optimum conditions to capture the ammonia. This captured ammonia is returned to the first two gas liquid contactors. The high efficiency and small size of the gas liquid contactors means a third gas liquid contactor can be affordable and allow very high capture efficiencies.

A number of efficiencies are created by this embodiment, including: greater efficiencies for removal of multiple contaminants from flue gas by reducing the energy consumption and cost of the removal system; greater efficiencies for removal of multiple contaminants from flue gas by minimizing the size of the removal system; greater efficiencies for removal of multiple contaminants from flue gas by creating modular systems that can be factory produced and combined in parallel in a way that provides the necessary level of flue gas processing capability; greater efficiencies for removal of multiple contaminants from flue gas by creating modular systems that can be combined in parallel to adapt to a variety of facility sizes; greater efficiencies for removal of multiple contaminants from flue gas by creating modular systems with very low flow resistance (pressure drop) that can be combined serially for selective and sequential removal of contaminants; greater efficiencies for removal of multiple contaminants from flue gas by creating modular systems that are combined to provide redundancy (high availability) and maintainability (selective access for periodic maintenance or in event of unit failure); greater efficiencies for removal of multiple contaminants from flue gas by creating modular systems that can be mass produced in an assembly line process; and greater efficiencies for removal of multiple contaminants from effluent gases from a variety of types and sizes of power generating and chemical processing facilities.

Moreover, the embodiment can be described as a method and system for achieving selective and high mass transfer rates of flue gas contaminants from high volumetric flue gas flow rates into continuously replenished liquids confined in small system volumes. In the method and system, large dense packed arrays of high velocity, very broad, thin, long and stable jets, interact with a high velocity flue gas flow. Jet formation orifices are optimized based on liquid sorbent characteristics such as viscosity and surface tension. Cross-flow and counter-flow designs represent two different embodiments.

The efficiencies of the method and system are achieved from the large volumetric mass transfer and resultant small size, low pressure sorbent operation requiring minimal pumping capability, and low pressure flue gas pressure drop across the system due to the low resistance of the aerodynamically shaped jets and the modular and combinable nature of the design. See also Tables 3-4. This significantly increases the efficiency of processes for flue gas contaminant removal and makes economically feasible the removal of contaminants such as $CO_2$, $SO_x$, $NO_x$, and Hg.

In another embodiment, a small scale version is readily adapted to the exhaust of large commercial vehicles for contaminant removal. In still another embodiment the volatile organic compounds from a chemical plant can be removed from the exhaust. In yet another embodiment very dry air streams can be achieved by use of cryogenic liquid flows. In another embodiment a gas may be humidified or dehumidified and particulate matter removed.

Figure 31:
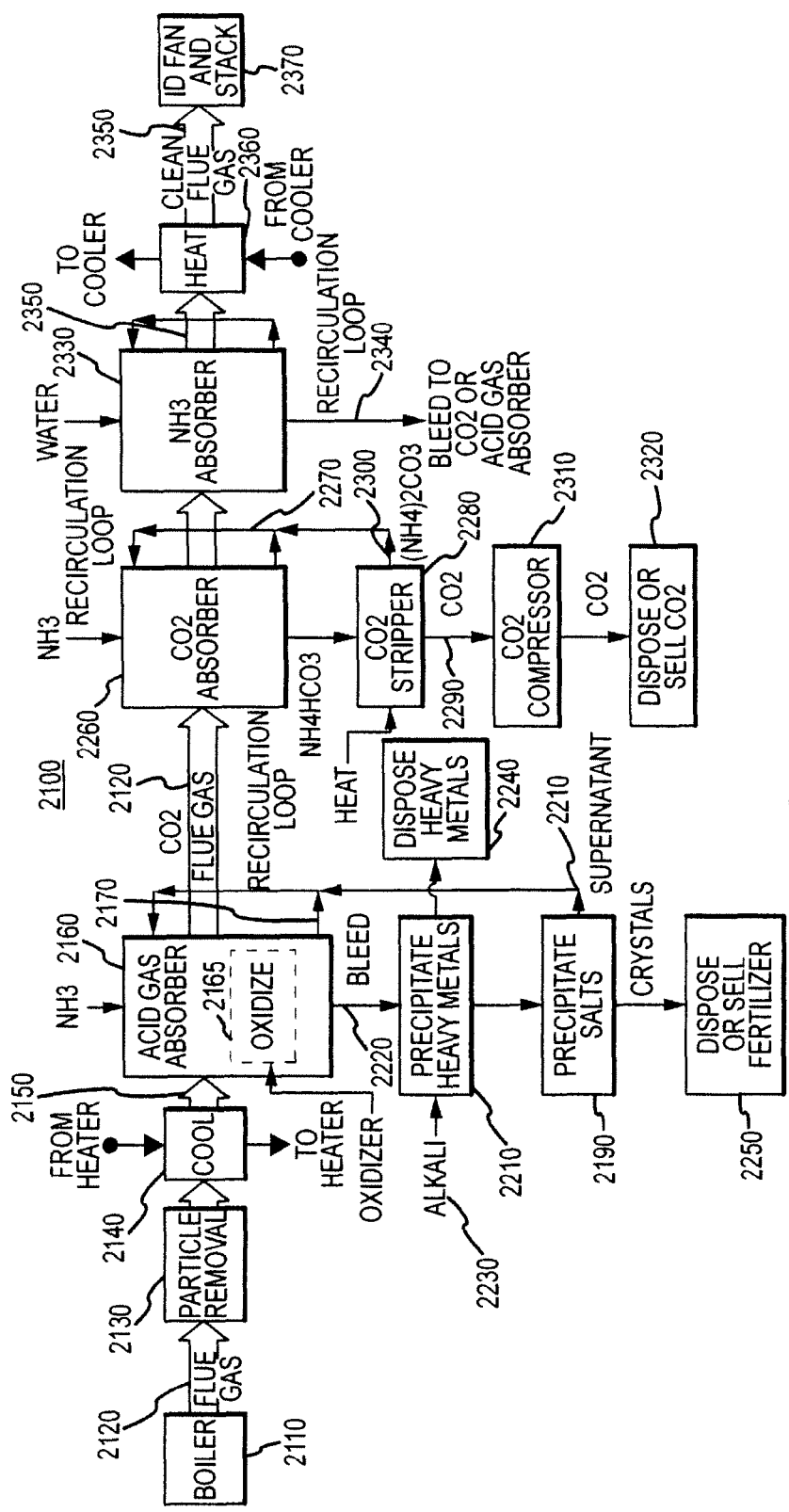
FIG. 31 is a schematic of a multi-contaminant removal system according to another embodiment of the invention.

FIG. 31 is a schematic for one embodiment of a multi-contaminant removal system. Referring to FIG. 31, a multi-contaminant removal system is generally illustrated by reference number 2100. The system 2100 may be configured to capture $SO_x$, $NO_x$, $CO_2$, Hg, HCl, and HF. In this embodiment, flue gas 2120 from boiler 2110 is first cleaned of particles, e.g., fly ash at particular removal point 2130 (for example a settling chamber or a net filter) and cooled at cooling station 2140 as necessary. At this point 2150 the flue gas contains mostly $N_2$, $H_2O$, $CO_2$, $SO_2$, NO, Hg, HCl, and HF. This of course depends on the processing of the boiler 2110. The flue gas is then contacted in a high efficiency gas liquid contactor 2160 as described in herein with aqueous ammonia and dissolved ammonium salts. The dissolved ammonium salts are from the recycle stream 2170 and from the supernatant 2210 from the precipitation step 2190 and includes ammonium sulfite ($SO_3$), sulfate ($SO_4$), nitrate ($NO_3$), chloride (Cl), fluoride (F), and in some cases a small amount of carbonate ($CO_3$) and bicarbonate ($HCO_3$). The ammonium carbonate and bicarbonate may be kept to a minimum by using an approximately stoichiometric amount of make-up ammonia.

In step 2165, oxidation takes place in the liquid phase in the gas liquid contactor as described in embodiments of the invention. Of course, several oxidizers may be used to convert the NO to $NO_2$ for better absorption. The $SO_3^-$ is also oxidized to $SO_4^{2-}$ in the liquid phase. A bleed stream 2220 of the liquid is sent to the precipitators to remove the heavy metals and ammonia salts. In the first step 2230 a pH adjustment will precipitate 2210 the heavy metals such as Hg. In the second step 2190 the liquid is concentrated and ammonia salts are precipitated. The heavy metal solids from the precipitation step may be disposed properly 2240 and the ammonium salt solids sold as fertilizer 2250. If the ammonia salts can be sold as fertilizer (with the Hg removed) in concentrated liquid form, the second precipitation may be eliminated.

Next, the flue gas 2120, containing only $N_2$, $H_2O$, and $CO_2$, is contacted in another high efficiency gas liquid contactor 2260 as described herein with ammonia and dissolved ammonium carbonate/bicarbonate. Again, the ammonia is a make-up stream and the dissolved salts come from the recycle stream 2270. Ammonia is added to target the pH of the contacting liquid to optimum. The $CO_2$ is absorbed as ammonium bicarbonate in the liquid which is sent to the $CO_2$ stripper 2280. Here, the temperature is raised (and pH adjusted if necessary) to drive the reaction in reverse and release the $CO_2$ as a gas 2290, leaving ammonium carbonate in the liquid phase 2300 to be recycled to the $CO_2$ absorber. The $CO_2$ may then be compressed 2310 and sold or sequestered 2320. Sequestration involves, e.g., injection into depleted natural gas wells, secondary oil recovery, and other methods which will not be described here in detail because they are out of scope of this invention.

After the $CO_2$ absorption step, the flue gas is contacted with water in a third high efficiency contactor 2330 as described herein to strip out any ammonia that may slip from the previous contactors. The pH of the contact liquid (water) is adjusted as necessary to ensure complete absorption of the ammonia. The bleed stream 2340 may be sent to the $CO_2$ stripper 2300 or the $SO_x$ absorber.

Finally the clean flue gas 2350, consisting of only nitrogen, water, some oxygen, and any unabsorbed $CO_2$ is heated 2360 to reduce condensation and sent to the ID fan 2370 and the stack. The flue gas heater 2360 and cooler 2140 are interconnected with a liquid heat carrier to economize the process. Cool liquid is contacted with the hot flue gas in a gas liquid heat exchanger 2140. The cool flue gas proceeds to the first absorber 2160. The now hot liquid is sent downstream to the flue gas heater 2360 where it contacts cool flue gas 2350 from the last absorber 2330. This gas liquid heat exchanger 2360 cools the liquid to be sent back to the cooler 2140 and heats the flue gas 2350 in preparation for exhaust into the atmosphere. The hot liquid may also be used as heat input in the $CO_2$ stripper 2300.

Optionally, waste heat from the industrial process can be used as a heat source for stripping $CO_2$ or re-heating the waste gas to avoid moisture condensation. For example, in a power plant this could come from the fly ash bag house.

Optionally, the process can been modified to eliminate the $CO_2$ capture if desired. That is, the system focus is to capture $SO_x$, $NO_x$, Hg, HCl, and HF and produce ammonium sulfate and nitrate as fertilizer.

Figure 32:
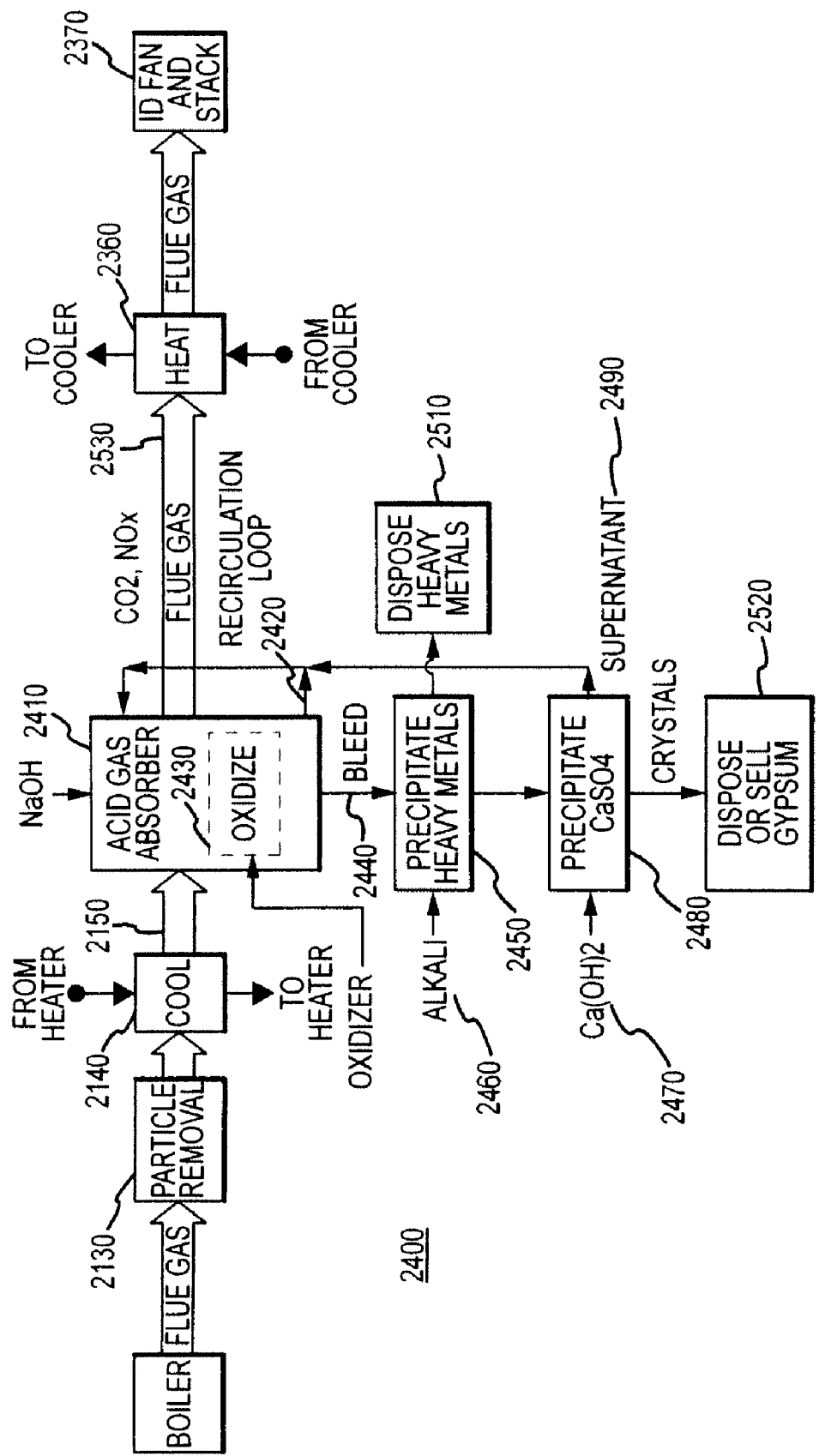
FIG. 32 is a schematic of a multi-contaminant removal system according to another embodiment of the invention.

FIG. 32 is a schematic of a multi-contaminant removal system according to another embodiment of the invention. Referring to FIG. 32, the process can be simplified to capture only $SO_x$, HCl, and HF. Process 2400 is designed to capture only those acid gasses most easily absorbed. The flue gas 2120 from boiler 2110 is first cleaned of fly ash at particular removal point 2130 (for example a settling chamber or a net filter) and cooled at cooling station 2140 as necessary. At this point 2150 the flue gas contains mostly $N_2$, $H_2O$, $CO_2$, $SO_2$, NO, Hg, HCl, and HF.

The flue gas 2150 is then contacted in a high efficiency gas liquid contactor 2410 as described herein with sodium hydroxide and sulfate/sulfite salts from the recycle stream 2420. The oxidation step 2430 takes place in the liquid phase in the gas liquid contactor. The sulfite ($SO_3^{2-}$) is oxidized to sulfate ($SO_4^{2-}$) in the liquid phase using oxygen from air or from the flue gas. A bleed stream 2440 of the liquid is sent to the precipitators 2450 to remove the heavy metals and sulfate salts. In the first step a pH adjustment 2460 will precipitate the heavy metals such as Hg. In the second step calcium hydroxide 2470 is added to precipitate calcium sulfate, which may be separated, dried, and removed at the precipitator 2480. The supernatant 2490 from this precipitator is returned to the recycle stream. The heavy metal solids from the precipitation step may be disposed properly 2510 and the calcium sulfate sold as gypsum 2520.

Finally the clean flue gas 2530, consisting of only nitrogen, water, $NO_x$, and $CO_2$ is heated to reduce condensation at the heater 2360 and sent to the ID fan and the stack 2370. The flue gas heater 2360 and cooler 2140 are interconnected with a liquid heat carrier to economize the process as described above.

Elimination of SO

Various performance areas for enhancing the $SO_2$ capture capability include reducing reactor vessel size, pressure drop and using efficient mass transfer sorbent systems with salable byproducts. Achieving these target performances requires innovative design approaches that couple high $SO_2$ absorption kinetics and value-added product streams.

Gas liquid mass transfer operations take place across the gas liquid interface. The absorption rate of a gas into a liquid sorbent is controlled by the liquid phase mass transfer coefficient, $k_L$, the specific surface area (gas liquid interfacial surface area to volume ratio), a, and the concentration gradient between the bulk fluid, $C_L$ and the gas liquid interface, $C_L^*$. In many gas liquid reaction systems the solubility of the $C_L^*$ is low and control of the concentration gradient, is limited. To enhance the gas absorption rate, gas liquid contactor embodiments increase mass transfer kinetics, gas liquid mixing and/or interfacial surface area to volume ratio.

In embodiments of the invention, to efficiently capture $SO_2$, the contactor can be used with a wide variety of aqueous-based sorbents including but not limited to limestone/lime ($CaCO_3$), sodium carbonate ($Na_2CO_3$)/sodium hydroxide (NaOH), ammonium hydroxide (commonly called aqueous ammonia and abbreviated AA), double alkali (sodium hydroxide, NaOH, plus lime), magnesium oxide (MgO) and zinc oxide (ZnO). The addition of oxidizing agents (OX) enhances the oxidation of $SO_2$, which facilitates the formation of sulfate, $SO_4^{2-}$. In a preferred embodiment, the OX agent is hydrogen peroxide ($H_2O_2$). Combining aqueous ammonia and hydrogen peroxide is especially beneficial since a salable, revenue generating byproduct stream such as ammonium sulfate (a fertilizer) can be produced. In addition, $H_2O_2$ decomposition products (water and oxygen) are environmentally and equipment friendly.

It is thought that the likely chemical steps to $SO_2$ oxidation in the presence of aqueous ammonium hydroxide and hydrogen peroxide are as follows:

$$NH_3 + H_2O + SO_2 \rightarrow NH_4^+ + HSO_3^- \qquad (1)$$

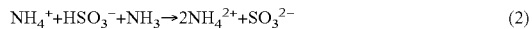
$$NH_4^+ + HSO_3^- + NH_3 \rightarrow 2NH_4^{2+} + SO_3^{2-} \qquad (2)$$

$$H_2O_2 + SO_3^{2-} \rightarrow H_2O + SO_4^{2-} \qquad (3)$$

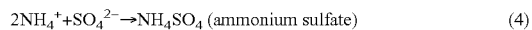
$$2NH_4^+ + SO_4^{2-} \rightarrow NH_4SO_4 \text{ (ammonium sulfate)} \qquad (4)$$

In embodiments of the invention, the gas effluent cleaning process allows for the removal of sulfur dioxide with high efficiency. The system in this embodiment includes an array of nozzles with an orifice plate (or nozzle plate as described herein) reshaping and fluid composition engineering for adapting to a wide range of fluids and operating conditions. The removal of $SO_2$ is performed by passing the gas through a high surface to volume gas liquid contactor unit as described above. The gas effluent is passed horizontally (referred to as cross-flow) through the gas liquid contactor having substantially reduced contactor volume and gas flow pressure drop as compared to the related art. Intersecting the cross flow gas flow are a plurality of low pressure, vertically oriented flat jet arrays composed of an aqueous based sorbent and of substantial surface area. The flat jet arrays are aerodynamically shaped so as to provide stable jet flow with low liquid particle entrainment at relatively high gas velocity.

In a preferred embodiment, the sorbent for sulfur dioxide absorption and removal are those systems that demonstrate high $SO_2$ capacity, high oxidative stability, low heat of reaction, low sorbent cost, low corrosivity and a salable product stream. An exemplary sorbent for effective $SO_2$ removal is 28 wt % ammonia in water. In order to optimize the contactor, from a fluid and jet performance standpoint, about 1% to about 2% polymer or suspension is added to the aqueous ammonia solutions to enhance contactor performance. An example of an additive is one that is neither reactive toward aqueous ammonia or interferes with the mass transfer process. A polymer or suspension may allow tailoring the polymer properties, e.g., viscosity, for achieving maximum jet performance (jet width, length, thickness, surface area) at minimum liquid side pressure drop. An exemplary polymer additive is diethylene glycol. Other polymer additives include polyethylene oxide or polyvinyl alcohol. An exemplary inorganic additive is bentonite.

Additional chemical compounds are preferred to aid in the rate of $SO_2$ oxidation and thus the mass transfer kinetics. An exemplary additive to the preferred sorbent system is hydrogen peroxide. To avoid excessive hydrogen peroxide decomposition at high pH, a stabilizer is added to the sorbent mixture. An exemplary hydrogen peroxide stabilizer at high pH is poly($\alpha$-hydroxy acrylic acid). Hydrogen peroxide oxidation capability may be further enhanced by the addition of hydrogen peroxide catalysts. An exemplary hydrogen peroxide catalyst is iron (III) tetra-amido macrocyclic ligand (TAML).

Figure 33:
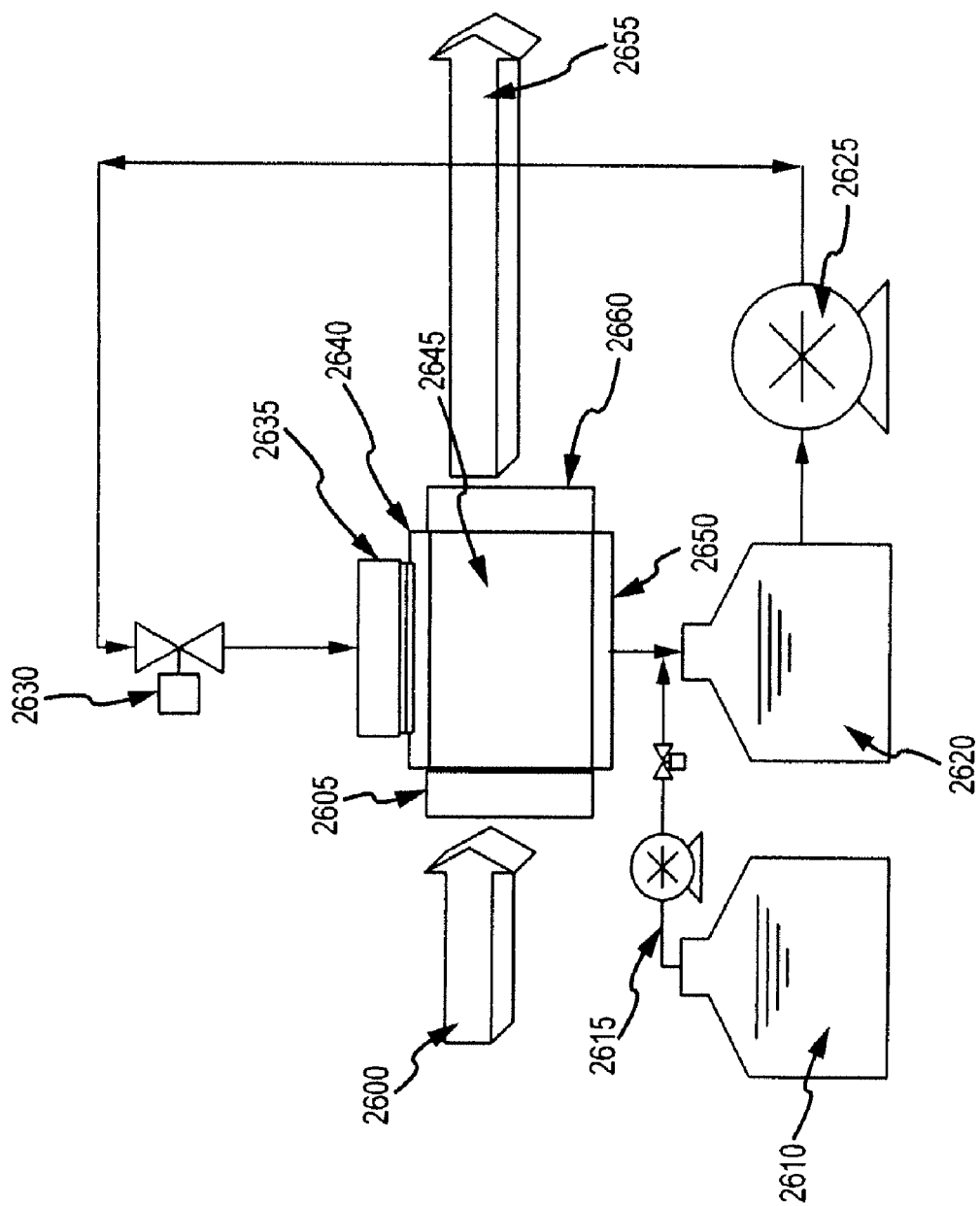
FIG. 33 is a schematic of a general gas liquid contactor that enables interaction between gas and liquid phases according to another embodiment of the invention.

FIG. 33 is a schematic of a general gas liquid contactor system design which enables interaction between gas and liquid phases according to another embodiment of the invention. The gas liquid contactor system includes a gas inlet 2600 coupled to a gas distribution unit 2605 to provide gas to the gas liquid contactor 2645. The system also includes a liquid reagent tank 2610 coupled to a pump 2615 and to a liquid catch tank 2620. The catch tank 2620 is coupled to the gas liquid contactor 2645 for collecting liquid from the gas liquid contactor 2645. The catch tank 260 is optionally coupled to a liquid recirculation pump 2625. The liquid recirculation pump 2625 enables a method of liquid recirculation. A flow control valve 2630 is coupled to a liquid plenum 2635 for controlling liquid into the liquid plenum 2635. An array of nozzles 2640 for forming a liquid jets is coupled to the liquid plenum and the gas liquid contactor 2645. The gas liquid contactor 2645 includes a liquid gas jet contact zone. A gas liquid separator 2650 to separating gas from liquid sorbent jets is arranged in the gas liquid contactor 2645. A demister 2660 capable of removing small gas droplets from the exit gas is positioned near a gas outlet 2655.

The gas inlet may include a plurality of different gases. For example, it may include industrial effluents, such as contaminants or pollutants may include $SO_x$, $NO_x$, $CO_2$, Hg, and combinations of the same. Of course other gaseous molecules may also be removed such as acidic gases like HCl, HBr, HF, $H_2SO_4$, and $HNO_3$, CO, $H_2S$, amines (including ammonia), alkanolamines, urea, formamides, alcohols, carboxylates (like acetic acid), combinations of the same and a wide variety of other gas phase molecules. The limitation of the invention is simply the ability to provide a gas phase molecular reactant or solute and a liquid phase within which it is reactive or soluble, respectively. Although the main description in this invention specification focuses on aqueous systems, one skilled in the art will readily recognize the applicability of this gas liquid contactor invention to non-aqueous systems as well.

In this embodiment, injection of a gas effluent containing $SO_2$ into the gas liquid chamber is described. A gas plenum distributes the gas flow evenly across the liquid flat jets. Liquid jets are created by pumping the sorbent into a liquid plenum that distributes the sorbent evenly across the nozzle orifices. The created jets flow vertically downward into the contactor chamber and through a gas liquid separator into a catch tank. In the gas liquid chamber the vertical flowing sorbent intersects the gas cross-flow. Sulfur dioxide is absorbed into the sorbent liquid and removed from the gas effluent stream. Clean gas effluent is discharged at the exit of the contactor chamber. The sorbent is recirculated for continuous $SO_2$ removal from the effluent gas stream.

The performance of the gas liquid contactor was demonstrated on a small, sub-scale test bed as illustrated in FIG. 33. Table 4 summarizes the geometric parameters for the example.

TABLE 4

GAS LIQUID CONTACTOR GEOMETRIC DIMENSIONS

| Parameter | No. Jet Orifices | Jet Packing Density (jets/cm$^2$) | Single Jet Surface Area (cm$^2$) | GLC Channel Width (cm) | GLC Channel Height (cm) | Channel Length (cm) | Specific Surface Area (cm$^{-1}$) | Contactor Volume (cm$^3$) |
|---|---|---|---|---|---|---|---|---|
| Value | 96 | 4 | 22 | 15 | 25 | 30 | 5-10 | 11,250 |

The jet orifice geometry used in this example is described above in relation to the nozzle plates and gas liquid contactor. Prior to operation the liquid jet surface area was optimized for jet length, width and thickness by varying the pump backing pressure to the jet orifice plate. Further optimization with respect to jet surface area (length and width) can be obtained using additives (for example, diethylene glycol) to enhance the sorbent viscosity/surface tension properties or by reshaping the orifice nozzle.

An example of the gas liquid contactor operating conditions and performance is presented in Table 5. A sorbent system containing about 28 wt % aqueous ammonia was tested. No viscosity or oxidant additives were added to the sorbent mixture. The effluent gas consisted of $N_2$ mixed with $SO_2$ at 500 ppmv. The gas mixture was injected into the contactor under ambient temperature and pressure conditions and measured using calibrated mass flow controllers. The liquid volumetric flow rate was determined by recording the amount of the liquid jet discharge into a calibrated receiving vessel over a measured time interval. The test results for $SO_2$ absorption under the described test conditions show 95% $SO_2$ removal without an oxidative enhancer (i.e., $H_2O_2$).

An embodiment of the invention includes a high performance gas liquid contactor (as described herein, e.g., FIG. 33). The system is based on an array of high density, high surface area, aerodynamically shaped thin flat jets that improve the overall mass transfer and contactor performance. The gas liquid contactor is characterized by enhanced specific surface area, ranging from about 1 cm$^{-2}$ to about 50 cm$^{-2}$, a generator volume of about 1/10th the volume of related art packed towers, low gas pressure drop across the contactor of less than 5 torr/lineal ft, a liquid jet driving pressure less than 50 psi and more preferably less than 20 psi, and minimal liquid entrainment in the gas flow.

In a preferred embodiment, the system includes a specific surface area in a range from about 10 cm$^{-1}$ to about 20 cm$^{-1}$, a generator volume of about 1/10th the volume of related art packed towers, a gas pressure drop of less than about 1 Torr per lineal foot of contactor, and a jet driving pressure ranging from about 5-10 psi, and minimal liquid entrainment in the gas flow.

To efficiently capture $NO_x$, the gas liquid contactor can be used with a wide variety of aqueous-based sorbents including but not limited to ammonium hydroxide (commonly called

TABLE 5

GAS LIQUID CONTACTOR OPERATING CONDITIONS AND SO$_2$ ABSORPTION RESULTS

| Sorbent | Contactor Press. (Torr) | Total Gas Flow Rate (LPM) | Total Liquid Jet Flow Rate (LPM) | Liquid Jet Backing Pressure (psi) | Inlet SO$_2$ Conc. (ppm) | Inlet Gas Temp. (K) | Inlet Liquid Temp. (K) | % SO$_2$ Removed |
|---|---|---|---|---|---|---|---|---|
| AA (28 wt %) | 609 | 7.5 | 14 | 11 | 500 | 293 | 293 | >95 |

$NO_x$ Capture Device

Another embodiment of the invention is directed towards utilizing the gas liquid contactor to capture $NO_x$. $NO_x$ is a primary pollutant consisting mainly of nitric oxide (NO) and nitrogen dioxide ($NO_2$). Depending on the combustion process, more than 90% of the $NO_x$ is nitric oxide. $NO_x$ is produced from the reaction of nitrogen and oxygen at high combustion temperatures (>2700° F.) as well as oxidation of nitrogen in the fuel. Various performance areas for enhancing the $NO_x$ capture capability include reducing reactor vessel size, reducing pressure drop and using efficient mass transfer sorbent systems.

Gas liquid mass transfer operations take place across the gas liquid interface. The absorption rate of a gas into a liquid sorbent is controlled by the liquid phase mass transfer coefficient, $k_L$, the specific surface area (gas liquid interfacial surface area to volume ratio), a, and the concentration gradient between the bulk fluid, $C_L$ and the gas liquid interface, $C_L^*$. In many gas liquid reaction systems the solubility of the $C_L^*$ is low and control of the concentration gradient is limited. To enhance the gas absorption rate, gas liquid contactor designs should demonstrate increased mass transfer kinetics, gas liquid mixing and interfacial surface area to volume ratio.

aqueous ammonia and abbreviated AA), metal chelates or urea. The addition of oxidizing agents (OX) enhances NO oxidation to $NO_2$, which increases the sorbent absorption rate. Various OX agents include sodium chlorite ($NaClO_2$), sodium hypochlorite (NaOCl) sodium hydroxide-potassium permanganate (KOH—$KMnO_4$), and hydrogen peroxide ($H_2O_2$). In preferred embodiments, the contactor utilizes aqueous ammonia and hydrogen peroxide as the decomposition products of $H_2O_2$ are environmentally and equipment friendly (water and oxygen), that is, neither are corrosive to normal materials of construction and ammonium nitrate is produced, which can be sold as a crop fertilizer to reduce operating costs.

It is believed the that chemical mechanism to NO and $NO_2$ oxidation in the presence of ammonium hydroxide and hydrogen peroxide are:

$$NH_3 + H_2O \rightarrow NH_4^+ + OH^- \tag{1}$$

$$H_2O_2 + OH^- \rightarrow HO_2^- + H_2O \tag{2}$$

$$HO_2 + NO \rightarrow NO_2 + OH^- \tag{3}$$

$$NO_2 + NO_2 \rightarrow N_2O_4 \tag{4}$$

$$N_2O_4 + H_2O \rightarrow HNO_2 + HNO_3 \quad (5)$$

$$HNO_2 + H_2O_2 \rightarrow HNO_3 + H_2O \quad (6)$$

$$HNO_3 \text{ (aqueous)} \rightarrow H^+ + NO_3^- \quad (7)$$

$$NH_4^+ + NO_3^- \rightarrow NH_4NO_3 \text{ (ammonium nitrate)} \quad (8)$$

In an embodiment, a gas effluent cleaning process for removing nitrogen oxide with high efficiency is used. The system includes an array of nozzles. The array of nozzles includes an orifice plate (nozzle plate) reshaping and fluid composition engineering for adapting to a wide range of fluids and operating conditions. According to the embodiment, the removal of $NO_x$ is performed by passing the gas through a high surface to volume gas liquid contactor unit as described herein. The gas effluent is passed horizontally (referred to as cross-flow) through the gas liquid contactor having substantially reduced contactor volume and gas flow pressure drop. Intersecting the cross flow gas flow are a plurality of low pressure, vertically oriented flat jet arrays composed of an aqueous based sorbent and of substantial surface area. The array of nozzles is configured to produce flat jet arrays that are aerodynamically shaped so as to provide stable jet flow with low liquid particle entrainment at relatively high gas velocity.

In embodiments of the invention, a sorbent for nitrogen oxide absorption and removal may include those systems that demonstrate high $NO_x$ capacity, high oxidative stability, low heat of reaction, low sorbent cost, low corrosivity and a salable product stream. In a preferred embodiment, an exemplary sorbent for effective $NO_x$ removal is about 28 wt % ammonia in water. The nozzle plate (described herein) may be optimized from a fluid and jet performance standpoint by adding about 1% to about 2% polymer or suspension to the aqueous ammonia solutions to enhance contactor performance. A preferred additive is such that it is neither reactive toward aqueous ammonia or interferes with the mass transfer process. A polymer or suspension that allows tailoring the sorbent properties (for example, viscosity) for achieving maximum jet performance (jet width, length, thickness, surface area) at minimum liquid side pressure drop may be used. An exemplary polymer additive is diethylene glycol. Other polymer additives include polyethylene oxide or polyvinyl alcohol. An exemplary inorganic additive is bentonite. Additional chemical compounds are preferred to aid in the rate of NO oxidation and thus the mass transfer kinetics. An exemplary additive to the preferred sorbent system is hydrogen peroxide. To avoid excessive hydrogen peroxide decomposition at high pH, a stabilizer is added to the sorbent mixture. An exemplary hydrogen peroxide stabilizer at high pH is poly(α-hydroxy acrylic acid). Hydrogen peroxide oxidation capability may be further enhanced by the addition of hydrogen peroxide catalysts. An exemplary hydrogen peroxide catalyst is Iron(III) tetra-amido macrocyclic ligand (TAML).

As discussed with regard to FIG. 33 the system can be utilized for a $NO_x$ capture. The process is described by the injection of a gas effluent containing $NO_x$ into the gas liquid chamber 2645. A gas plenum 2605 distributes the gas flow evenly across the liquid flat jets. Liquid jets are created by pumping the sorbent into a liquid plenum 2635 that distributes the sorbent evenly across the jet orifices. The created jets flow vertically downward into the contactor chamber and through a gas liquid separator into a catch tank 2620. In the gas liquid chamber 2645 the vertical flowing sorbent intersects the gas cross-flow. Nitrogen oxide is absorbed into the sorbent liquid and removed from the gas effluent stream. Clean gas effluent 2655 is discharged at the exit of the contactor chamber. The sorbent is recirculated for continuous $NO_x$ removal from the effluent gas stream. The performance of the gas liquid contactor was demonstrated on a small, sub-scale test bed as illustrated in FIG. 33. Table 6 summarizes the geometric parameters for the example.

TABLE 6

GAS LIQUID CONTACTOR GEOMETRIC DIMENSIONS

| Parameter | No. Jet Orifices | Jet Packing Density (jets/cm$^2$) | Single Jet Surface Area (cm$^2$) | GLC Channel Width (cm) | GLC Channel Height (cm) | GLC Channel Length (cm) | Specific Surface Area (cm$^2$) | Contactor Volume (cm$^3$) |
|---|---|---|---|---|---|---|---|---|
| Value | 96 | 4 | 22 | 25 | 25 | 30 | 5-10 | 11,250 |

The jet orifice geometry used in this example is described above. Prior to operation the liquid jet surface area was optimized for jet length, width and thickness by varying the pump backing pressure to the jet orifice plate. Further optimization with respect to jet surface area (length and width) can be obtained using additives (for example, diethylene glycol) to enhance the sorbent viscosity/surface tension properties or by reshaping the orifice nozzle.

An example of the gas liquid contactor operating conditions and performance is presented in Table 7. A sorbent system containing about 28 wt % aqueous ammonia was tested under the given operating conditions in Table 2. The sorbent did not contain an oxidizer (Ox) or viscosity additive to enhance the removal of $NO_2$. The effluent gas consisted of nitrogen ($N_2$) mixed with $NO_2$ at 500 ppmv. The gas mixture was injected into the contactor under ambient temperature and pressure conditions and measured using calibrated mass flow controllers. The liquid volumetric flow rate was determined by recording the amount of the liquid jet discharge into a calibrated receiving vessel over a measured time interval. The reduction of $NO_2$ concentration leaving the contactor was determined by measuring the optical absorbance of $NO_2$ at 400 nm. Background $NO_2$ concentrations were recorded prior to each run. A stable flow of $NO_2/N_2$ was first generated and the absorbance recorded without jet flow, $A_{Off}$. The jet flow (28 wt % AA) was then injected into the reactor chamber and the absorbance recorded. The amount of $NO_2$ reduced (absorbed) is expressed as a percentage using:

$$\% \ NO_2 \ \text{Reduction} = 100 \times (A_{off} - A_{on})/A_{off} \quad (1)$$

Figure 34:
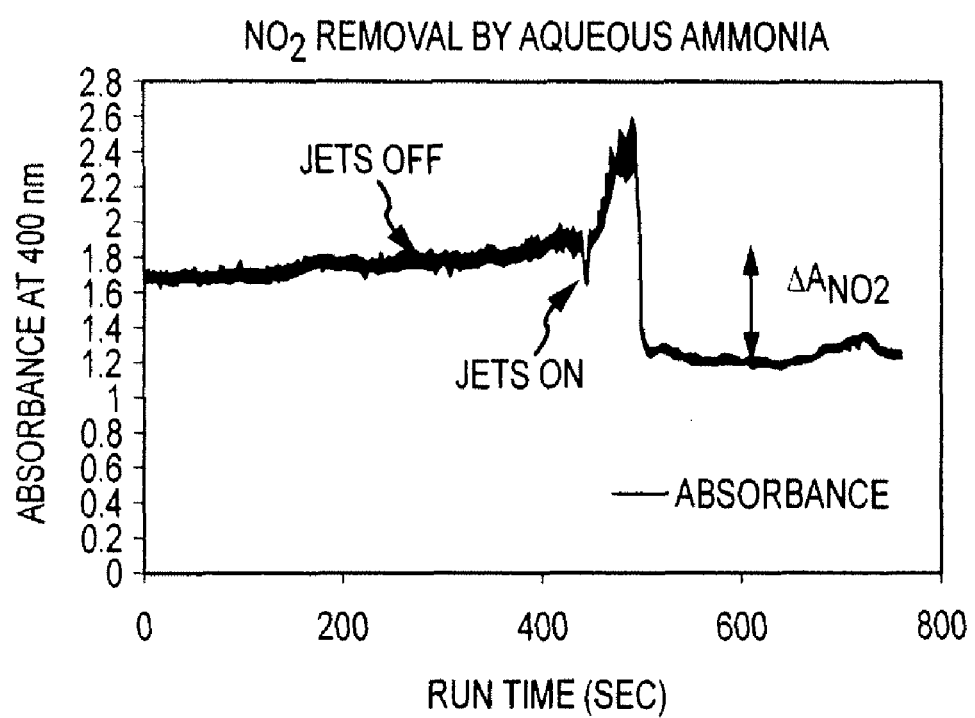
FIG. 34 is a graph of absorbance vs. run time for a $NO_2$ removal system.

FIG. 34 is a graph of absorbance vs. run time for a $NO_2$ removal system. Referring to FIG. 34, a representative $NO_2$ absorption spectrum with the liquid aqueous ammonia jets on and off is shown. The y-axis represents the absorbance at 400 nm and the x-axis represents time in seconds. As shown in this example, a short lived absorbance spike just after the start of the jet flow is attributed to a flow perturbation in the chamber. An average of four test runs was performed for each test result. The test results for $NO_2$ absorption under the described test conditions show adequate $NO_2$ removal (~35%) even without an oxidation enhancer (i.e., $H_2O_2$).

Hg Capture Device

Another embodiment of the invention is directed towards utilizing the gas liquid contactor to capture Hg. Gas liquid mass transfer operations take place across the gas liquid interface. The absorption rate of a gas into a liquid sorbent is controlled by the liquid phase mass transfer coefficient, $k_L$, the specific surface area (gas liquid interfacial surface area to volume ratio), a, and the concentration gradient between the bulk fluid, $C_L$ and the gas liquid interface, $C_L^*$. In many gas liquid reaction systems the solubility of the $C_L^*$ is low and control of the concentration gradient is limited. Therefore to improve the gas absorption rate, enhancement of the mass transfer kinetics and the interfacial surface area to volume ratio is required.

An embodiment of the invention, includes a high performance gas liquid contactor (as described herein, e.g., FIG. 33). The system is based on an array of high density, high surface area, aerodynamically shaped thin flat jets that improve the overall mass transfer and contactor performance. The gas liquid contactor is characterized by enhanced specific surface area ranging from about 1 to about 50 cm$^{-2}$, a generator volume of about 1/10th the volume of related art packed towers, low gas pressure drop across the contactor of less than about 5 Torr/lineal ft, a liquid jet driving pressure less than about 50 psi and more preferably less than about 20 psi, and minimal liquid entrainment in the gas flow.

In a preferred embodiment, the system includes a specific surface area in a range from about 10 cm$^{-1}$ to about 20 cm$^{-1}$, a generator volume of about 1/10th the volume of related art packed towers, a gas pressure drop of less than about 1 Torr, and a jet driving pressure of about 5 psi, and minimal liquid entrainment in the gas flow.

The gas liquid contactor can be used with a variety of aqueous-based sorbents that oxidize elemental mercury (Hg$^0$) to Hg(II). Once in the Hg(II) state, mercury becomes soluble in aqueous solutions and Hg(II) can catalytically remove elemental mercury (Hg$^0$) from the flue gas stream. The oxidants (OX) include but are not limited to sodium hypochlorite (NaOCl), and hydrogen peroxide (H$_2$O$_2$). The preferred oxidant to be used in the contactor is hydrogen peroxide (H$_2$O$_2$) with a catalytic (Cat) additive to enhance Hg$^0$ oxidation rates. An exemplary additive is HgCl$_2$, TAML (Iron(III) tetraamido macrocyclic ligand), catalase or peroxidase.

It is believed that the likely chemical mechanisms to Hg oxidation in the presence of aqueous hydrogen peroxide are:

$$H_2O_2 + Hg^0 \rightarrow Hg(II) + products \quad (1)$$

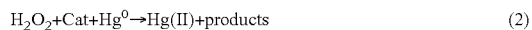
$$H_2O_2 + Cat + Hg^0 \rightarrow Hg(II) + products \quad (2)$$

In this embodiment a gas effluent cleaning process for removing mercury with high efficiency utilizes the high efficiency gas liquid contactor. The system includes an array of nozzles, e.g., orifice plate (as described above in relation to the nozzle plate) reshaping and fluid composition engineering for adapting to a wide range of fluids and operating conditions. The removal of Hg is performed by passing the gas through a high surface to volume gas liquid contactor unit as described in U.S. Pat. No. 7,379,487, which is hereby incorporated by reference. The gas effluent is passed horizontally (referred to as cross-flow) through the gas liquid contactor having substantially reduced contactor volume and gas flow pressure drop. Intersecting the cross flow gas flow is a plurality of low pressure, vertically oriented flat jet arrays composed of an aqueous based sorbent and of substantial surface area. The flat jet arrays are aerodynamically shaped so as to provide stable jet flow with low liquid particle entrainment at relatively high gas velocity.

In a preferred embodiment, sorbent for mercury absorption and removal are those systems that demonstrate high Hg capacity, high oxidative stability, low heat of reaction, low sorbent cost, low corrosivity and a salable product stream. An exemplary sorbent is aqueous with hydrogen peroxide, about 10 wt %, with a catalyst, about 0.1 wt %, to enhance the oxidation of elemental Hg$^0$ to Hg(II). The nozzle plate configuration may be optimized by adding about 1% to about 2% suspension to the aqueous hydrogen peroxide solution to enhance contactor performance. The additive may be designed such that it is neither reactive toward aqueous hydrogen peroxide or interferes with the mass transfer process. The additive may allow tailoring the sorbent properties (for example, viscosity) for achieving maximum jet performance (jet width, length, thickness, surface area) at minimum liquid side pressure drop. An exemplary additive is bentonite.

Additional chemical compounds are preferred to aid in the rate of Hg oxidation and thus the mass transfer kinetics. An exemplary additive to the preferred sorbent system is hydrogen peroxide. To avoid excessive hydrogen peroxide decomposition at high pH, a stabilizer is added to the sorbent mixture. An exemplary hydrogen peroxide stabilizer at high pH is poly(α-hydroxy acrylic acid). Hydrogen peroxide oxidation capability is further enhanced by the addition of hydrogen peroxide catalysts. An exemplary hydrogen peroxide catalyst is Iron(III) tetra-amido macrocyclic ligand (TAML).

As discussed with regard to FIG. 33 the system can be utilized for Hg capture. The process is described by the injection of a gas effluent containing Hg into the gas liquid chamber 2645. A gas plenum 2605 distributes the gas flow evenly across the liquid flat jets. Liquid jets are created by pumping the sorbent into a liquid plenum 2635 that distributes the sorbent evenly across the jet orifices. The created jets flow vertically downward into the contactor chamber and through a gas liquid separator into a catch tank 2620. In the gas liquid chamber 2645 the vertical flowing sorbent intersects the gas cross-flow. Mercury is absorbed into the sorbent liquid and removed from the gas effluent stream. Clean gas effluent 2655 is discharged at the exit of the contactor chamber. The sorbent is re-circulated for continuous Hg removal from the effluent gas stream.

H$_2$S Capture Device

Another embodiment of the invention is directed towards utilizing the gas liquid contactor to capture H$_2$S. Hydrogen sulfide is a highly toxic, flammable and noxiously smelling gas. It is considered a broad-spectrum poison; however, the central nervous system is primarily affected. The sources for anthropogenic hydrogen sulfide stem primarily from processing natural gas and high sulfur content crude oils. Natural gas can contain concentrations of H$_2$S up to about 28%. Man-made emissions account for about 10% of total global H$_2$S emissions. Petroleum refineries contribute the largest portion of industrial H$_2$S emission through hydrodesulfurization processes. Other industrial sources for H$_2$S include coke ovens, paper mills and tanneries.

Environmental concerns over refinery H$_2$S emissions and high sulfur containing fuel products (gasoline and diesel) have led to stringent government controls. These regulations have resulted in significant cost increases for natural gas and oil refinery operations. Numerous technologies for removing H$_2$S have been demonstrated.

The most prevalent approach is the Claus process as known in the art, which converts H$_2$S through oxygen combustion into elemental sulfur. One problem with the Claus process is that $CO_2$ present in the feedstock reacts with $H_2S$ to form carbonyl sulfide and carbon disulfide. Another is that due to equilibrium considerations some unreacted $H_2S$ becomes entrained in the elemental sulfur product. Other processes for $H_2S$ removal include reaction with alkanolamines (monoethanolamine, diethanolamine and methyldiethanolamine), iron oxide/sodium carbonate, thiosarsenate, quinine and vanadium metal processes. However, there is no single commercial approach that demonstrates high capability and cost efficiency for removing $H_2S$ from flue gas effluents. The significant cost drivers (excluding labor and construction equipment) for $H_2S$ capture are reagent cost, handling and waste processing, hardware (absorber vessel, flue gas handling and ductwork) and installation space constraints.

Achieving a hydrogen sulfide removal capability that is efficient and cost effective is a major technical challenge. Various performance areas for enhancing the $H_2S$ capture capability include reducing reactor vessel size, reducing pressure drop and using efficient mass transfer sorbent systems with salable byproducts. An embodiment of the invention is directed to achieving these target performances with innovative design approaches that couple high $H_2S$ absorption kinetics and value-added product streams.

Flat Jet Spray Contactor

Gas liquid mass transfer operations take place across the gas liquid interface. The absorption rate of a gas into a liquid sorbent is controlled by the liquid phase mass transfer coefficient, $k_L$, the specific surface area (gas liquid interfacial surface area to volume ratio), a, and the concentration gradient between the bulk fluid, $C_L$, and the gas liquid interface, $C_L^*$. In many gas liquid reaction systems the solubility of the $C_L^*$ is low and control of the concentration gradient is limited. Therefore to improve the gas absorption rate, enhancement of the mass transfer kinetics and the interfacial surface area to volume ratio is required.

An embodiment of the invention includes a high performance gas liquid contactor (as described herein, e.g., FIG. 33). The system is based on an array of high density, high surface area, aerodynamically shaped thin flat jets that improve the overall mass transfer and contactor performance. The gas liquid contactor is characterized by enhanced specific surface area ranging from about 1 cm$^{-2}$ to about 50 cm$^{-2}$, a generator volume of about ⅒th the volume of related art packed towers, low gas pressure drop across the contactor of less than about 5 torr/lineal ft, a liquid jet driving pressure less than 50 psi and more preferably less than about 20 psi, and minimal liquid entrainment in the gas flow.

In a preferred embodiment, the system includes a specific surface area in a range from about 10 cm$^{-1}$ to about 20 cm$^{-1}$, a generator volume of about ⅒th the volume of related art packed towers, a gas pressure drop of less than about 1 Torr, a jet driving pressure of about 5 psi, and minimal liquid entrainment in the gas flow.

The contactor can be used with a variety of conventional liquid (aqueous-based) sorbents that oxidize $H_2S$ and other sulfur based compounds. The oxidants (OX) include but are not limited to aqueous ammonia, alkanolamines (monoethanolamine, diethanolamine and methyldiethanolamine), iron oxide/sodium carbonate, thiosarsenate, quinine, vanadium metal processes, sodium hypochlorite (NaOCl), and hydrogen peroxide ($H_2O_2$). The preferred oxidant to be used in the contactor is a basic (pH>7) hydrogen peroxide ($H_2O_2$) solution with a catalytic (Cat) additive to enhance the oxidation rate and a stabilizer to control hydrogen peroxide decomposition. An exemplary catalytic additive is TAML (Iron(111) tetraamido macrocyclic ligand). An exemplary stabilizer is poly alpha hydroxyacrylic acid, sodium silicate or dimethylene triaminepentaacetic acid.

It is believed that the likely chemical mechanisms to $H_2S$ oxidation in the presence of aqueous basic hydrogen peroxide are:

  (1)

  (2)

Process for $H_2S$ Removal

This embodiment is directed towards a gas effluent cleaning process for removing hydrogen sulfide with high efficiency. The invention includes an array of nozzles including a nozzle orifice plate (see the description of the nozzle plate above) reshaping and fluid composition engineering for adapting to a wide range of fluids and operating conditions. The removal of $H_2S$ is performed by passing the gas through a high surface to volume gas liquid contactor unit as described above. The gas effluent is passed horizontally (referred to as cross-flow) through the gas liquid contactor having substantially reduced contactor volume and gas flow pressure drop. Intersecting the cross flow gas flow is a plurality of low pressure, vertically oriented flat jet arrays composed of an aqueous based sorbent and of substantial surface area.

The flat jet arrays are aerodynamically shaped so as to provide stable jet flow with low liquid particle entrainment at relatively high gas velocity. Sorbents for hydrogen sulfide absorption and removal are those that demonstrate high $H_2S$ capacity, high oxidative stability, low heat of reaction, low sorbent cost, low corrosivity and a salable product stream. An exemplary sorbent is aqueous with hydrogen peroxide, about 10 wt %, with a catalyst, about 0.1 wt %, to enhance the oxidation of $H_2S$. In order to optimize the contactor, about a 1% to about 2% suspension may be added to the aqueous hydrogen peroxide solution to enhance contactor performance. An example of an additive is such that it is neither reactive toward aqueous hydrogen peroxide or interferes with the mass transfer process. An example of an additive allows tailoring the sorbent properties (for example, viscosity) for achieving maximum jet performance (jet width, length, thickness, surface area) at minimum liquid side pressure drop. An exemplary additive is bentonite.

In a preferred embodiment, additional chemical compounds are used to aid in the rate of $H_2S$ oxidation and thus the mass transfer kinetics. An exemplary additive to the preferred sorbent system is hydrogen peroxide. To avoid excessive hydrogen peroxide decomposition at high pH, a stabilizer may be added to the sorbent mixture. An exemplary hydrogen peroxide stabilizer at high pH is poly($\alpha$-hydroxy acrylic acid). Hydrogen peroxide oxidation capability may be further enhanced by the addition of hydrogen peroxide catalysts. An exemplary hydrogen peroxide catalyst is Iron(III) tetraamido macrocyclic ligand (TAML).

As discussed with regard to FIG. 33 the system can be utilized for $H_2S$ removal. The process is described by the injection of a gas effluent containing $H_2S$ into the gas liquid chamber 2645. A gas plenum 2605 distributes the gas flow evenly across the liquid flat jets. Liquid jets are created by pumping the sorbent into a liquid plenum 2635 that distributes the sorbent evenly across the jet orifices. The created jets flow vertically downward into the contactor chamber and through a gas liquid separator into a catch tank 2620. In the gas liquid chamber 2645 the vertical flowing sorbent intersects the gas cross-flow. Hydrogen sulfide is absorbed into the sorbent liquid and removed from the gas effluent stream. Clean gas effluent 2655 is discharged at the exit of the contactor chamber. The sorbent is recirculated for continuous H₂S removal from the effluent gas stream.

CO₂ Capture Device Flat Jet Spray Contactor

Another embodiment is directed towards utilizing the gas liquid contactor to capture $CO_2$. Gas liquid mass transfer operations take place across a gas liquid interface. The absorption rate of a gas into a liquid sorbent is controlled by the liquid phase mass transfer coefficient, kL, the specific surface area (gas liquid interfacial surface area to volume ratio), a, and the concentration gradient between the bulk fluid, CL, and the gas liquid interface, CL*. In many gas liquid reaction systems the solubility of the CL* is low and control of the concentration gradient is limited. To enhance the gas absorption rate, gas liquid contactor designs should demonstrate increased mass transfer kinetics, gas liquid mixing and interfacial surface area to volume ratio.

An embodiment of the invention is directed towards a high performance gas liquid contactor as described above and is based on an array of high density, high surface area, aerodynamically shaped thin flat jets that improve the overall mass transfer and contactor performance.

An embodiment of the invention includes a high performance gas liquid contactor (as described herein, e.g., FIG. 33). The system is based on an array of high density, high surface area, aerodynamically shaped thin flat jets that improve the overall mass transfer and contactor performance. The gas liquid contactor is characterized by enhanced specific surface area ranging from about 1 to about 50 cm$^{-2}$, a generator volume of about ⅒th the volume of related art packed towers, a low gas pressure drop across the contactor of less than about 5 torr/lineal ft, a liquid jet driving pressure less than about 50 psi and more preferably less than about 20 psi, and minimal liquid entrainment in the gas flow.

In a preferred embodiment, the system includes a specific surface area in a range from about 10 cm$^{-1}$ to about 20 cm$^{-1}$, a generator volume of about ⅒th the volume of related art packed towers, a gas pressure drop of less than about 1 Torr, a jet driving pressure of about 5 psi, and minimal liquid entrainment in the gas flow.

To efficiently capture $CO_2$, the contactor can be used with a wide variety of aqueous-based sorbents including but not limited to monoethanolamine (MEA), hindered amines such as methylaminopropanol (AMP) and piperazine (PZ), potassium carbonate ($K_2CO_3$) and ammonium hydroxide (commonly called aqueous ammonia and abbreviated AA). Using the contactor with aqueous ammonia is especially beneficial since ammonium bicarbonate is created, which can be converted to urea (a fertilizer) or sold as chemical feedstock to reduce operating costs. It is believed the likely chemical mechanisms to $CO_2$ capture and byproduct generation in aqueous ammonia are:

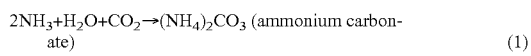

$2NH_3 + H_2O + CO_2 \rightarrow (NH_4)_2CO_3$ (ammonium carbonate) (1)

$(NH_4)_2CO_3 + CO_2 + H_2O \rightarrow 2NH_4HCO_3$ (ammonium bicarbonate) (2)

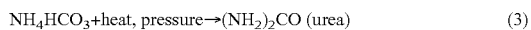

$NH_4HCO_3 + \text{heat, pressure} \rightarrow (NH_2)_2CO$ (urea) (3)

Process for CO₂ Removal

This embodiment is a gas effluent cleaning process for removing carbon dioxide with high efficiency via a gas liquid contactor of an embodiment of the invention. The system includes an array of nozzles including a nozzle orifice plate (the nozzle plate as described above) reshaping and fluid composition engineering for adapting to a wide range of fluids and operating conditions. The removal of $CO_2$ is performed by passing the gas through a high surface to volume gas liquid contactor unit as described above. The gas effluent is passed horizontally (referred to as cross-flow) through the gas liquid contactor having substantially reduced contactor volume and gas flow pressure drop. Intersecting the cross flow gas flow is a plurality of low pressure, vertically oriented flat jet arrays composed of an aqueous based sorbent and of substantial surface area. The flat jet arrays are aerodynamically shaped so as to provide stable jet flow with low liquid particle entrainment at relatively high gas velocity. A sorbent for carbon dioxide absorption and removal may be those that demonstrate high carbon dioxide capacity, high oxidative stability, low heat of reaction, low sorbent cost, low corrosivity and a salable product stream. An exemplary sorbent for effective $CO_2$ removal is about 28 wt % ammonia in water. In order to optimize the gas liquid contactor, about a 1% to about 2% polymer or suspension is added to the aqueous ammonia solutions to enhance contactor performance.

An example of an additive is one that is neither reactive toward aqueous ammonia or interferes with the mass transfer process. The preferred polymer or suspension allows tailoring the sorbent properties (for example, viscosity) for achieving maximum jet performance (jet width, length, thickness, surface area) at minimum liquid side pressure drop. An exemplary polymer additive is diethylene glycol. Other polymer additives include polyethylene oxide or polyvinyl alcohol. An exemplary inorganic additive is bentonite.

As discussed with regard to FIG. 33 the system can be utilized for $CO_2$ removal. The process is described by the injection of a gas effluent containing $CO_2$ into the gas liquid chamber 2645. A gas plenum 2605 distributes the gas flow evenly across the liquid flat jets. Liquid jets are created by pumping the sorbent into a liquid plenum 2635 that distributes the sorbent evenly across the jet orifices. The created jets flow vertically downward into the contactor chamber and through a gas liquid separator into a catch tank 2620. In the gas liquid chamber 2645 the vertical flowing sorbent intersects the gas cross-flow. Carbon dioxide is absorbed into the sorbent liquid and removed from the gas effluent stream. Clean gas effluent 2655 is discharged at the exit of the contactor chamber. The sorbent is re-circulated for continuous $CO_2$ removal from the effluent gas stream.

The performance of the gas liquid contactor was demonstrated on a small, sub-scale test bed as illustrated in FIG. 33. Table 7 summarizes the geometric parameters for the example.

TABLE 7

GAS LIQUID CONTACTOR GEOMETRIC DIMENSIONS

| Parameter | No. Jet Orifices | Jet Packing Density (jets/cm²) | Single Jet Surface Area (cm²) | Channel Width (cm) | Channel Height (cm) | Channel Length (cm) | Specific Surface Area (cm²) | Contactor Volume (cm³) |
|---|---|---|---|---|---|---|---|---|
| Value | 96 | 4 | 22 | 15 | 25 | 30 | 5-10 | 11,250 |

The jet orifice geometry used in this example is described above. Prior to operation the liquid jet surface area was optimized for jet length, width and thickness by varying the pump backing pressure to the jet orifice plate. Further optimization with respect to jet surface area (length and width) can be obtained using additives (for example, diethylene glycol or bentonite) to enhance the sorbent viscosity/surface tension properties or by reshaping the orifice nozzle.

An example of the gas liquid contactor operating conditions and performance is presented in Table 8. Two sorbent systems, aqueous ammonia and MEA, were tested under the given operating conditions. No viscosity additives were added to the sorbent mixture. The effluent gas consisted of air mixed with $CO_2$ at a typical $CO_2$: air dilution ratio of 1:9. The gas mixture was injected into the contactor under ambient temperature and pressure conditions and measured using calibrated mass flow controllers. The liquid volumetric flow rate was determined by recording the amount of the liquid jet discharge into a calibrated receiving vessel over a measured time interval. The amount of $CO_2$ reduced (absorbed) is expressed as a percentage using:

$$\% \ CO_2 \ Reduction = 100 \times (C_{in} - C_{out})/C_{in} \quad (1)$$

where $C_{in}$ and $C_{out}$ is the concentration of $CO_2$ entering the contactor and exiting the contactor, respectively. The relative amounts of $CO_2$ entering and leaving the contactor were determined by integrating the fundamental absorption band of $CO_2$ near 4.2 µm with Fourier Transform Infrared (FTIR) spectrometry.

Figure 35:
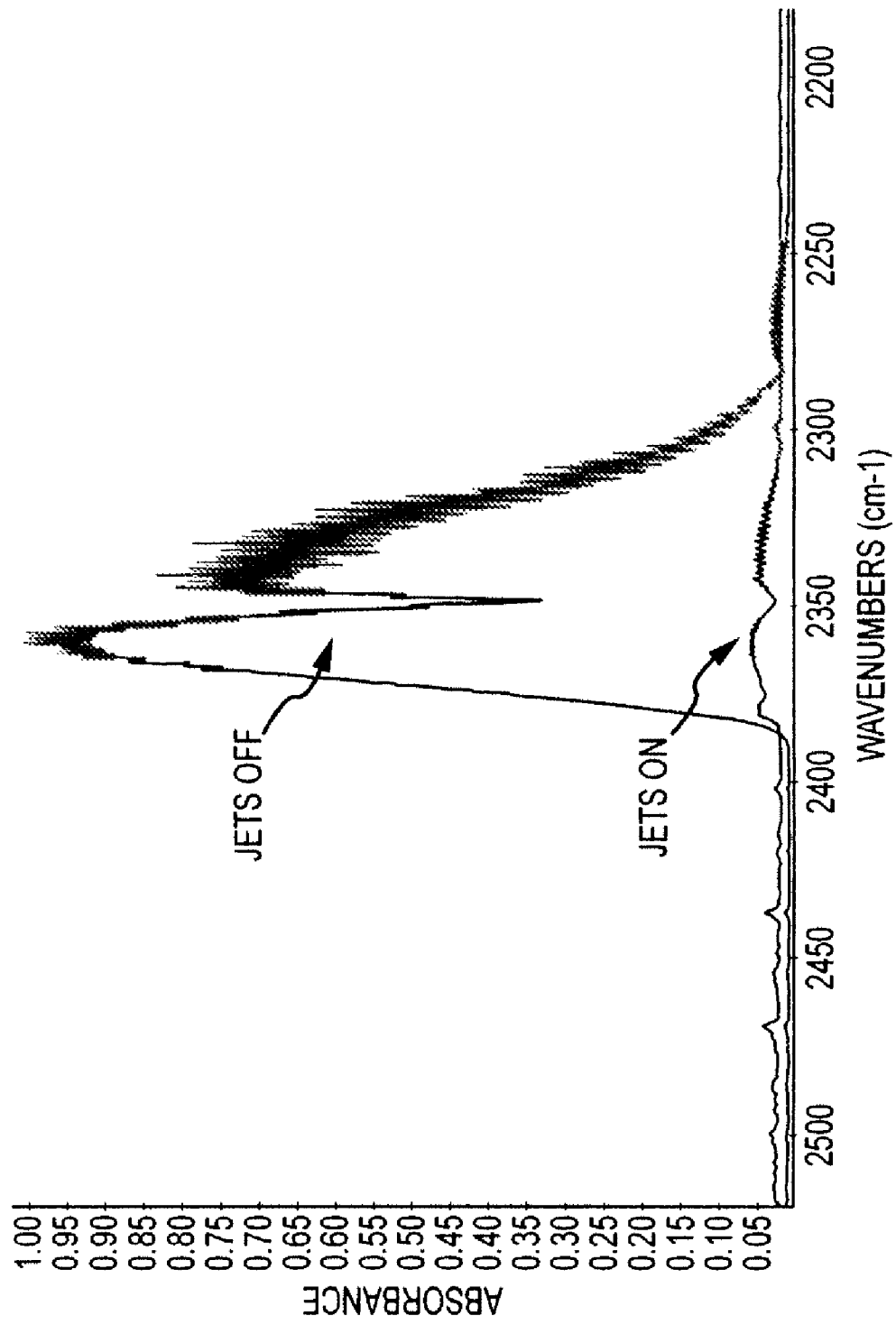
FIG. 35 is a graph of the $CO_2$ FTIR (Fourier Transform Infrared) absorption spectrum with the liquid aqueous ammonia jets on and off.

FIG. 35 is a graph of the $CO_2$ FTIR (Fourier Transform Infrared) absorption spectrum with the liquid aqueous ammonia jets on and off Referring to FIG. 35, an average of four test runs was performed for each test result. Background $CO_2$ concentrations were recorded prior to each run. Test results for $CO_2$ absorption under the described test conditions show greater than 90% $CO_2$ removal. The graph illustrates light absorbance of the $CO_2$ molecule in the optical range of its fundamental optical absorption region from 2400 $cm^{-1}$ to 2250 $cm^{-1}$. The graph clearly illustrates a reduction of absorbing species in this fundamental $CO_2$ region, indicative of efficient removal. Performing standard mathematical analysis to these spectra provides the concentrations providing these levels of absorbance, which are then examined by ratio to determine percent removal.

extent of the absorption process is governed by mass transfer operations, which include gas and liquid diffusion, solubility and chemical reactivity.

Gas liquid mass transfer operations take place across the gas liquid interface. The absorption rate of a gas into a liquid sorbent is controlled by the liquid phase mass transfer coefficient, $k_L$, the specific surface area (gas liquid interfacial surface area to volume ratio), a, and the concentration gradient between the bulk fluid, $C_L$, and the gas liquid interface, $C_L^*$. In many gas liquid reaction systems the solubility of the $C_L^*$ is low and control of the concentration gradient is limited. To enhance the gas absorption rate, gas liquid contactor designs should demonstrate increased mass transfer kinetics, gas liquid mixing and interfacial surface area to volume ratio.

An embodiment of the invention includes a high performance gas liquid contactor (as described herein). The system is based on an array of high density, high surface area, and aerodynamically shaped thin flat jets that improve the overall mass transfer and contactor performance. The gas liquid contactor is characterized by enhanced specific surface area ranging from about 1 to about 50 $cm^{-2}$, a generator volume of about ⅒th the volume of related art packed towers, a low gas pressure drop across the contactor of less than about 5 torr/lineal ft, a liquid jet driving pressure less than about 50 psi and more preferably less than about 20 psi, and minimal liquid entrainment in the gas flow.

In a preferred embodiment, the system includes a specific surface area in a range from about 10 $cm^{-1}$ to about 20 $cm^{-1}$, a generator volume of about ⅒th the volume of related art packed towers, a gas pressure drop of less than about 1 Torr, a jet driving pressure of about 5 psi, and minimal liquid entrainment in the gas flow.

Efficient capture of gas pollutants is obtained using a wide variety of aqueous-based sorbents in combination with a polymer additive to enhance jet surface area. Acid gases such as $H_2S$ and $CO_2$ are typically removed with alkanolamines, monoethanolamine (MEA) and diethanolamine (DEA). Baseline $SO_2$ and NOx sorbents include calcium carbonate mixtures (limestone/lime) and ammonium hydroxide (aqueous ammonia), respectively. Customizing the sorbent system to enable an all in one pollutant capture system is preferred since it simplifies and reduces the size of the pollution control contactor. The all in one system may be configured in series or

TABLE 8

GAS LIQUID CONTACTOR OPERATING CONDITIONS AND SORBENT
TOTAL LIQUID JET FLOW RATE (LPM) $CO_2$ ABSORPTION RESULTS

| Sorbent | Contactor Press. (Torr) | Total Gas Flow Rate (LPM) | Total Liquid Jet Flow Rate (LPM) | Liquid Jet Backing Pressure (psi) | Inlet $CO_2$ Conc. (%) | Inlet Gas Temp. (K) | Inlet Liquid Temp. (K) | % $CO_2$ Removed |
|---|---|---|---|---|---|---|---|---|
| AA (28 wt %) | 609 | 1.8 | 14 | 11 | 9.5 | 293 | 293 | 96 |
| MEA (30 wt %) | 609 | 1.8 | 14 | 11 | 9.5 | 293 | 293 | 91 |

System for Gaseous Pollutant Removal Flat Jet Spray Contactor

In embodiments of the invention pollutants may be eliminated in gas streams by a gas liquid contactor. The system transfers mass from one phase (gas) to another (liquid). In this process a gas stream passes through or is contacted with a sorbent in the form of a liquid spray or pool. Since the gas pollutant is soluble in the sorbent, it is dissolved or absorbed into the liquid sorbent and removed from the gas stream. The in parallel. Moreover, the all in one system utilizes a gas liquid contactor as described herein.

In a preferred embodiment, additives to enhance jet surface area are polyvinyl alcohol, polyvinyl oxide, ethylene glycol or diethylene glycol. Inorganic suspensions such as bentonite are also preferred as a treatment to enhance jet surface area. Aqueous ammonia is the preferred sorbent since it has the capability to remove $CO_2$, $SO_2$, $NO_x$ and $H_2S$. The addition of an oxidizing agent such as hydrogen peroxide helps oxidize NO and Hg, which are otherwise difficult to absorb in aqueous solutions. A hydrogen peroxide activation catalyst for operating at high pH is Iron(III) tetra-amido macrocyclic ligand (TAML). A preferred hydrogen peroxide stabilizer at high pH is poly(α-hydroxy acrylic acid). Aqueous ammonia is a particularly preferred sorbent since ammonium bicarbonate, ammonium nitrate and ammonium sulfate are byproducts of $NO_x$ and $SO_2$ reaction with aqueous ammonia. These products can be sold as fertilizer to reduce plant operating costs. The basic chemistry for an all in one pollutant capture and byproduct generation system is:

$SO_2$ Capture:

$$NH_3+H_2O+SO_2 \rightarrow NH_4^+ + HSO_3^- \quad (1)$$

$$NH_4^+ + HSO_3^- + NH_3 \rightarrow 2(NH_4) + SO_3^{2-} \quad (2)$$

$$2H_2O_2 + SO_3^{2-} \rightarrow H_2O + H_2SO_4 \text{ (sulfuric acid)} \quad (3)$$

$$H_2SO_4 + H_2O \rightarrow 2H^+ + SO_4^{2-} + H_2O \quad (4)$$

$$2NH_4^+ + SO_4^{2-} \rightarrow (NH_4)_2SO_4 \text{ (ammonium sulfate)} \quad (5)$$

$NO_x$ Capture:

$$NH_3 + H_2O \rightarrow NH_4^+ + OH^- \quad (1)$$

$$H_2O_2 + OH^- \rightarrow HO_2^- + H_2O \text{ tm} \quad (2)$$

$$HO_2^- + NO \rightarrow NO_2 + OH^- \quad (3)$$

$$NO_2 + NO_2 \rightarrow N_2O_4 \quad (4)$$

$$N_2O_4 + H_2O \rightarrow HNO_2 + HNO_3 \quad (5)$$

$$HNO_2 + H_2O_2 \rightarrow HNO_3 + H_2O \quad (6)$$

$$HNO_{3\,(aqueous)} \rightarrow H^+ + NO_3^- \quad (7)$$

$$NH_4^+ + NO_3^- \rightarrow (NH_4)NO_3 \text{ (ammonium nitrate)} \quad (8)$$

Hg Capture:

$$H_2O_2 + Hg^0 \rightarrow Hg(II) + \text{products} \quad (1)$$

$H_2S$ Capture:

$$H_2S + H_2O \rightarrow HS^- + H_3O^+ \quad (1)$$

$$HS^- + NH_3 + H_2O \rightarrow NH_4HS + OH^- \quad (2)$$

System Process for Gaseous Pollutant Removal

An embodiment of the invention is directed towards a system including an array of nozzles for gaseous pollutant removal. The array of nozzles includes a nozzle orifice plate reshaping and fluid composition engineering for adapting to a wide range of fluids and operating conditions. The removal of pollutant gases is performed by passing the gas through a high surface to volume gas liquid contactor unit as described above. The gas effluent is passed horizontally (referred to as cross-flow) through the gas liquid contactor having substantially reduced contactor volume and gas flow pressure drop. Intersecting the cross flow gas flow is a plurality of low pressure, vertically oriented flat jet arrays composed of an aqueous based sorbent and of substantial surface area. The flat jet arrays are aerodynamically shaped so as to provide stable jet flow with low liquid particle entrainment at relatively high gas velocity.

In a preferred embodiment, the preferred sorbent for gas absorption and removal are those systems that demonstrate high liquid jet performance, high gas loading capacity, high oxidative stability, low heat of reaction, low sorbent cost, low corrosivity and a salable product stream. The jet nozzle plate configuration (as described above) may be optimized in one embodiment by including about a 12% polymer or suspension added to the sorbent solution to enhance contactor performance.

The preferred additive is such that it is neither reactive toward the sorbent or interferes with the mass transfer process. The preferred polymer or suspension allows tailoring the sorbent properties (for example, viscosity) for achieving maximum jet performance (jet width, length, thickness, surface area) at minimum liquid side pressure drop. An exemplary sorbent is aqueous ammonia, about a 28 wt %, with a polymer additive or suspension to enhance liquid viscosity for optimum jet width, length and thickness at minimum driving pressure. An exemplary polymer additive is diethylene glycol. An exemplary inorganic suspension is bentonite.

Other additives may be used to aid in the rate of pollutant oxidation and thus the mass transfer kinetics. An exemplary additive to enhance the oxidation of pollutant molecules including but not limited to $Hg^0$ and $SO_2$ is hydrogen peroxide. To avoid excessive hydrogen peroxide decomposition at high pH, a stabilizer is added to the sorbent mixture. An exemplary hydrogen peroxide stabilizer at high pH is poly(α-hydroxy acrylic acid). Hydrogen peroxide oxidation capability is further enhanced by the addition of hydrogen peroxide catalysts. An exemplary hydrogen peroxide catalyst is Iron (III) tetra-amido macrocyclic ligand (TAML).

In one embodiment, a gas liquid contactor as described in FIG. 33 could be utilized for gaseous pollutant removal. The process is described by the injection of a gas effluent 2600 into the gas liquid chamber 2645. A gas plenum 2605 distributes the gas flow evenly across the liquid flat jets. Liquid jets are created by pumping the sorbent into a liquid plenum 2635 that distributes the sorbent evenly across the jet orifices. The created jets flow vertically downward into the contactor chamber 2645 and through a gas liquid separator 2650 into a catch tank 2620. In the gas liquid chamber 2645 the vertical flowing sorbent intersects the gas cross-flow. The gas pollutants are absorbed into the sorbent liquid and removed from the gas effluent stream. Clean gas effluent 2655 is discharged at the exit of the contactor chamber. The sorbent is re-circulated for continuous pollutant removal from the effluent gas stream. Table 9 summarizes a preferred embodiment of the geometric parameters for this embodiment.

TABLE 9

GAS LIQUID CONTACTOR GEOMETRIC DIMENSIONS

| Parameter | No. Jet Orifices | Jet Packing Density (jets/cm$^2$) | Single Jet Surface Area (cm$^2$) | Channel Width (cm) | Channel Height (cm) | Channel Length (cm) | Specific Surface Area (cm$^2$) | Contactor Volume (cm$^3$) |
|---|---|---|---|---|---|---|---|---|
| Value | 96 | 4 | 22 | 15 | 25 | 30 | 10 | 11,250 |

Prior to operation the liquid jet surface area was optimized for jet length, width and thickness by varying the pump backing pressure to the jet orifice plate. Further optimization with respect to jet surface area (length and width) can be obtained using preferred additives to enhance the sorbent viscosity/surface tension or by reshaping the orifice nozzle. However, for these tests no polymeric additives were added to the liquid sorbents.

Figure 39:
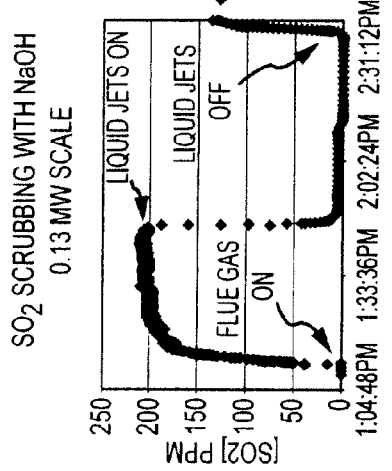
FIG. 39 is a graph of $SO_2$ scrubbing results using $H_2O$, NaOH (0.1 wt %), 0.13 MW scale.

An example of the gas liquid contactor operating conditions and performance is presented in Table 10. Two sorbent systems, aqueous ammonia and MEA, were tested under the given operating conditions. No viscosity or oxidant additives were added to the sorbent mixture. The effluent gas consisted of air mixed with $CO_2$ at a typical $CO_2$:air dilution ratio of 1:9. The gas mixture was injected into the contactor under ambient temperature and pressure conditions and measured using calibrated mass flow controllers. The liquid volumetric flow rate was determined by recording the amount of the liquid jet discharge into a calibrated receiving vessel over a measured time interval. The amount of $CO_2$ reduced (absorbed) is expressed as a percentage using:

$$\% \ CO_2 \ \text{Reduction} = 100 * (C_{in} - C_{out})/C_{in} \quad (1)$$

where $C_{in}$ and $C_{out}$ is the concentration of $CO_2$ entering the contactor and exiting the contactor, respectively. The relative amounts of $CO_2$ entering and leaving the contactor were determined by integrating the fundamental absorption band of $CO_2$ near 4.2 μm with Fourier Transform Infrared (FTIR) spectrometry. A representative $CO_2$ FTIR absorption spectrum with the liquid aqueous ammonia thin flat liquid jets on and off is shown in FIG. 39. An average of four test runs was performed for each test result. Background $CO_2$ concentrations were recorded prior to each run. Test results for $CO_2$ absorption under the described test conditions show greater than 90% $CO_2$ removal.

performance verified flue gas analyzer. The slipstream entered the unit at a temperature and pressure of 150F and 11.2 psiA, respectively. A 0.1 wt % NaOH solution was circulated through the system to scrub the $SO_2$.

Figure 37:
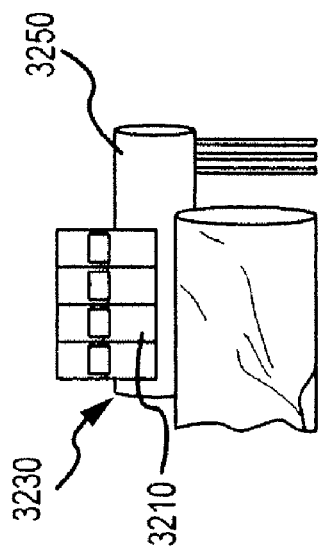
FIG. 37 is a picture of a gas liquid contactor.
Figure 38:
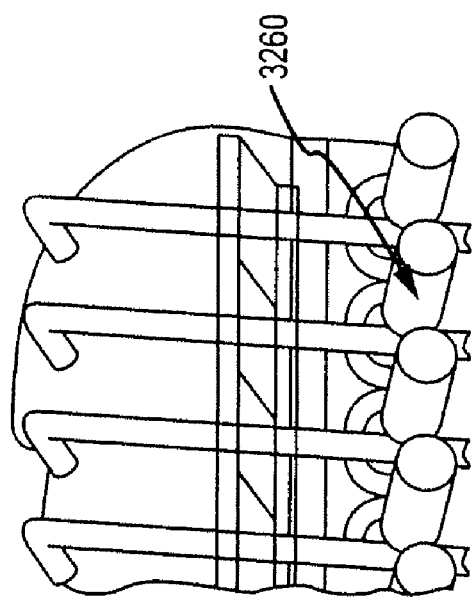
FIG. 38 is a picture of the solvent pumps of the system of FIG. 41.
Figure 36:
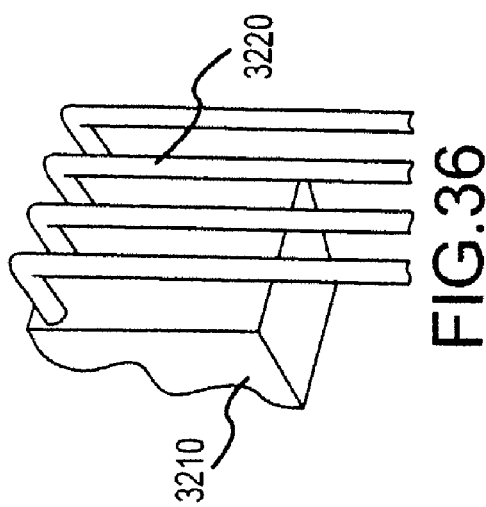
FIG. 36 is a picture of a 2 MW prototype system.

FIG. 36 is a picture of a 2 MW prototype system. FIG. 37 is a picture of a gas liquid contactor. FIG. 38 is a picture of the solvent pumps of the system of FIG. 36.

Figure 40:
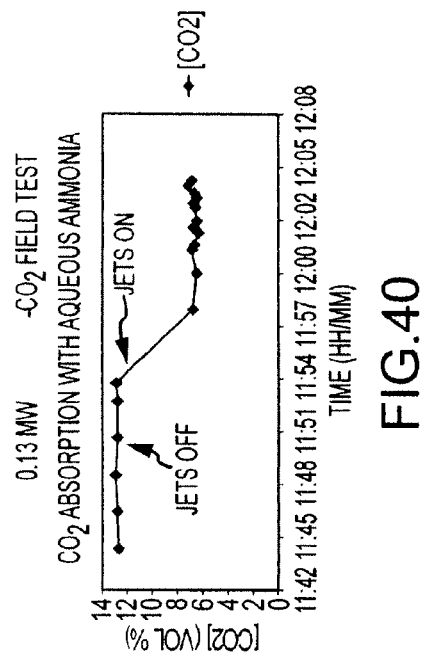
FIG. 40 is a graph of $CO_2$ scrubbing tests using 19 wt % aqueous ammonia, 0.13 MW scale.

Referring to FIG. 36, a gas liquid contactor 3210 contains a flat liquid jet contacting system as described herein. A solvent feed plenum 3220 provides solvent for contacting to the contactor 3210. In FIG. 37 the flue gas enters at flue gas entry point 3230 and proceeds to contactor 3210. The flue gas exits at flue gas exit point 3250. In FIG. 38, the solvent pumps 3260 are shown. FIGS. 39-40 are graphs showing target contaminant concentrations in flue gas from a coal fired power plant on the Y-axis without and with the gas liquid contactor engaged versus time on the X-axis. A TESTO 335 electrochemical analyzer was used for all three analytical measurements. FIG. 39 shows the concentration of $SO_2$ in the first small scale test using the contactor, at an equivalent flue gas draw of 0.13 MW. As the flue gas was turned on, concentrations of $SO_2$ reached approximate steady state at near 200 ppm. Engaging the contactor system immediately reduced these $SO_2$ emission levels to near instrument detection limits, again reaching steady state. The TESTO instrument remained sampling the system as the contactor was disengaged, showing an immediate rise in $SO_2$ concentrations towards the original contaminant levels. FIG. 40 is a figure depicting $CO_2$ levels in the same mechanical system, but using a different sorbent. The TESTO analyzer clearly shows a reduction in $CO_2$ levels over a period of 4 minutes, reaching steady state at that level.

TABLE 10

GAS LIQUID CONTACTOR OPERATING CONDITIONS AND $CO_2$ ABSORPTION RESULTS

| Sorbent | Contactor Press. (Torr) | Total Gas Flow Rate (LPM) | Total Liquid Jet Flow Rate (LPM) | Liquid Jet Backing Pressure (psi) | Inlet $CO_2$ Conc. (%) | Inlet Gas Temp. (K) | Inlet Liquid Temp. (K) | % $CO_2$ Removed |
|---|---|---|---|---|---|---|---|---|
| AA (28 wt %) | 609 | 1.8 | 14 | 11 | 9.5 | 293 | 293 | 96 |
| MEA (30 wt %) | 609 | 1.8 | 14 | 11 | 9.5 | 293 | 293 | 91 |

Pilot Testing at a Coal Fired Power Plant

In this experiment, a trailer mounted, 2 MW unit (10,000 ACFM gas flow) was designed and fabricated for pilot testing at a coal fired power plant. The device system consists of a gas plenum, a flue gas blower, a heat exchanger submodule, a gas liquid contactor module including a liquid capture and anti-splash submodule, a demister submodule, nozzle array assemblies, sorbent pumps, liquid handling sub-module, diagnostics and other ancillary components. The system is designed to run in a closed loop steady state or batch configuration and meet power plant priority pollutant waste water discharge requirements. The initial pilot tests were conducted at a 0.13 MW scale (nominally 650 ACFM flue gas) on a slipstream to reduce development time and risk. A 650 ACFM slipstream was diverted to the scrubber using two six inch steel pipes. The flue gas velocity in the contactor was matched to the power plant effluent duct velocity (56 ft/s, 17 m/s) using an entrance channel area of 0.2 ft². The gas residence time in the contactor was about 0.04 seconds. The system was operated with a 5 psi liquid side pressure drop and a minimal flue gas pressure drop of approximately 0.1 psi was observed. The flue gas emissions for $SO_2$, NO, $NO_2$, CO, and $CO_2$ were measured using an Environmental Protection Agency (EPA)

Also, deep $SO_2$ removal efficiencies (>99%) may be required for meeting emission requirements and pre-treating the flue gas for efficient $CO_2$ pollutant removal. Using the 0.13 MW scrubber, an $SO_2$ removal efficiency of about 99.5%, with an average of about 99% was achieved as seen in FIG. 39 was achieved. A scoping test for multi-pollutant removal using about 19 wt % aqueous ammonia was also performed as shown FIG. 40. Although the system was not optimized for $CO_2$ absorption (low as and short residence time), the unit absorbed more than 50% of the slipstream $CO_2$ under these conditions. In addition, more than 99.5% $SO_2$ and more than 80% $NO_x$ were simultaneously removed with aqueous ammonia. Through jet and solvent optimization, it is projected that only two units are needed to achieve 90% $CO_2$ removal efficiency.

Results were rapidly scaled and successfully used to demonstrate the operation of about 2 MW (8400 ACFM) modular pilot scrubber comprising parallel gas liquid contactor modules on the same power plant. The gas liquid contactor entrance channel area was about 3.9 ft², which provided a matching flow velocity to the power plant effluent of about 58 ft/s (18 m/s) and a residence time of about 0.07 seconds. Solvent flow rates were 2800 GPM, giving an L/G of about 330 GPM/1000 ACFM. The liquid pressure drop across the jets was about 6 psi. The entire gas side pressure drop for a total of about 2 MW contactor stage including mist eliminator sub-module and jet pack sub-module was 0.4 psi where the gas pressure drop was about 0.1 psi across about 3.3 ft of jet pack (0.03 psi/ft). The input and output flue gas temperatures were about 250° F. and about 115° F., respectively. A twenty four hour test operated in steady state (with solvent discharge) was performed with an average $SO_2$ scrubbing efficiency greater than 99%.

Figure 41:
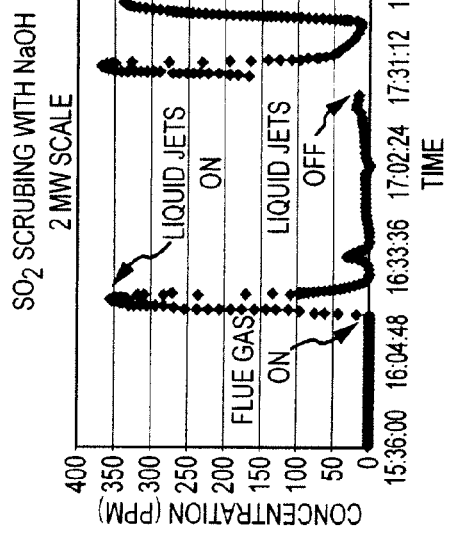
FIG. 41 is a graph of $SO_2$ scrubbing results using $H_2O$, NaOH (0.1 wt %), 2 MW scale.

FIG. 41 provides a view of a scaled up test for $SO_2$ capture with approximately 2 MW of equivalent flue gas flow through a larger contactor. Multiple on/off cycles were performed to confirm operational consistency. Referring to FIG. 41, a graph of $SO_2$ scrubbing results using $H_2O$, NaOH (0.1 wt %), 2 MW scale is shown. The graph includes on the x-axis time in hours and concentration is on the y-axis in ppm. As shown flue gas was being emitted at more than 350 ppm $SO_2$ as a contaminant molecule. The operation of the gas liquid contactor module removed virtually all of it $SO_2$. More particularly, to test whether this was reproducible, the contactor liquid jets were shut off, whereupon the $SO_2$ concentration again went above 350 ppm as shown in FIG. 41. Engaging the liquid jet module reduced the $SO_2$ concentration to near baseline. Repeating this consistently produces the same results as shown in FIG. 41. Also, recent follow up tests confirmed the $SO_2$ removal efficiency. In addition, a simulated waste water treatment experiment using the spent solvent is being performed in the laboratory to demonstrate precipitation of calcium sulfate.

Embodiments of the invention are directed towards a modular gas liquid contactor or gas liquid contactor including post-combustion technology for removing multiple flue gas pollutants ($SO_x$, $NO_x$, $CO_2$ and particles) over a wide range of flue gas conditions. Wet scrubber systems are susceptible to operational shutdowns due to mechanical or emission compliance failure. The gas liquid contactor scrubber systems are designed as small footprint packages to meet continuous on-line operation with performance, flexibility, serviceability and reliability.

Although the actual performance metrics (for example, removal of $SO_2$) are directly comparable with conventional methods and equipment designs, the designs, methods, and systems presented in this invention which provide that process equivalency are very surprising; the size and cost to produce these results can be more than ten times smaller at less than half the capital cost, respectively, of conventional systems.

A modular design approach is used for manufacture and scaling of the modular gas liquid contactor scrubber unit. Scrubber modules are added in parallel or serially to achieve the necessary pollutant removal performance. This is enabled by the low pressure drop, e.g., about a 0.4 psi pressure drop and the low parasitic power requirements, e.g., less than about 0.8% per stage. This approach standardizes the manufacturing yet allows customization of a scrubber unit per site requirements. The modular gas liquid contactor is factory built in an assembly line production process.

Gas Liquid Contactor Modules

Figure 42:
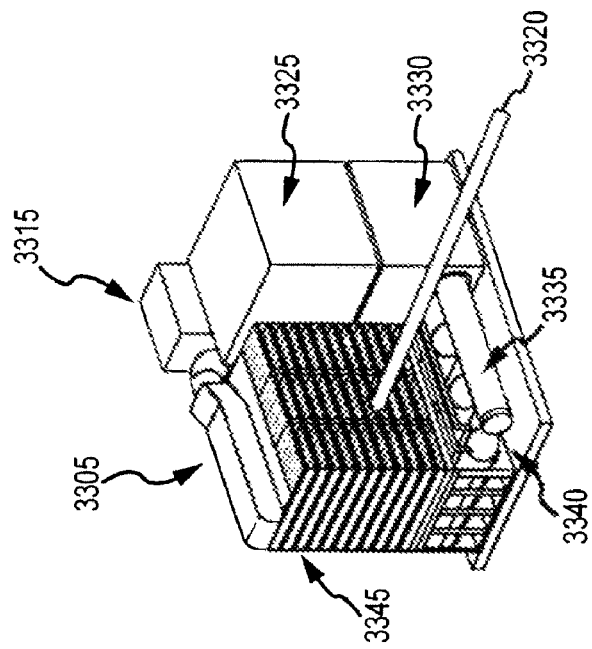
FIG. 42 is a representation of 60 MW scrubbing unit and supporting structures.
Figure 43:
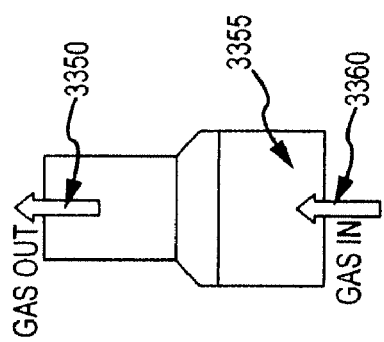
FIG. 43 is a front view of one section 2 MW section of the scrubber tower FIG. 47.
Figure 44:
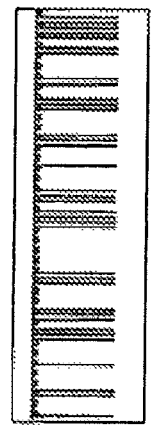
FIG. 44 is a side view of one section 2 MW section of the scrubber tower of FIG. 47.
Figure 45:
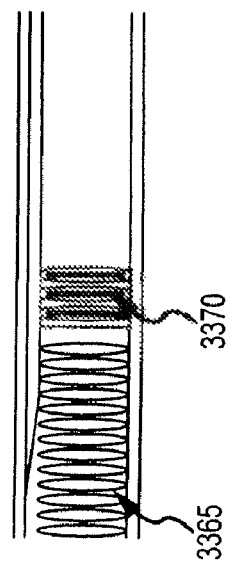
FIG. 45 shows the geometry of the entrance channel and jet pack zone.

FIG. 42 is a representation of a 60 MW scrubbing unit and supporting structures. FIG. 43 is a front view of one section 2 MW section of the scrubber tower of FIG. 42. FIG. 44 is a side view of one section 2 MW section of the scrubber tower of FIG. 42. FIG. 45 shows the geometry of the entrance channel and jet pack zone. In this embodiment, the system is configured to be less than about 600 lbs and have dimensions of about 5 ft×10 ft×10 ft. These units can also handle more than about 85,000 cfm of flue gas flow and may be scaled up or down as needed.

The units are modules that are designed to be stacked in parallel and sized as needed for power plants. In one parallel configuration the modules are either on top of or next to (side by side) each other. Incoming gas stream is split, e.g., equally, amongst the parallel modules, each module providing equivalent processing. In one embodiment a 20 MW composite module is created (85,000 cfm) by vertically stacking ten 2 MW base modules. Three 20 MW modules are then horizontally coupled to produce a 60 MW system with the incoming gas stream split equally between the three 20 MW modules including the 60 MW system.

In this embodiment and as shown in FIG. 42, sorbent is fed from sorbent storage tank 3315 to the scrubbing system at solvent feed plenum 3305 where it is pumped through a plurality of nozzles configured in a nozzle array. The nozzle array is configured to provide essentially planar liquid jets, each of said liquid jets comprising a planar sheet of liquid, said plurality of liquid jets lying in substantially parallel planes. The flat liquid jets are formed in scrubber tower 3345, where a flow of gas 3320 is passed parallel to the flat surfaces of the jets. After the sorbent falls to the bottom of the tower a heat exchanger 3340 captures heat that has been absorbed by the sorbent in the contacting process. The sorbent then flows in conduit 3335 to a pump house 3330 where it is subsequently pumped to a water treatment system 3325.

The water treatment system depicted at 3325 is for schematic reference only in that, depending on secondary or tertiary treatment of the liquid, this segment 3325 of the contactor system can be small or large. For example, a small system might only include a heat exchanger for dissolution of the captured gas phase molecule and might fit into the "box" depicted in FIG. 42. A large system might include precipitation tanks, settling tanks, and solid press subsystems which could be large, depending on the chemistry and applications being applied.

The pump house depicted in 3330 would be an appropriately sized liquid pump to deliver an appropriate volume of liquid to the contactor system as known in the art. The block depicted in 3330 is optional, but would depend on the site environment and choice of pump and whether that pump choice needs to be protected from rain or snow.

Now referring to FIGS. 43-45 illustrating a geometry of the spray pack base units. The base units or base module in this embodiment consists of about 25 cm×130 cm entrance channel and about a 1.7 $m^2$ spray pack area that contains approximately 5 sprays/$cm^2$ based on a total of 3400 nozzles (40 rows of 85 nozzles) in the spray pack. FIG. 43 shows an effluent entrance 3360, an effluent exit 3350, and a jet pack zone 3355. The jet pack zone 3355 is the actual contactor volume where liquid jets and gas molecules contact one another. In FIG. 45 a jet scrubbing pack 3365 is shown as a side cutaway, followed by spray or mist eliminator 3370, which eliminates entrained fluid from the effluent stream. Although the velocity of the liquid jets is high, some liquid still is entrained in the gas flow, particularly as gas velocities become higher. This entrainment includes small droplets; e.g., an aerosol or mist. The mist eliminator provides a small zone where the small mist droplets move through a zone with elements as represented by 1660 in FIG. 29, condensing on the surface of those elements and flowing back into the liquid sump system. In this particular embodiment, these elements are vertical rods, but any design which provides a small pressure drop and causes turbulent gas flow combined with a condensation/coalescence surface can be envisioned, including but not limited to mesh, heat exchanger elements, or aerodynamic plate or baffles.

Figure 46:
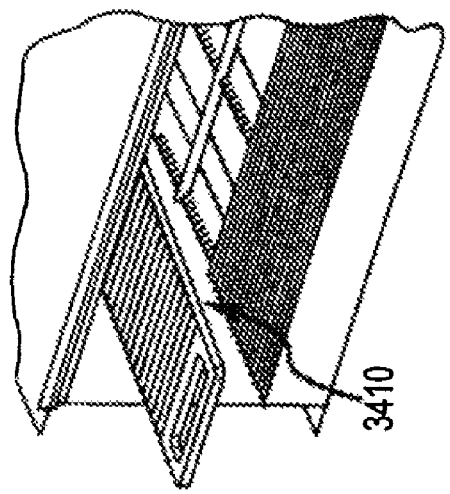
FIG. 46 shows a representation of a jet pack zone with removable nozzle plate.
Figure 47:
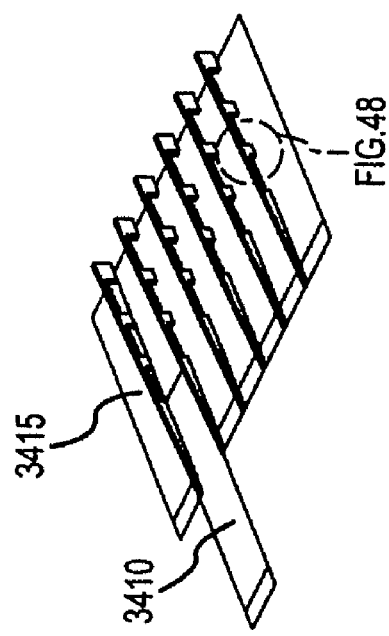
FIG. 47 shows the configuration of the nozzle plates in the jet pack zone of FIG. 51.
Figure 48:
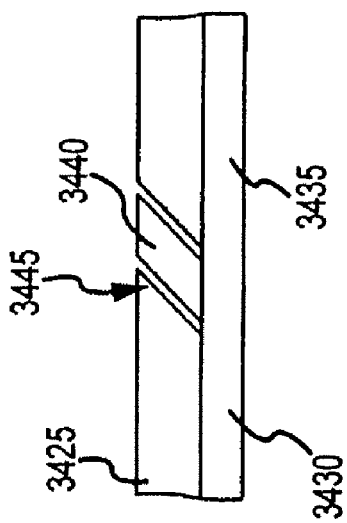
FIG. 48 shows a seal system for the jet pack zone of FIG. 46.

FIG. 46 shows a representation of a jet pack zone with removable nozzle plate according to another embodiment of the invention. FIG. 47 shows the configuration of the nozzle plates in the jet pack zone of FIG. 46. FIG. 48 shows a seal system for the jet pack zone of FIG. 46. As shown, the modular gas liquid contactor is designed for serviceability, accessibility and reliability. The system, e.g., gas liquid contactor or scrubbing unit may use a snap-fit design approach for the array of nozzles including an orifice plate so that worn or clogged orifices can be replaced without ceasing operations. The system may also be designed with redundancy into the mechanical equipment and support systems. For example, large plant installations include about a 20% spare concept so parallel units can be serviced if necessary without disrupting plant operations.

Now referring to FIG. 46, a removable plate 3410 is shown in a partially removed position. The removable plate 3410 includes a plurality of nozzle plates having a plurality of rows of nozzles for creating a plurality of parallel flat liquid jets. FIG. 47 shows an entire section of removable plates 3410. Removable plate 3415 is shown in set position and removable plate 3410 is shown being removed. FIG. 48 shows a sealing mechanism 3440 designed to seal jet plate 3425 onto sealing surface 3435 with an elastomeric seal 3430. That is, as shown a side view to a small section of the edge of the jet plate 3425, a small magnification of the edge of a standard jet plate, e.g., 3410 or 3415. In this embodiment, the jet plate is installed as per 3415, the edge of 3415 having a series of small angled grooves in which pin 3440 attached to the frame 3435 fits into the groove 3445. The angle of the groove 3445 is such that torque applied in the direction to seal causes the angle of the groove to act as a cam against the pin 3440, resulting in pressure against the elastomeric seal 3430. Although this is one specific embodiment, one skilled in the art of mechanical systems and sealing of hydraulic surfaces could well envision alternatives that would be equally functional.

Modular Gas Liquid Contactor for $SO_x$, $NO_x$, and Particulates Process

Another embodiment is directed towards a design that has been analyzed for deep flue gas $SO_2$ removal using a Na/Ca dual alkali process that incorporates the compact, high performance, low cost, low water usage and highly energy efficient gas liquid contactor system or scrubber system with advanced waste water and product stream processing. The design requirements for this process are provided in Table 11.

TABLE 11

DESIGN REQUIREMENTS FOR GLC $SO_2$ REMOVAL

| Parameter | Requirement |
| --- | --- |
| $SO_2$ Scrubbing | >99% |
| $NO_x$ Scrubbing | >80% |
| Particulate Matter Scrubbing | >99% |
| Sulfate Removal | >99% |
| System Parasitic Load | <1% |
| Removal of Liquid Entrainment (mist) | >99% |
| Solvent Loop pH | 6 |
| Solvent Loop Temperature | 107° F. |
| Solvent Loop Flow Rate | 28000 GPM |
| Water Make-up to Scrubber | 12 GPM |
| Caustic Capacity | 7 days |
| Bleed Stream to Absorber Loop Flow Ratio | <1/500 |
| Brine Stream to Recycled Solvent Flow Ratio | <1/40 |
| Continuous operation | 24 hrs/day, 7 days/week |

Flue Gas Conditioning System

Figure 49:
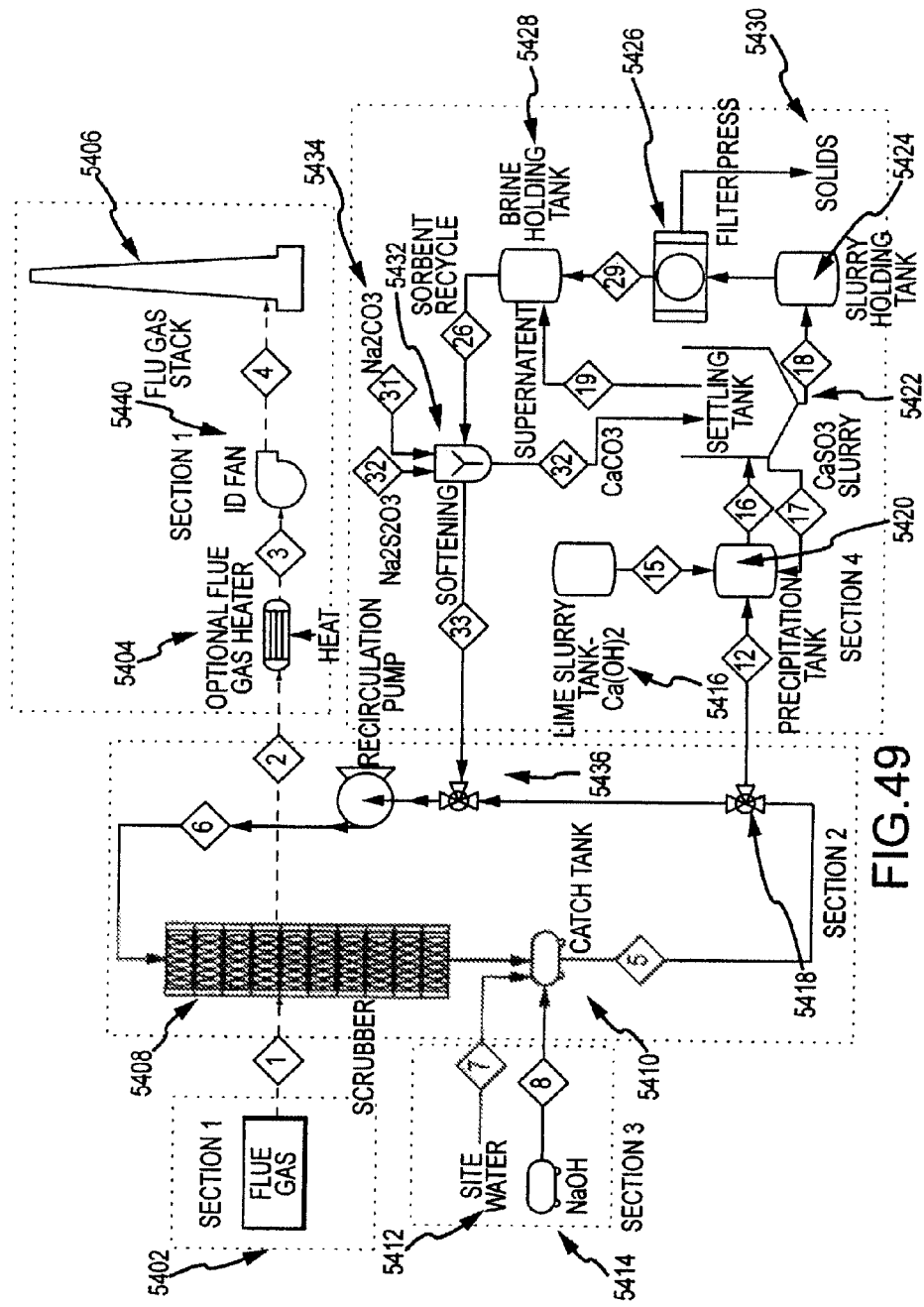
FIG. 49 is a process flow diagram for a pollutant removal system according to another embodiment of the invention.

In an application where flue gas is processed using an embodiment of this invention, the methodologies employed can be described in general terms. These generalities can be customized depending on site and application requirements but can roughly be broken into four sections. FIG. 49 is a process flow diagram for a pollutant removal system. Referring to FIG. 49, the baseline process flow diagram for the gas liquid contactor system shows major system components and key stream points. The four sections include: Section 1. flue gas or process gas section, Section 2. a scrubber or reactor section, Section 3. sorbent or reactant input, and Section 4. reaction product processing and sorbent recycle (or release). Although, for the purposes of this embodiment, these four sections will be described in greater detail for the application of one instance of a flue gas desulfurization application, one skilled in the art would recognize that these processes could be further modified to address a large number of various processes that could benefit from high efficiency gas liquid contacting systems.

Referring to Section 1, flue gas 5402 is generated and released from an industrial process, e.g., coal fired plant. The flue gas enters Section 2 at process point 1 (PP1), the gas flows through and is processed in Section 2 past PP2, the gas is then heated in the optional flue gas heater 5404 (if required), then flows to a fan or blower at PP3, which forces the flue gas at PP4 into the flue gas stack 5406 for release. Flue gas can contain a number of contaminants depending on the source of the fuel and the efficiency of the burn. In this embodiment it is assumed that only $SO_x$, $NO_x$, $H_2O$, $CO_2$, HCl, and HF are formed in the boiler feeding the reactor system described in FIG. 49. In between generation and release of the flue gas 5402, a slipstream of that flue gas stream (some or all) is redirected into a pollution abatement or scrubber system, e.g., Sections 2-4.

Section 2 includes a gas liquid contactor modular assembly 5408 which performs as the scrubber or reactor according to various embodiments of the invention. This section removes $SO_2$, HCl, HF, and some $NO_2$ from the flue gas when using the chemistry described in FIG. 49. The removal efficiency of $CO_2$ from this flue gas stream and chemistry described in FIG. 49 can be marginal; it can be improved dramatically depending on the chemistry used and pH of the sorbent, but for this embodiment, it will be assumed that $CO_2$ is not captured to a large extent. The contactor 5408 captures $SO_2$, HCl, and HF. The fluid comprising the liquid of the liquid jet is an aqueous solution. That solution, with gases entrained, is captured in a catch tank 5410. In Section 2, the capture fluid is recirculated using a recirculation pump through PP6. A slipstream of this recirculated fluid is drawn off through process valve 5418 for secondary processing in Section 4.

Section 3 is the sorbent and solvent make up fluid section which is configured to adjust chemical activity, liquid pH, or replenish reactants. Any liquid lost through evaporation is replenished with a local water source 5412 through PP7. The liquid is established with relatively high pH (above 7), and is maintained at that level by a NaOH source 5414 through PP8 or, once concentrations of soluble sulfite reach a more steady state, pH is maintained by addition of lime 5416 in Section 4.

Section 4 is the secondary processing section where dissolved or reacted gas phase molecules are chemically converted or mineralized to solid products, e.g., $CaSO_4$, solid waste, e.g., $CaSO_3$, or other useful products, e.g., fertilizer/ $NH_4SO_4$ or $NH_4NO_3$. Process liquid is drawn from Section 2 through PP12 into a precipitation tank 5420 where lime/Ca $(OH)_2$ 5416 is added at PP15 both to increase pH and to provide $Ca^{2+}$ for reaction/precipitation with $SO_3^{2-}$ (or in fully oxidized mode, $SO_4^{2-}$). The resulting mix of $CaSO_3$ flows through PP16 into a settling tank 5422 and is stored after settling in a slurry holding tank 5424. Once a sufficient amount of $CaSO_3$ has been captured, it is moved to a filter press 5426 to remove the liquid, which moves through PP29 to a brine holding tank 5428. The solids 5430 from the filter press 5426 are disposed of either by landfill or sale for tertiary process, e.g., $CaSO_4$ for gypsum/sheetrock. Liquid from the brine tank 5428 is moved through PP26 for recycle and regeneration in a softening step 5432 to remove excess $Ca^{2+}$ and replenish $Na^+$ through addition of soda ash ($Na_2CO_3$) 5434. The regenerated sorbent is then sent back through PP33 to Section 2 via a second process valve 5436.

In the specific embodiment shown in FIG. 49 a 20 MW system takes a portion of the flue gas from a 140 MW coal fired power plant. The flue gas is generated by burning low sulfur coal, e.g., coal from Powder River Basin (Wyoming). Specific attributes considered in this embodiment are shown in Table 12. The coal burn produces roughly about 350 to about 400 ppm of $SO_2$ in the flue gas, a contaminant which is the principal target for removal in this system example. Other contaminants include HCl, HF, $NO_x$, and some Hg. This is the front side of Section 1, with gas flow rates in this slipstream at roughly 84,000 ACFM as shown in Process Point 1 (PP1). The temperature of the incoming flue gas at PP1 is in range from about 250° F. to about 300° F. and comes from the power plant fly ash bag house. The fly ash bag house removes the bulk of the fly ash produced by coal burning and also serves to reduce the temperature to a consistent range as stated. The concentration of water in this flue gas is in a range from about 6% to about 7% by mass.

At PP1, the flue gas slipstream enters into Section 2, the scrubber section. The flue gas flows through the gas liquid contactor 5404 at a gas velocity at roughly 10 m-sec$^{-1}$. The gas liquid contactor is described herein. The sorbent liquid being used is sodium sulfite formed by the initial start up reaction of NaOH with $SO_2$. A 50% by weight sodium hydroxide solution is added to water in the sorbent loop to initially develop and maintain a pH of roughly 6.5. The NaOH can be used during continuous operation to maintain this pH at about 6.5, if necessary. At start up, water can absorb some $SO_2$, but this quickly leads to a drop in pH and an acidic solution. Therefore, the NaOH serves to maintain the roughly neutral pH and provide $Na^+$ as a counter ion for $SO_3^{2-}$. The equations below describe the main reactions of interest in this system, which results in removal of $SO_2$.

$$SO_2+H_2O \rightarrow 2H^+ + SO_3^{2-} \quad (1)$$

$$2NaOH+2H^++SO_3^{2-} \rightarrow 2Na^+ +SO_3^{2-}+2H_2O \quad (2)$$

In steady state operation, it is the sodium sulfite solution which effectively reacts with $SO_2$, building up to approximately 0.5M concentration, reacting to form sodium bisulfite in water. The chemical equation describing the overall reaction is:

$$Na_2SO_3+SO_2+H_2O \rightarrow 2NaHSO_3 \quad (1)$$

The flue gas exiting the contactor has been evaporatively cooled dramatically to a temperature in the range of about 100° F. to about 125° F. A mist eliminator downstream of the contactor but inside the module removes excess water. Once the flue gas exits the gas liquid contactor region depleted of $SO_2$ (PP2), it is optionally heated with a flue gas heater 5404 (to increase temperature well above dew point), passed through an ID Fan 5440 and released to the flue gas exhaust stack 5406. Other options for flue gas conditioning include using a gas to gas heat exchanger, converting to wet stack configuration, or using power plant waste steam for reheating. In some cases, waste heat from the overall sorbent processing system can be used as it would be favorable to reheat the flue gas using the hot desorbed gases in a thermal desorption step coming off the stripper. Continuous operation of the gas liquid contactor 5408 would lead to a build up of sodium bisulfite and a reduction in $SO_2$ absorption efficiency unless the $SO_2$ reaction products are removed. As such, a slipstream (PP12) of the liquid sorbent recirculation system in Section 2 is withdrawn on a continuous basis into a secondary chemical processing system.

In that secondary processing system shown in Section 4, $SO_2$ is fully mineralized, forming a solid product of calcium sulfite (PP16). The calcium sulfite is subsequently filtered (PP18), removing excess water, and appropriately disposed of, e.g., in a landfill (PP24). Lime ($Ca(OH)_2$) is used to mineralize the sulfite to a solid precipitate (PP15), and also serves to further maintain pH at appropriate levels as a substitute for further NaOH additions into the sorbent loop. The reactions performed in secondary processing are:

$$2Ca(OH)_2+4NaHSO_3 \rightarrow (CaSO_3)_2H_2O+2Na_2SO_3+3H_2O$$

Calcium scale issues are avoided by then removing excess calcium in a "softening" step (PP26) using standard ion exchange processes utilizing sodium carbonate (water soluble—PP31) to form calcium carbonate (insoluble at this pH) which is diverted to the filter press process (PP32). In this same step, sodium thiosulfate can be added (PP34) to help inhibit oxidation of the sulfite ($SO_3^{2-}$) to sulfate ($SO_4^{2-}$). The process also serves to reproduce the primary $SO_2$ capture reagent, $Na_2SO_3$:

$$CaSO_3+Na_2CO_3 \rightarrow CaCO_3+Na_2SO_3$$

Subsequent to softening and regeneration of the active sorbent chemistry, this is recycled back to the main contactor process loop (PP33).

$SO_2$ and Process Module Removal System

The process analysis and sizing of the gas liquid contactor scrubber absorber system is based on the design parameters in Table 12.

TABLE 12

DESIGN VARIABLES FOR THE 20 MW GLC ABSORBER SYSTEM

| Parameters | Value |
|---|---|
| Flue Gas (a) | |
| Flow Rate | 84,084 ACFM |
| Velocity | 30-50 ft/s |
| Residence Time | 0.07-0.10 s |
| Temperature | 250-300° F. |
| Pressure | −10 inches w.c. |
| Ambient Pressure | 810 mBar |
| $SO_x$ | 400 ppm |
| Dew Point $SO_3/H_2SO_4$ | 179° F. |
| Liquid Flow | |
| Flow Rate | 28,000 gpm |
| Temperature | 107° F. |
| Sorbent | $SO_x$: dilute NaOH/$Na_2SO_3$ |
| Salt Load | 14.4% (wt) $Na_2SO_4$ (~1.0 M) |
| pH | 6.5 |
| Pressure Drop | |
| Gas Side | <0.03 psi-ft$^{-1}$ |
| Liquid Side | <8 psi |

TABLE 12-continued

DESIGN VARIABLES FOR THE 20 MW GLC ABSORBER SYSTEM

| Parameters | Value |
|---|---|
| Emission Removal Requirements | |
| $SO_x$ | >99% |
| Absorber Specific Surface Area | >8 cm$^{-1}$ |
| L/G | <330 gal/1000 CFM |

The gas liquid contactor (absorber) is operated in a continuous, steady state mode using flat jet spray nozzles in a cross-flow configuration. The absorber demonstrates high overall volumetric mass transfer (Kca~64 s$^{-1}$) that maximizes $SO_2$ removal efficiency with minimal use of water, reactor volume, pressure drop and contact time.

The absorber exhibits low gas and liquid side pressure drops which translate to low power consumption. The pressure drop across the liquid jet orifices is less than about 10 psi, greatly reducing hydraulic power requirements for operation. A 28,000 gpm liquid pump for circulating the solvent constitutes the bulk of the power consumption in the absorber loop. The power draw, P (kW)=[0.75×Flow rate (gpm)×P]/[1714×pump efficiency)] is about 150 kW (or about power draw at 20 MWe) for about 8 psi pressure drop and pump efficiency of about 65% at about 28,000 gpm. Gas side pressure drop in the flat jet system is small at about 0.1 psi (2.7 in w.c.) across about 3.3 ft of jet pack.

In comparison, an average pressure drop for a packed tower of the related art is about 1.0 inch $H_2O$ per foot of packing, or about 10 inches $H_2O$ for a typical 10 foot absorber bed. There is reduced power consumption of the gas liquid contactor as compared to conventional technology, the absorber can be run with higher L/G ratios (330 gal/1000 ACFM) and thus higher removal efficiencies than conventional absorbers (L/G 90-130).

The absorber system captures not only targeted pollutants from the flue gas, such as $SO_x$, $NO_x$, and particulate matter, but also heavy metals, chlorides, and fluorides. The particulate matter is mostly fly ash carried over from the bag house that is 2.5 μm or less. The metals and halides derive from the coal and will depend on the particular coal burned. All these constituents are removed from the absorption loop in the solvent processing system. The molar flow rate of all constituents from the flue gas into the absorber loop is equal to the molar flow rate of these pollutants out of the absorber loop in the solvent process system, and then out in the solids and brine streams. The concentrations of all constituents in the absorber loop reach steady state.

Gas solubility, solvent temperature and pH also play a key role in pollutant absorption. The system of this embodiment operates at relatively low liquid temperatures, e.g., 100° F. to about 125° F. for optimizing gas solubility and minimizing solvent evaporation. The equilibrium solubility (300° K.) between a pollutant in the gas phase, $p_a$, and in the aqueous phase, $C_a$, is governed by Henry's coefficient, $K_H=C_a/p_a$.

$$SO_2(g) \rightarrow H_2SO_3, K_H=1.4 \text{ M/atm} \quad (1)$$

$$H_2SO_3 \rightarrow H^+ + HSO_3^-, K_1=0.014 \text{ M} \quad (2)$$

$$HSO_3^- \rightarrow H^+ + SO_3^{2-}, K_2=7.1\times10-8 \text{ M} \quad (3)$$

$$HSO_3^- + \tfrac{1}{2}O_2 \rightarrow SO_4^{2-} + H^+, k>106 \text{ M-1s-1} \quad (4)$$

For discussion purposes, S(IV) is the sum of all forms of sulfur in the +4 oxidation state, $[S(IV)]_{tot}=[SO_2]+[HSO^{3-}]+[SO_3^{2-}]$, and S(VI) is the sum of all forms of sulfur in the +6 oxidation state, $[S(VD]_{tot}=[SO_3]+[HSO_4^-]+[SO_4^{2-}]$. As $SO_2$ gas is dissolved into the water, the solute is transformed to bisulfite ($HSO_3^-$) and sulfite ($SO_3^{2-}$) products according to the equilibria governed by $K_H$, $K_1$ and $K_2$. The process is pH dependent given the $H^+$ product formation. As more $H^+$ is formed (lowering the pH) the equilibrium shifts back to reactant formation. At pH values less than 3.5, a significant amount of $SO_2$ off-gases from the solvent. To optimize $SO_2$ removal efficiency and cost, a steady state addition of sodium hydroxide or other chemical base is injected into the solvent loop to keep the pH of the system near about 6-7:

$$SO_2(g)+\tfrac{1}{2}O_2(g)+2NaOH(aq) \rightarrow Na_2SO_4(aq)+H_2O \quad (1)$$

Sulfite Oxidation System

The forced oxidation of sulfite to sulfate can be accomplished with a simple air sparger (using a 14 kW air compressor) in a separate tank. Although a sparger is simple, the gas liquid contact efficiency is low so the flow rate of air is set to about 3 times the stoichiometric amount required to complete oxidation. Assuming 100% oxidation, about 533 lb/hr of sulfite is oxidized to sulfate. For a full scale system, an additional high efficiency gas liquid contactor to replace the sparger may be cost effective.

Solvent Processing System

If running the system in a fully oxidized mode, that is with the majority of sulfur as sulfate ($SO_4^{2-}$), the design criteria for sulfate precipitation and removal are presented in Table 13. The system is designed for <50 ppm $HSO_3^-$, and 14.4% $SO_4^{2-}$ in the liquid in steady state operation. The flow rate of the solvent process stream depends directly on the steady state loop concentration of $SO_x$ and determines the size requirements for the design of the solvent process system.

TABLE 13

DESIGN CRITERIA FOR SULFATE REMOVAL

| Parameter | Value |
|---|---|
| Reagent Addition Rate | Ca(OH)$_2$ at 233 lb/hr |
| pH | >10 |
| Percent SO$_2$ Processed | >99% |
| SO$_2$ Process Rate | 3.1 lb-mol/hr |
| Brine Stream Flow Rate | <0.7 GPM |

Advanced Design, Sorbent and Process Options.

Alternate sorbents are shown in Table 14 and include sodium hydroxide, ammonia, sodium carbonate, magnesium hydroxide, calcium hydroxide, limestone (calcium carbonate), and possibly fly ash. Each sorbent requires a particular sorbent processing system and each power generating site may have particular solid and liquid disposal requirements.

TABLE 14

ADVANCED DESIGN, SOLVENT AND PROCESS OPTIONS

| Option | Approach | Benefit |
|---|---|---|
| Design | NH$_3$/Ca dual loop with in situ oxidation of sulfites using air | Possible enhanced absorption of NO$x$<br>Expensive NH$_3$ is recycled |

TABLE 14-continued

ADVANCED DESIGN, SOLVENT AND PROCESS OPTIONS

| Option | Approach | Benefit |
|---|---|---|
|  | and/or chemical oxidizers with gas liquid contactor | 100% separation of $NH_3$ and Ca in precipitation step. $NH_3$ is onsite for $CO_2$ absorption |
| Solvent | $NH_3$ for SOx, NOx capture |  |
|  | $CaO/Ca(OH)_2$ for $SO_x$ capture | >3X reduction in solvent cost |
| Process | Operate absorber close to S(IV) solubility limits | Reduced water usage |
|  | Use fly ash as precipitating agent for sulfate | On site, inexpensive additive for sulfate precipitation |
|  | Use dual loop approach for S(VI) precipitation | Reduced water usage, use inexpensive CaO or fly ash to precipitate sulfates, generate gypsum product stream |

Choosing a sorbent/sorbent processing/disposal system is driven by performance, reagent cost and site byproduct disposal requirements. A comparison of the most commonly used reagents for $SO_2$ removal in packed towers with respect to reactivity and operating cost are shown in Table 15.

TABLE 15

COMPARISON OF REACTANT REACTIVITY AND COST

| Reactant | Reactivity | Cost |
|---|---|---|
| Caustic (e.g., NaOH, KOH) | Highest | Highest |
| Ammonia ($NH_3$) | Highest | Highest |
| Soda Ash ($Na_2CO_3$) | Very | Moderate |
| Magnesium Hydroxide (MgO) | Moderate | Moderate |
| Lime ($CaO/Ca(OH)_2$) | Less | Low |
| Limestone ($CaCO_3$) | Least | Lowest |

Caustic and ammonia based systems offer the highest reactivity and potential for deep $SO_2$ removal but at the detriment of higher cost. The cost of these reactants can be significantly offset by dual loop operation where the solvent is recycled back to the absorber. Of all the possibilities the most promising are the NaOH/Ca(OH), NaCO/Ca(OH), NH/Ca(OH) dual loops. The fly ash option presents the possibility of zero reagent cost but also presents the highest risk.

Although the Na/Ca dual loop can be preferable, the NH/Ca dual loop is also a viable alternative. It retains the advantages of a very reactive and soluble sorbent, clear contacting solution, and a sorbent processing loop that recycles the relatively expensive ammonia. The advantage of ammonia over sodium is that the precipitation step separates the ammonia as a gas, so the return loop contains no calcium or other contaminants that may scale the absorber. In addition, if the gas liquid contactor system of embodiments of the invention is combined with a $CO_2$ absorption system, the ammonia may be used for both because ammonia is volatile and an additional (small) scrubber unit is placed in the flue gas vent line to prevent ammonia slip to the stack.

Fly ash shows promise as an FGD absorption agent because of its alkaline nature and ready availability. Table 16 lists the typical composition of Class C fly ash (sub-bituminous). Early attempts at combining FGD with fly ash capture, however, were met with difficulty because of fouling downstream and handling characteristics of the FGD slurry in *Gas purification*, Kohl, et al., Gulf Professional Publishing, 5 ed., (1997), which is hereby incorporated by reference. However, careful preparation of the fly ash (e.g., at optimized $SO_2$—$CaO/MgO$ stoichiometric levels) to avoid cementitious reactions inside the gas liquid contactor itself may enable the operation of the contactor at conditions where the fly ash does not foul scrubber operation. Alternatively, these same reactions with Ca/Mg can be desired, and as such can be used to produce cementitious material in the sorbent processing area as a commercial product. Additionally, if commercial gypsum is a desired byproduct then a solvent processing system and disposal scheme for separating fly ash from gypsum is required.

TABLE 16

CLASS C FLY ASH COMPOSITION (ASTM SPECIFICATION C 618)

| Component | Weight % |
|---|---|
| $SO_3$ | 0.23-3 |
| CaO | 17-32 |
| MgO | 4-12.5 |
| $SiO_2$ | 25-42 |
| $Al_2O_3$ | 14-21 |
| $Fe_2O_3$ | 5-10 |
| Available Alkalies | 0-8 |

System Summary

The Na/Ca dual alkali contactor process and system offers advantages over conventional systems for its high techno-economic performance. Table 17 summarizes the key baseline performance parameters for the contactor system in this embodiment for the 20 MW case and a generalized (per MW) system.

TABLE 17

SUMMARY OF THE KEY OPERATIONAL PARAMETERS AND VALUES

| Parameter | 20 MW Contactor Value | Generalized Contactor (per MW) |
|---|---|---|
| SOx Removal Efficiency | 99+% | 99+% |
| S(IV) Concentration in incoming flue gas | 400 ppm | 200-4000 ppm |
| Solvent Loop pH | 6 | 6 |
| Solvent Loop Temperature | 107° F. | 107° F. |
| Solvent Loop Flow Rate | 28000 GPM | 1400 GPM/MW |
| Water Input to Scrubber | 12 GPM | 0.6 GPM/MW |
| 50 wt % NaOH Input to Scrubber | 0.07 GPM | 0.003 GPM/MW |
|  | 0.66 TPD | 0.033 TPD/MW |
| $Ca(OH)_2$ (solid) input to precipitator | 2.80 TPD | 0.14 TPD/MW |
| Waste Water Treatment Stream | 40 GPM | 2 GPM/MW |
| Precipitate Supernatant to Scrubber | 39 GPM | 2 GPM/MW |
| Solid Gypsum ($CaSO4 \cdot 2H_2O$) Waste | 6.5 TPD | 0.32 TPD/MW |
| Brine Stream | <1 GPM | <0.05 GPM/MW |
| Parasitic Power | 1.3% | 0.8% |

Deep $SO_2$ removal requires rapid and efficient mass transfer kinetics and is met by the use of NaOH. Although calcium hydroxide/carbonate systems are low cost solvents, they are also low reactivity solvents. To enhance reactivity the lime/limestone based absorber is run with slurries (solids). However, solids are prone to scaling absorber surfaces (via calcium sulfite/sulfate formation) and in some instances may even hinder mass transfer. Significant cost reductions using the Na/Ca approach are achieved since sodium (NaOH) is reclaimed in the solvent processing loop. The operating cost for a dual loop system is equal to or less than for a single loop limestone system, particularly for high sulfur fuels as in *Gas purification* Kohl, et al., Gulf Professional Publishing, 5 ed., (1997), which is hereby incorporated by reference as if fully setforth herein. The least expensive reagent is calcium (Ca(OH)$_2$) and is used to precipitate gypsum, a commercial byproduct. The process advantages of the dual loop system are that it can handle higher sulfur loads, the contact liquid is non-erosive, and it can enable operation of a much more efficient gas liquid contactor. The draw backs are increased complexity and the requirement for two reagents. By contrast, in a single loop wet limestone FGD process all the required steps are carried out in a single vessel, the required steps being dissolving the limestone as calcium carbonate, gas liquid contact to absorb the $SO_2$, the reaction with calcium, oxidation, and precipitation. This results in a single, relatively simple system. The drawback is the corrosive/abrasive nature of the slurry requires exotic nozzle material and the poor efficiency of the spray tower requires a large contact area and thus a large tower.

The parasitic power for the major equipment components for a 20 MW and greater than 200 MW contactor systems described here are summarized in Table 18. In these embodiments, it is assumed that the flue gas exhaust blowers (ID fans) are already in place and thus not counted. The bulk of the power draws are tied to the solvent recirculation pumps. The contactor system operates at low liquid side hydraulic and mechanical power due to the large (>10x conventional spray nozzle) flat jet orifice area. In this embodiment, the 20 MW liquid pumps (28,000 GPM) described draw considerable power from the system due to moderate pump efficiency (~65%). Larger liquid pumps (>100,000 GPM) that can be used in full scale operations (>200 MW) would be significantly more efficient (~85%) and thus enable considerably (1.7x) lower parasitic power loads.

TABLE 18

PARASITIC POWER LOADS FOR GLC SYSTEM Equipment

| Component | Parasitic Power 20 MW Unit (MWp/MWe) | Parasitic Power >200 MW System (MWp/MWe) |
|---|---|---|
| Liquid Pumps | 0.012 | 0.007 |
| Solvent Supply Pumps | 0.0001 | 0.0001 |
| Waste Processing | 0.0003 (est.) | 0.0003 (est.) |
| Brine stream dryer | 0.001 | 0.001 |
| % Parasitic Power | 1.3 | 0.8 |

Gas liquid Contactor for $CO_2$ Process

These advantages describe an advanced cost and energy savings process incorporating the compact low cost, low pressure drop and highly energy efficient scrubber system to meet environmental goals of $CO_2$ removal efficiency (>90%) and cost of energy (<20%). The three possible absorption/regeneration reactions using ammonia solutions are given in *Fuel Processing Technology*, Yeh, et al., Vol. 86, Issues 14-15, pp. 1533-1546, October 2005, which is hereby incorporated by reference.

$$2NH_{3\,(aq)} + CO_{2(g)} + H_2O \rightarrow (NH_4)_2CO_{3(1)}, \text{ delta } H_r = -24.1 \text{ kcal/mole } (-986 \text{ BTU/lb } CO_2) \quad (1)$$

$$NH_{3(1)} + CO_{2(g)} + H_2O \rightarrow NH_4HCO_{3(1)}, \text{ delta } H_r = -15.3 \text{ kcal/mole } (-622 \text{ BTU/lb } CO_2) \quad (2)$$

$$(NH_4)_2CO_{3(1)} + CO_2 + H_2O \rightarrow 2NH_4HCO_{3(1)}, \text{ delta} H_r = -6.4 \text{ kcal/mol } (-262 \text{ BTU/lb } CO_2) \quad (3)$$

The reactions are written for absorption and are thus exothermic. The most energy efficient route to $CO_2$ capture and solvent regeneration is the carbonate/bicarbonate reaction in Equation (1). Since the absorption reaction is favored at low temperature the scrubber liquor is chilled to 90° F. and the stripper liquor is heated to 140° F. to release the $CO_2$ gas at 1 atm. The ammonium carbonate/bicarbonate chemistry offers the potential for significant lower operating costs compared to alkanolamine-based solvents because its regeneration energy is less than half that of MEA.

Gas Liquid Contactor Process Flow Diagram and Analysis for $CO_2$

Figure 50:
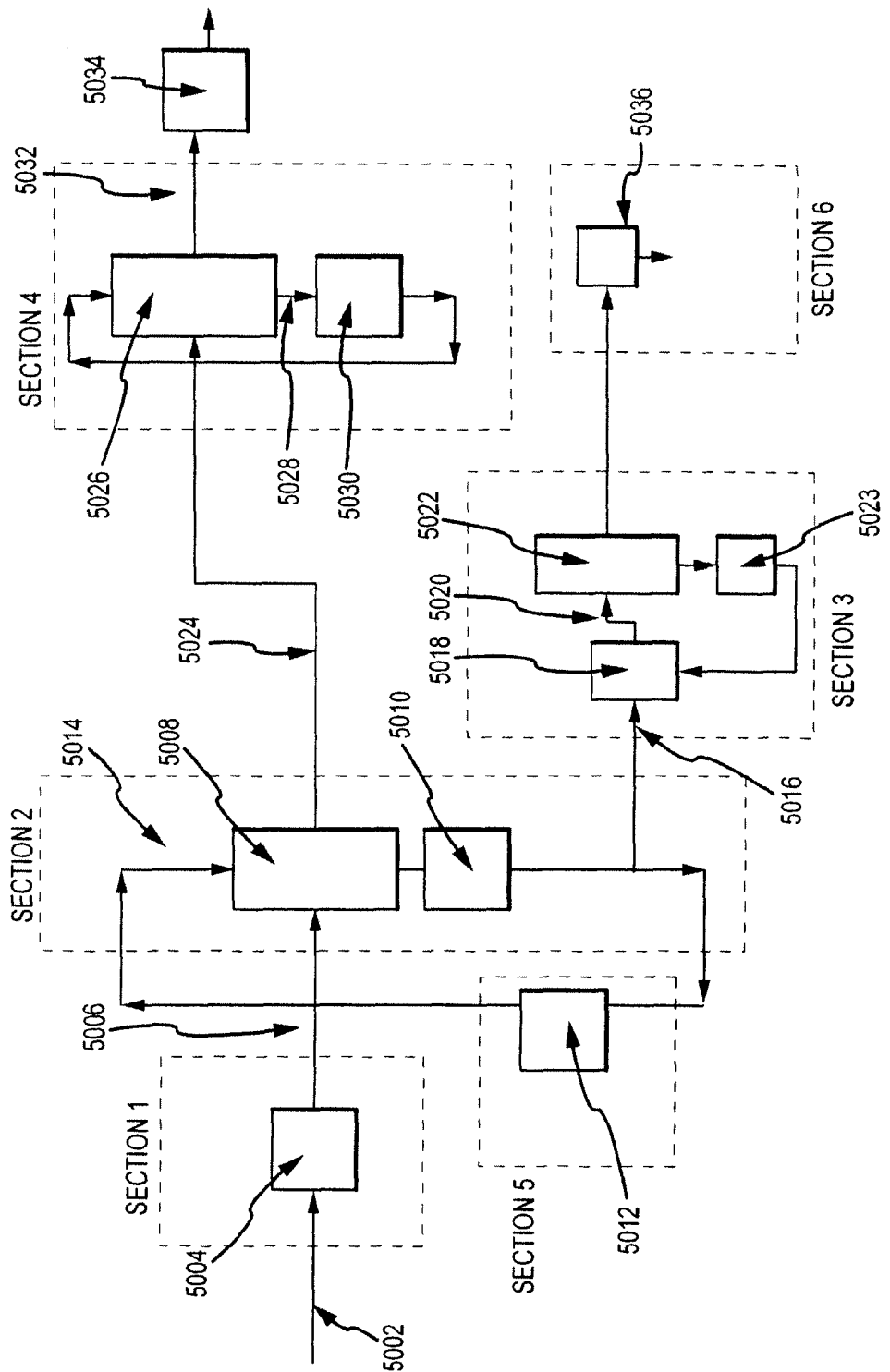
FIG. 50 is a process flow diagram from a pollutant removal system according to another embodiment.

FIG. 50 is a process flow diagram from a pollutant removal system according to another embodiment. The flue gas first enters the contactor to remove pollutants, e.g., $SO_x$, $NO_x$ and particulate matter. It then enters the $CO_2$ absorber where it is contacted with, for example, chilled ammonium carbonate solution or piperazine and a significant portion of the $CO_2$ is captured as ammonium bicarbonate or as the carbamate of piperazine, respectively. Other amines, alkanolamines, and/or bases (e.g., KOH, NaOH, etc.) can also be utilized in this loop. If the chemistry system used is ammonium hydroxide/ammonium carbonate system is used, some ammonia enters the flue gas as ammonia slip, is carried to the ammonia scrubber and removed.

The clean flue gas continues to the condensing heat exchanger to be heated about 40° F. above its dew point and then exits through the stack. The ammonium carbonate/bicarbonate absorber stream is re-circulated back through a chiller and heat pump before returning to the scrubber. A side stream of the absorber solution is removed, heated, and sent to the stripper to release the captured $CO_2$. The lean solution returns to the absorber loop. The stripped $CO_2$ carries some water vapor and ammonia, which are removed in the condensing heat exchanger and during compression. The water and ammonia is returned to the absorber loop. The clean $CO_2$ is sent to the compressor train and sequestered. A key energy saving process step is using a heat pump to cool the ammonium carbonate absorber solution and reject that heat to the stripper liquid to raise its temperature for separating the $CO_2$. Using a heat pump to capture the energy in the absorber stream and transfer it to the stripper stream saves about 10% parasitic power.

The design criteria for sizing and analyzing the system are shown in Table 20. The process is divided into six primary process Sections as shown in FIG. 50 including Section 1 the flue gas conditioning system, Section 2 the $CO_2$ absorber loop, Section 3 the $CO_2$ stripper loop, Section 4 the ammonia or amine slip absorber loop, 5 the chiller system, and Section 6 the $CO_2$ compressor train. All flow rates and heat loads are calculated for a 20 MW demonstration system.

TABLE 19

DESIGN CRITERIA FOR A 20 MW $CO_2$ GAS LIQUID CONTACTOR

| Parameters | Value |
|---|---|
| Flue Gas | |
| Flow Rate | 84,084 ACFM |
| Velocity | 58.8 ft/s |
| Residence Time | .07 s |
| Temperature | 110 F. |
| Pressure | −10 inches w.c. |
| Ambient Pressure | 810 mBar |
| $CO_2$ | 10-15% |
| Liquid Flow | |
| Flow Rate | 28,000 gpm |
| Temperature | 90 F. |
| Sorbent | 3M Ammonium Carbonate |
| Solids Loading | none |
| pH | 9 |
| Pressure Drop | |
| Gas Side | <.03/ft psi |
| Liquid Side | <8 psi |
| Emission Removal Requirements | |
| $CO_2$ | >90% |
| Absorber Specific Surface Area | >8 cm$^{-1}$ |
| L/G | 330 gal/1000 CF |
| Parasitic Power | <20% |
| Commercial By-Product | $CO_2$ |

Flue Gas Conditioning System

In this embodiment as shown in FIG. 50, the flue gas conditioning system includes an inlet 5002 of flue gas into an optional heat exchanger/chiller 5004 and an outlet 5006. The flue gas conditioning system receives an inlet gas which may have already seen some processing, e.g., processing to remove acid gases such as $SO_2$, HCl, and the like. The heat exchanger/chiller 5004 is optional as it depends on the inlet gas constituents and absorber chemistry as known in the art, e.g., ammonia/ammonia carbonate would require a chiller. The flue gas has been cooled and scrubbed of $SO_2$, e.g., from a contactor system (not shown) according to an embodiment of the invention. In this embodiment, the flue gas 5002 contains contaminates such as $CO_2$, $N_2$, $H_2O$, $O_2$ and other trace gases.

$CO_2$ Absorber Loop

Referring to Section 2, the absorber loop includes gas liquid contactor 5008 and a catch tank 5010. A heat exchanger/chiller 5012 of section 5 is an optional component. Again, the heat exchanger/chiller 5010 is optional as it depends on the inlet gas constituents and absorber chemistry as would be known to one of skill in the art. In this embodiment, the gas liquid contactor is coupled to an outlet 5006 of the Section 1. The gas liquid contactor 5008 is coupled to a catch tank 5010 and to a heat exchanger/chiller 5012 (Section 5) as part of recycle loop.

In operation, the flue gas containing $CO_2$ is directed through an inlet 5014 of the gas liquid contactor 5008 and stripped of a portion of the $CO_2$. The $CO_2$ absorber loop of section 2 includes various values and pumps as required for appropriate flow and recycle of the liquid and operation as known in the art. After contacting the gas in the contactor 5008, the absorber solution now carries an additional an amount of $CO_2$ to catch tank 5010 as part of the recirculation loop.

In this embodiment, the energy requirements of the $CO_2$ absorber loop are handled by the heat exchanger/chiller 5012 of Section 5. The general chemistry described here, using ammonium carbonate, amines, or alkanol amines, absorbs $CO_2$ more preferably when chilled below the flue gas temperatures seen in typical systems. Therefore, if required, the Section 5 heat exchanger/chiller 5012 provides that cooling capacity to maintain optimal operating conditions of the absorber solution.

$CO_2$ Stripper Loop

Referring to Section 3 includes an inlet 5016 coupled to a heat exchanger/chiller 5018 having an outlet 5020. The outlet 5020 is coupled to a gas liquid contactor 5022. The gas liquid contactor 5022 has an outlet 5024 coupled to a catch tank 5023 with a recycle loop. The gas liquid contactor 5022 is configured to remove the captured $CO_2$ from the absorber solution. $CO_2$ stripping can be accomplished by a number of means, including pressure swings, pH adjustment, or by heating the $CO_2$/absorber solution. The components of Section 3 can vary depending on the methodology chosen. In any case, it is advantageous to capture the absorber subsequent to release of the $CO_2$ and recirculate that absorber liquid back to the main absorber loop in Section 2. An output of Section 3 is sent to stack 5034.

$NH_3$/PZ Absorber Loop

The ammonia or amineabsorber loop, Section 4, is designed to capture the ammonia or amine slip in the flue gas after it leaves the $CO_2$ absorber 5008. This may be a particular issue with $NH_3$, depending on the temperature of the absorber solution (colder leads to less slip). The $NH_3$/PZ Absorber Loop includes a gas liquid contactor 5026 coupled to the inlet 5024. The gas liquid contactor 5026 includes an outlet 5028 coupled to catch tank 5030, recycle loop, and an outlet 5032. If an amine, such as piperazine or alkanol amines, are used as the absorber solution, there is less need for Section 4, thus implementation of such a section would be determined through examination of the overall process requirements and temperatures. This Section 4 is optional as smaller molecular weight amines may slip and it may be advantageous to capture while higher molecular weight amines may not slip and therefore, they may not need to be processed. The output 5032 may directed to a flue gas stack 5034.

$CO_2$ Compressor Train

Section 6 describes the process area for stripping $CO_2$ from the absorber solution. The $CO_2$ Compressor Train a compressor 5036 coupled to the gas liquid contactor 5022. This section is configured capture and pressurize pure $CO_2$ coming of the gas liquid contactor 5022. That is, subsequent to that section, in order to be transportable in a convenient manner for secondary industrial uses, Enhanced Oil Recovery (EOR), or sequestration, secondary steps are desired. One of these options might include that the $CO_2$ is condensed in a compressor train and sequestered at super critical pressure forming liquid $CO_2$ which can be transported by truck or pipeline to its end application.

Other Solvent Systems for $CO_2$ Capture

In Sections 2 and 3 of FIG. 50 various sorbents may be used for $CO_2$ capture and/or stripping. The sorbents may include ammonia carbonate based solvent selected as the baseline solvent. However, the system can also be designed to operate with a wide variety of post combustion wet scrubbing solvents including amines such as ammonia, diethanolamine (DEA), and monoethanolamine (MEA), and advanced solvent systems such as promoted carbonates, piperazine, tertiary and hindered amines like methyldiethanolamine (MDEA) and 2-aminomethylpropanolamine (AMP), metal organic frameworks and molecular encapsulation.

Embodiments of the $CO_2$ system presents several strengths and advantages for post combustion $CO_2$ capture. Very large contact surface area is available in a small contactor volume.

This translates into economic savings in two areas, the small footprint required translates to small capital cost and low gas and liquid side pressure drops mean low operating cost. Low capital and operating cost increase the range of possible $CO_2$ sorbents. For instance, if an inexpensive sorbent has a slow reaction rate and requires a large contact area, such as seawater or deep brine aquifers, it may still be economically feasible in the $CO_2$ gas liquid contactor system whereas it might not be normally considered in a standard gas liquid contactor such as a bubble column or spray tower.

In the most mature $CO_2$ capture systems for flue gas, alkanolamines and ammonium carbonate/bicarbonate (AC/ABC), the largest energy consumption is related to the heat of reaction. The energy associated with the AC/ABC reaction consumes almost 70% of the total energy required to absorb and desorb the $CO_2$. The ABC solution must be cooled to 55° F. to absorb the $CO_2$ and heated to 265° F. to release it in the stripper. Options to reduce the energy required are twofold: find a system with smaller heat of reaction to absorb and desorb $CO_2$ or transfer the heat released during absorption to the desorption reaction. Ammonium carbonate/bicarbonate is currently the lowest energy chemical sorbent. Physical solvents require almost no energy for regeneration, but operate best at high pressure. Membrane systems transfer the energy of absorption to the desorption process, but are currently applied only to small systems. The following paragraphs describe the classification and description of alternate processes that could be applied to the capture of $CO_2$ from flue gas.

In exploring alternate $CO_2$ absorption systems, the sorbent must be matched to the technology. Three different post combustion absorption technologies are being developed: gas liquid contactor, dry contact systems, and membrane contact systems. The gas liquid contactor system requires a liquid sorbent. A gas liquid system separates the absorption and desorption into two separate process steps in two different vessels at different pressures and temperatures. This system generally requires expenditure of energy at both steps, cooling for the exothermic absorption, and heating for the endothermic desorption. The process requires a temperature and/or pressure swing, which is energy intensive. The dry regenerable sorbent system using sodium bicarbonate operates the same as the gas liquid contactor, except the phase of the sorbent is solid.

Membrane systems, however, are fundamentally different. In a membrane system a membrane is a very thin wall of permeable material that separates the two streams and can be a solid or a liquid held in a sponge-like material. Membranes are designed to select for the gas to be separated. Whether the membrane material is solid or liquid, the membrane absorbs $CO_2$ on the concentrated side and transports it to the dilute side where the $CO_2$ is desorbed. The driving force is the concentration gradient of $CO_2$ across the very thin membrane. The beauty of the membrane system is that absorption and desorption are carried out in the same vessel, at the same temperature, at almost the same pressure. Because absorption and desorption are carried out within a few microns of each other in a very thin membrane, the energy of absorption is transferred to the desorption reaction at constant temperature. Thus the change in entropy is zero and the net energy required is zero. The liquid in the membrane can be tailored to selectively transport $CO_2$. The drawbacks are manufacturing cost, membrane life, the requirement for very clean flue gas, and the enormous contact area required (almost a million square meters for a full-up commercial system). Several hundred thousand ACFM of flue gas traveling in a duct of up to 100 m² cross section must be channeled into billions of fibers with cross sections of each fiber of 60 nm².

Alternate solvent systems applicable to post combustion absorption in a gas liquid contactor are chemical and physical. Wet chemical sorbents include amines, carbonates, promoters, hybrid, and pH swing. Wet physical sorbents include metal organic frameworks, ionic liquids, seawater, and saline groundwater. Glycols are not discussed because they are high pressure systems and more applicable to pre-combustion absorption. Selexol is an example of a commercialized glycol system currently used to clean natural gas, a high pressure process. Each wet sorbent is discussed below as it applies to the $CO_2$ gas liquid contactor.

Aqueous amines are the current state-of-the-art technology for $CO_2$ capture for power plants as recognized by those skilled in the art. Amine sorbents include ammonia ($NH_3$), monoethanolamine (MEA), methyldiethanolamine (MDEA), 2-minomethylpropanolamine (AMP), PZ piperazine (PZ), and others. All react with $CO_2$ initially to form the amine carbamate ($CO_2$+ $2RNH_2 \leftrightarrows RNH_2COO \leftrightarrows RNHCOOH$). In addition amine and water can react with $CO_2$ to produce the amine bicarbonate ($RNH_2+H_2O+CO_2 \leftrightarrows RNH_3^+ + HCO_3^-$). Absorption/desorption can make use of the lowest energy reaction, bicarbonate $\leftrightarrows$ carbonate. All amine systems require a gas liquid contactor and a stripper. The benefit of the system described here is the very efficient gas liquid contactor. Although it would benefit any amine system, the ammonium carbonate/bicarbonate sorbent was chosen because ammonia is less expensive and the reaction energy for ammonia is less than alkonalamines like MEA.

Alkali carbonates include Na, K, and Ca, carbonates/bicarbonates. Although alkali carbonates were used extensively in the early 1900s for ambient temperature and pressure absorption of $CO_2$, they have been replaced by more efficient alkanolamines. Since the rate of absorption of $CO_2$ into aqueous solutions is normally slow, promoters (catalysts or enzymes) are often added to increase the rate.

Examples of promoters are formaldehyde, MEA, DEA, glycine, and carbonic anhydrase in *Gas purification*, Kohl, et al., Gulf Professional Publishing, 5 ed., (1997), which is hereby incorporated by reference. The fastest catalyst available for absorption of $CO_2$ is the enzyme carbonic anhydrase as described in M C Trachtenberg, L Bao, S L Goldman., 2004, Seventh Int. Conf. On Greenhouse Gas Control Technologies (GHGT-7), Vancouver, BC, which is hereby incorporated by reference. Amino acids will also promote the absorption of $CO_2$ as well or better than MEA or DEA as described in CO2 capture from flue gas using amino acid salt solutions, Jacco van Hoist, Patricia. P. Politiek, John P. M. Niederer, Geert F. Versteeg, Proceedings of 8th International Conference on Greenhouse Gas Control Technologies, 2006, which is hereby incorporated by reference. Although enzymes and catalysts do not change the energy of a reaction or its equilibrium point, they do lower the activation energy and can increase the reaction rate by several orders of magnitude. The hydrolysis of $CO_2$ in water and subsequent reaction to bicarbonate is quite slow. The effect of rate increase is to decrease residence time required for contact, and thus decrease required contact area. However, because it is a biological enzyme, CA is sensitive to temperature and not applicable to a temperature swing process with a high desorption temperature. That means a pressure swing process is required. Since the partial pressure of $CO_2$ in flue gas is about 0.15 atm, the desorption total pressure must be substantially less than 0.1 atm if pure $CO_2$ is to be captured. The other alternative for CA is to pressurize all the flue gas before contact. Other promoters, such as DEA, are currently used at high temperature and pressure in the hot potassium carbonate process.

Hybrid sorbents use a combination of sorbents and carbonate plus an amine. A current example is $K_2CO_3$/PZ, an aqueous potassium carbonate solution promoted by piperazine (PZ) that is expected to use less energy than MEA. This system is currently being investigated at the University of Texas at Austin. They found the rate of absorption and loading of $CO_2$ are significantly higher for $K_2CO_3$/PZ than for MEA. In addition, loss and degradation of PZ are also significantly less than for MEA as described in Plasynski, et al., *Carbon Dioxide Capture by Absorption with Potassium Carbonate*, Carbon Sequestration, Project Facts, USDOE, NETL, April, (2008). The main contribution of the GLC absorber to this system would be increased contact efficiency, smaller footprint, and smaller pressure drops resulting in lower capital and operating costs.

The last chemical absorption/desorption system, pH swing, is not normally mentioned because the energy cost is very high. $CO_2$ is absorbed with a base like NaOH and released with an acid like HCl. The resulting salt is then electrolyzed to regenerate the acid and base. The energy input goes into electrochemistry instead of pressure or temperature swings. The calculated energy required is much higher than other processes. This process has been commercialized, however, for $SO_2$ absorption. Physical sorbents include glycols, metal organic frameworks (MOF), ionic liquids, seawater and saline ground water. These do not depend on a chemical reaction with the sorbent, but physical absorption. Although there is no energy associated with a chemical reaction, the desorption process does require a change in pressure.

Glycols work best at high pressure in a pressure swing process, like the Selexol process proposed for pre-combustion separation of $CO_2$ in the synthesis gas at 700 psi. The gas liquid contactor system is not compatible with high pressure absorption processes.

Metal organic framework (MOF) is a molecular "cage" that can enclose a tiny bubble of $CO_2$ gas. MOFs have high selectivity, good absorption/desorption rates, and high $CO_2$ capacity. They are applicable to gas liquid contactors and liquid membranes. The risk is high reagent cost and that they have not been demonstrated in gas liquid contactors.

Ionic liquids are organic salts that are liquid at room temperature. They are not aqueous solutions. Ionic liquids can absorb both $CO_2$ and $SO_2$ and so have high potential for flue gas cleaning. They are applicable to gas liquid contactors and liquid membranes. Like MOFs, ionic liquids have been synthesized only at laboratory scale and reagent cost could be very high. They have also not been tested in gas liquid contactors.

Saline ground water or Seawater—Because a favored $CO_2$ sequestration method is injection into deep saline aquifers, a possible method for both capture and sequestration is to absorb the $CO_2$ with naturally alkaline saline ground water and re-inject it as a solution. This entirely avoids the energy required to desorb and compress the $CO_2$ for injection as a gas. Depending on the alkalinity of the ground water, the absorption rate may be slow and require a large contact area. The very high specific area of the GLC contactor would be a perfect solution. In addition, even though many naturally occurring saline aquifers are naturally abundant in Ca and/or Mg, the alkalinity of the ground water could be enhanced with lime for an optimum tradeoff between capital and operating costs.

This process is similar to seawater absorption of either/both $CO_2$ or $SO_2$ which makes use of essentially infinite availability of absorbent and disposal (site dependent, of course). Additionally, seawater has some level of natural abundance of Ca and Mg which can readily form solid precipitates as carbonates or sulfates. This or other desired ratios can also be produced artificially using various magnesium and/or calcium salts including nitrates, hydroxides, sulfates, carbonates, or halides. Solubilities of these salts vary dramatically depending on the starting compound, pH, and temperature of the target solutions, and would need to be considered by one skilled in the art regarding what their goals and target compounds might be.

The following table compares the advantages, disadvantages, and estimated cost of various $CO_2$ sorbent systems that are applicable to the gas liquid contactor.

TABLE 20

COMPARISON OF $CO_2$ SORBENT SYSTEMS

| Sorbent | Advantages | Disadvantages | Reaction Energy, BTU/lb $CO_2$ | Reagent Cost, $/lbmol | Absorption Cost, kWh/Kg $CO_2$ |
|---|---|---|---|---|---|
| MEA | Mature, commercial technology | Expensive | +703 for carbamate MEA + $CO_2$ | $40 | 0.53-0.78 |
| Ammonium carbonate/bicarbonate (AB/ABC) | Under development | $NH_3$ is hazardous material | +262 for $2NH_4HCO_3$ $CO_2 + H_2O + (NH4)_2CO_3$ | $5 for $NH_3$ | 17.3 |
| Sodium Carbonate/bicarbonate | Simple chemistry | sodium recycle costs | ~+260 for $2NaHCO_3$ $CO_2 + H_2O + Na_2CO_3$ | $16 for NaOH | 0.41-1.1 |
| Carbonic Anhydrase | Increases absorption rate | Insufficient amount available, Temperature sensitive, demonstrated in membrane only | ~+116 for $HCO_3^- + H^+$ $CO_2 + H_2O$ | tbd | High |
| $K_2CO_3$/PZ | High absorption rate, high loading, Low degradation | Expensive reagent (PZ) | +259 for $2KHCO_3$ $CO_2 + H_2O + K_2CO_3$ | $40 for $K_2CO_3$, $300 for PZ | <MEA |
| pH swing | Simple chemistry, Simple stripping, Regeneration of acid and base is commercialized | Very high energy, Regeneration of acid and base require another process island, not demonstrated, | +1,083 for $H_2O$ $H^+ + OH^-$ | $16 for NaOH $10 For HCl | High |
| MOF and Ionic Liquids | High absorption rate, high loading, Low degradation | Lab scale only, High risk | Tbd | high | tbd |

TABLE 20-continued

COMPARISON OF $CO_2$ SORBENT SYSTEMS

| Sorbent | Advantages | Disadvantages | Reaction Energy, BTU/lb $CO_2$ | Reagent Cost, $/lbmol | Absorption Cost, kWh/Kg $CO_2$ |
|---|---|---|---|---|---|
| Saline Ground Water or Seawater | No stripping, no compression | Not demonstrated, site dependent | n/a | ~0 | Potentially very low |

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of processing gas phase molecules with a gas liquid contactor, comprising the steps of:
   forming a plurality of essentially planar liquid jets, each of said liquid jets comprising a planar sheet of liquid, said plurality of liquid jets arranged in substantially parallel planes;
   providing gas with at least one reactive or soluble gas phase molecule; and
   removing at least a portion of the gas phase molecules by a mass transfer interaction between the gas phase molecules and the liquid jets, wherein the mass transfer interaction comprises a volumetric mass transfer coefficient in a range from about 1 $sec^{-1}$ to about 250 $sec^{-1}$.

2. The method of claim 1, wherein the mass transfer interaction comprises a volumetric mass transfer coefficient in a range from about 5 $sec^{-1}$ to about 150 $sec^{-1}$.

3. The method of claim 1, wherein the mass transfer interaction comprises a volumetric mass transfer coefficient in a range from about 10 $sec^{-1}$ to about 100 $sec^{-1}$.

4. The method of claim 1, wherein the providing the gas step comprises providing gas with a gas flow rate to a reaction chamber volume ratio in a range from about 100 $min^{-1}$ to about 1000 $min^{-1}$.

5. The method of claim 1, wherein the forming a plurality of essentially planar liquid jets step comprises forming the planar liquid jets at a liquid pressure in a range from about 2 psig to about 50 psig.

6. The method of claim 1, wherein at least one of the planar liquid jets comprises a width greater than about 1 cm.

7. The method of claim 1, wherein at least one of the planar liquid jets comprises a width in a range from about 1 cm to about 15 cm.

8. The method of claim 1, wherein at least one of the planar liquid jets comprises a thickness in a range from about 10 μm to about 1000 μm.

9. The method of claim 1, wherein at least one of the planar liquid jets comprises a thickness in a range from about 10 μm to about 250 μm.

10. The method of claim 1, wherein at least one of the planar liquid jets comprises a thickness in a range from about 10 μm to about 100 μm.

11. The method of claim 1, wherein at least one of the planar liquid jets comprises a length in a range from about 5 cm to about 30 cm.

12. The method of claim 1, wherein at least one of the planar liquid jets comprises a length in a range from about 5 cm to about 20 cm.

13. The method of claim 1, wherein at least one of the planar liquid jets has a velocity less than 15 m/sec.

14. The method of claim 1, wherein at least one of the planar liquid jets has a velocity in a range from about 5 m/sec to about 15 m/sec.

15. The method of claim 1, wherein the planar liquid jets comprises at least one of water, ammonia, ammonium salts, amines, alkanolamines, alkali salts, alkaline earth salts, peroxides, and hypochlorites.

16. The method of claim 1, wherein the planar liquid jets comprises at least one of a calcium salt solution and a magnesium salt solution.

17. The method of claim 1, wherein the planar liquid jets comprises seawater.

18. The method of claim 1, wherein the planar liquid jets comprises brine.

19. A method of processing gas phase molecules with a gas liquid contactor, comprising the steps of:
   forming a plurality of essentially planar liquid jets with an array of nozzles arranged in a nozzle plate of the gas liquid contactor, wherein the array of nozzles is configured to form the essentially planar liquid jets;
   providing gas with at least one reactive or soluble gas phase molecule; and
   removing at least a portion of the gas phase molecules by a mass transfer interaction between the gas phase molecules and the liquid jets, wherein the mass transfer interaction comprises a volumetric mass transfer coefficient in a range from about 1 $sec^{-1}$ to about 250 $sec^{-1}$.

20. A method of processing gas phase molecules with a gas liquid contactor, comprising the steps of:
   forming a plurality of liquid jets, wherein at least one of the plurality of liquid jets comprises a substantially planar sheet of liquid;
   providing gas having contaminants; and
   removing at least a portion of the contaminants by a mass transfer interaction between the gas phase molecules and the liquid jets, wherein the mass transfer interaction comprises a volumetric mass transfer coefficient in a range from about 5 $sec^{-1}$ to about 150 $sec^{-1}$.

21. The method of claim 20, wherein the providing gas step comprises providing gas in counter flow orientation to the plurality of liquid jets.

22. The method of claim 20, wherein the providing gas step comprises providing gas in co-flow orientation to the plurality of liquid jets.

* * * * *